United States Patent [19]
Foster et al.

[11] Patent Number: 5,615,225
[45] Date of Patent: Mar. 25, 1997

[54] REMOTE MEASUREMENT UNIT CONTAINING INTEGRATED LINE MEASUREMENT AND CONDITIONING FUNCTIONALITY FOR PERFORMING REMOTELY COMMANDED TESTING AND CONDITIONING OF TELEPHONE LINE CIRCUITS

[75] Inventors: Derek G. Foster, Thousand Oaks; Edward K. W. Siu, Simi Valley; Ben A. Pierce, Ojai; Michael Kennedy, Ventura; Onofrio Schillaci, Camarillo, all of Calif.; Alex Knight, Danville, Ind.

[73] Assignee: Harris Corporation, Melbourne, Fla.

[21] Appl. No.: 194,232

[22] Filed: Feb. 9, 1994

[51] Int. Cl.$^6$ .............................. H04M 3/30; H04M 3/32
[52] U.S. Cl. .................... 379/29; 379/27; 379/22; 370/241
[58] Field of Search ...................... 379/5, 22, 24, 379/26, 27, 29, 30, 32; 370/13, 14

[56] References Cited

U.S. PATENT DOCUMENTS

| | | | |
|---|---|---|---|
| 4,537,852 | 8/1985 | Sugimoto | 435/215 |
| 4,641,299 | 2/1987 | Kemper et al. | 370/15 |
| 5,018,184 | 5/1991 | Abrams et al. | 379/29 |
| 5,111,497 | 5/1992 | Bliven et al. | 379/27 |
| 5,115,462 | 5/1992 | Kennedy et al. | 379/29 |
| 5,195,124 | 3/1993 | Ishioka | 379/29 X |
| 5,268,928 | 12/1993 | Herh et al. | 375/8 |
| 5,353,327 | 10/1994 | Adari et al. | 379/29 X |

FOREIGN PATENT DOCUMENTS

| | | | |
|---|---|---|---|
| 0454926A2 | 12/1990 | European Pat. Off. | H04M 3/30 |
| 2064270 | 6/1981 | United Kingdom | H04M 3/22 |
| WO86/02796 | 5/1986 | WIPO | H04M 3/30 |

OTHER PUBLICATIONS

Proceedings 1982 International Symposium on Subscriber Loops and Services, Sep. 20, 1982–Sep. 24, 1982; Toronto, Canada; pp. 146–151; O.B. Dale et al; 'A Highly Distributed Mechanized Loop Testing System'.
Bell System Technical Journal, vol. 61, No. 4, Apr. 1982, New York, pp. 451–490; J. M. Adrian et al; 'Peripheral Systems Architecture and Circuit Design'.
Wurm et al PNAS 83: 5414, 1986.
Corlini et al Gene 31:49, 1984.
Meneguzzi et al EMBO J. 3:365, 1984.
Southern et al. J. Mol. Appl. Genetics 4: 327, 1982.
Corces et al PNAS 78: 7038, 1981.

*Primary Examiner*—Wellington Chin
*Assistant Examiner*—Paul Loomis
*Attorney, Agent, or Firm*—Charles E. Wands

[57] ABSTRACT

A processor-controlled integrated telephone line measurement and conditioning apparatus installable at a remote site provides a multiplicity of measurement and conditioning functions that are selectively executable in response to commands issued from a supervisory command site. The dual measurement and conditioning capabilities of the architecture of the present invention impart both remote measurement unit (RMU) functionality and metallic access unit (MAU) functionality that may be individually accessed and controlled. The RMU operates primarily as a test head that performs mechanized loop testing (MLT) tasks, while the MAU is operative to impart prescribed electrical conditions to a specified line circuit. When controllably accessed to operate as an RMU, the present invention responds to instructions from a command site (loop maintenance operations systems) and performs single-line demand tests on a line provided by a pair gain system. To operate as an MAU, the system receives commands from a direct access test unit (DATU) and performs line conditioning functions on the test line provided by the pair gain system.

61 Claims, 59 Drawing Sheets

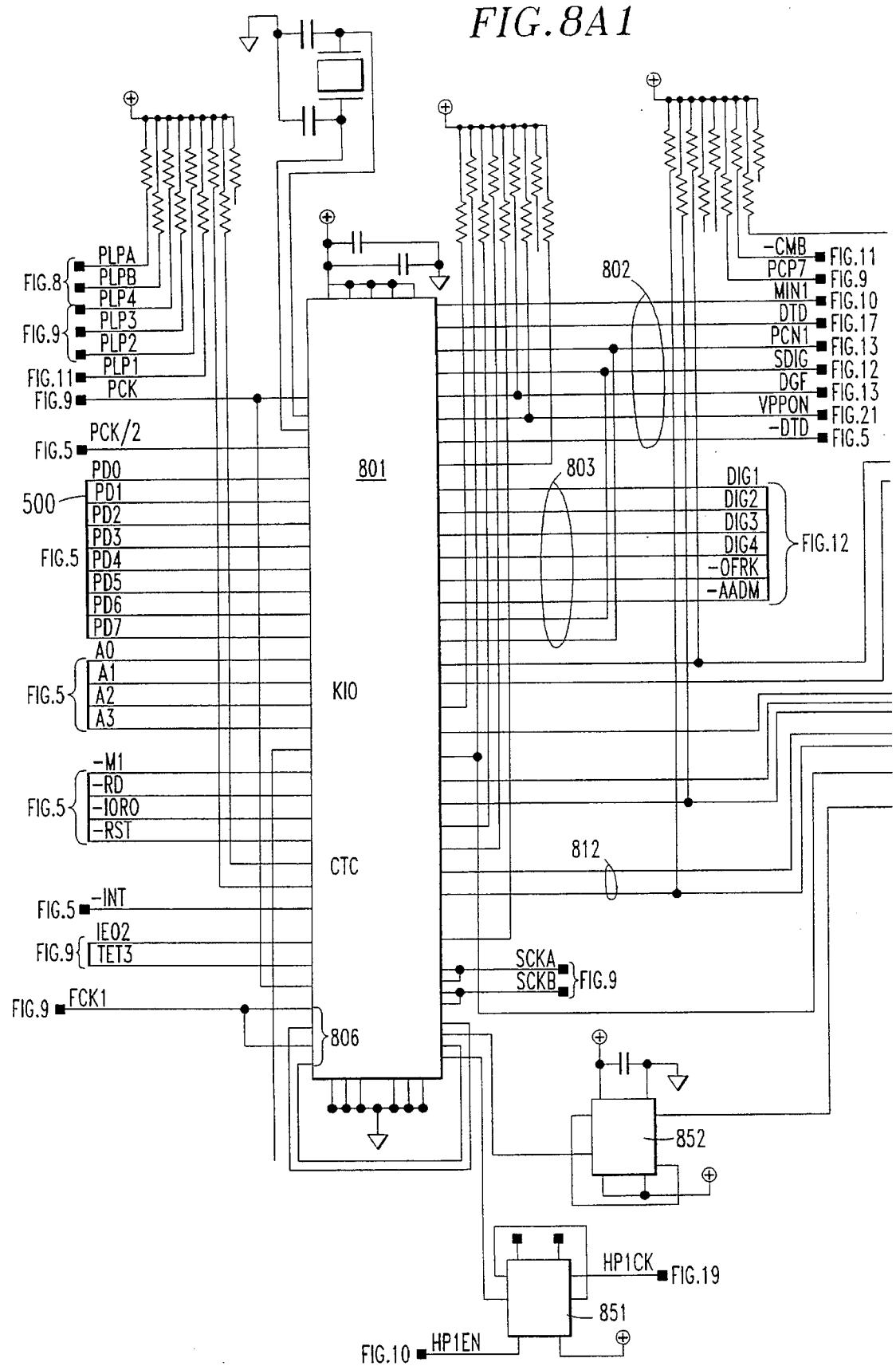
FIG. 8A1

FIG. 8A2
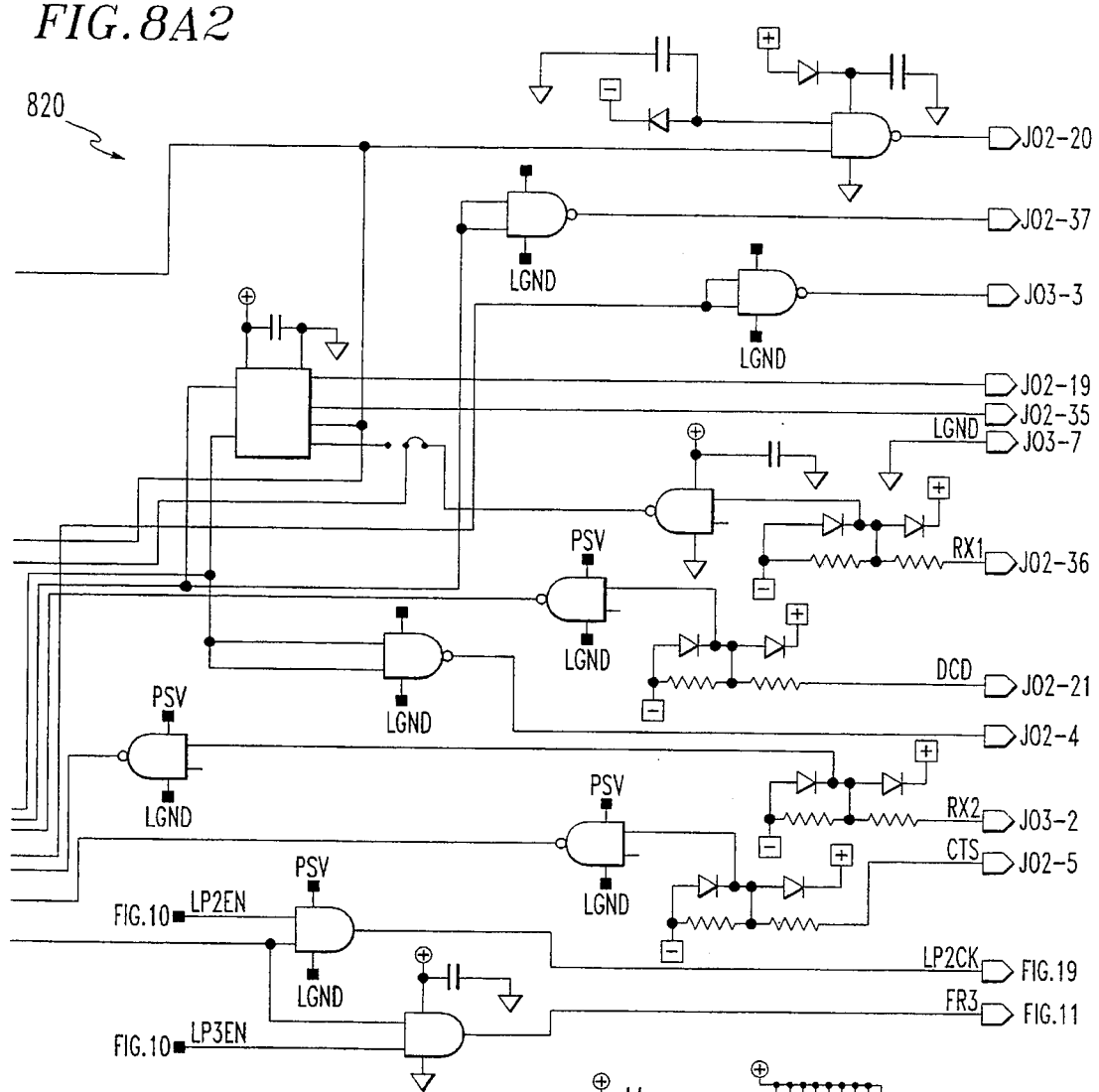
FIG. 8B
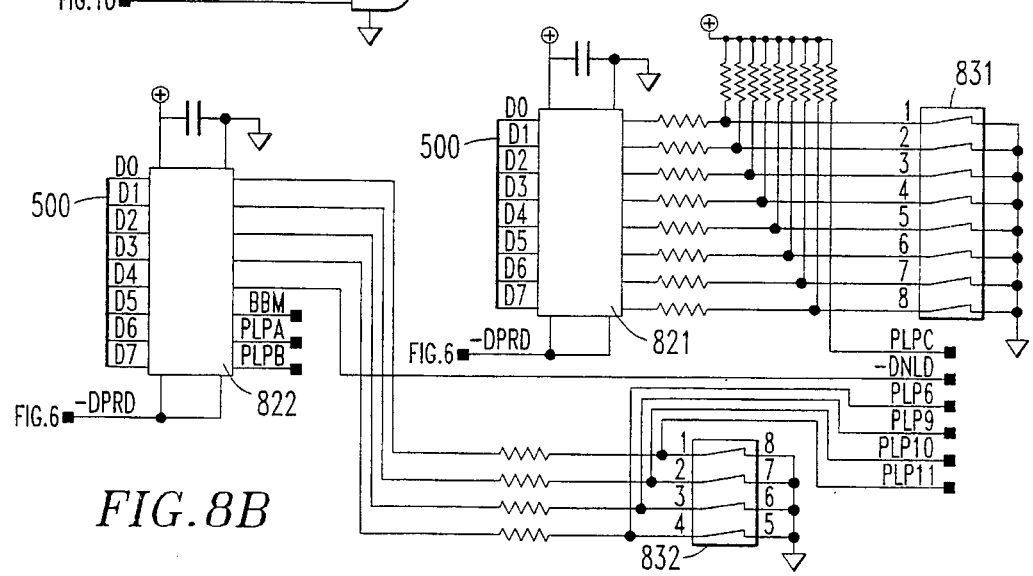

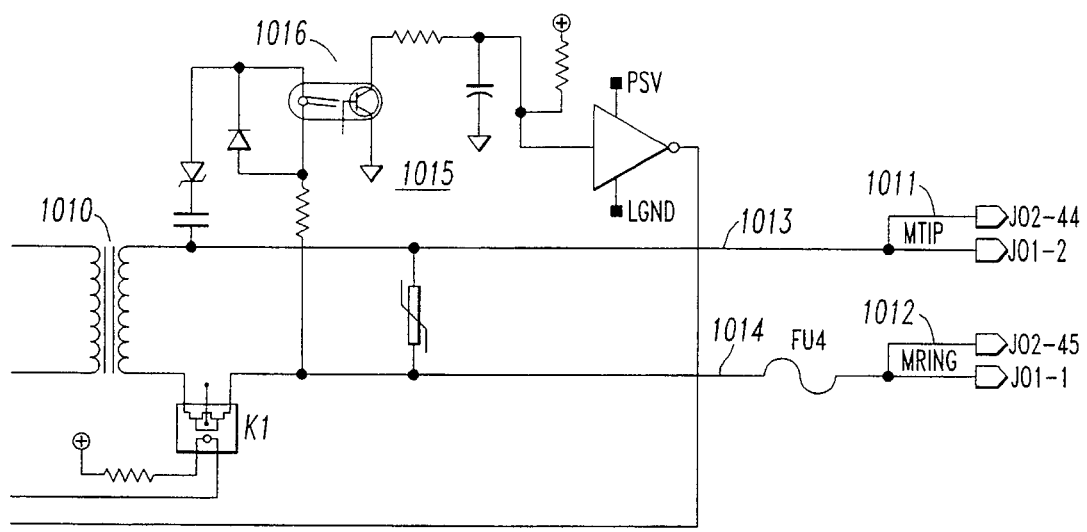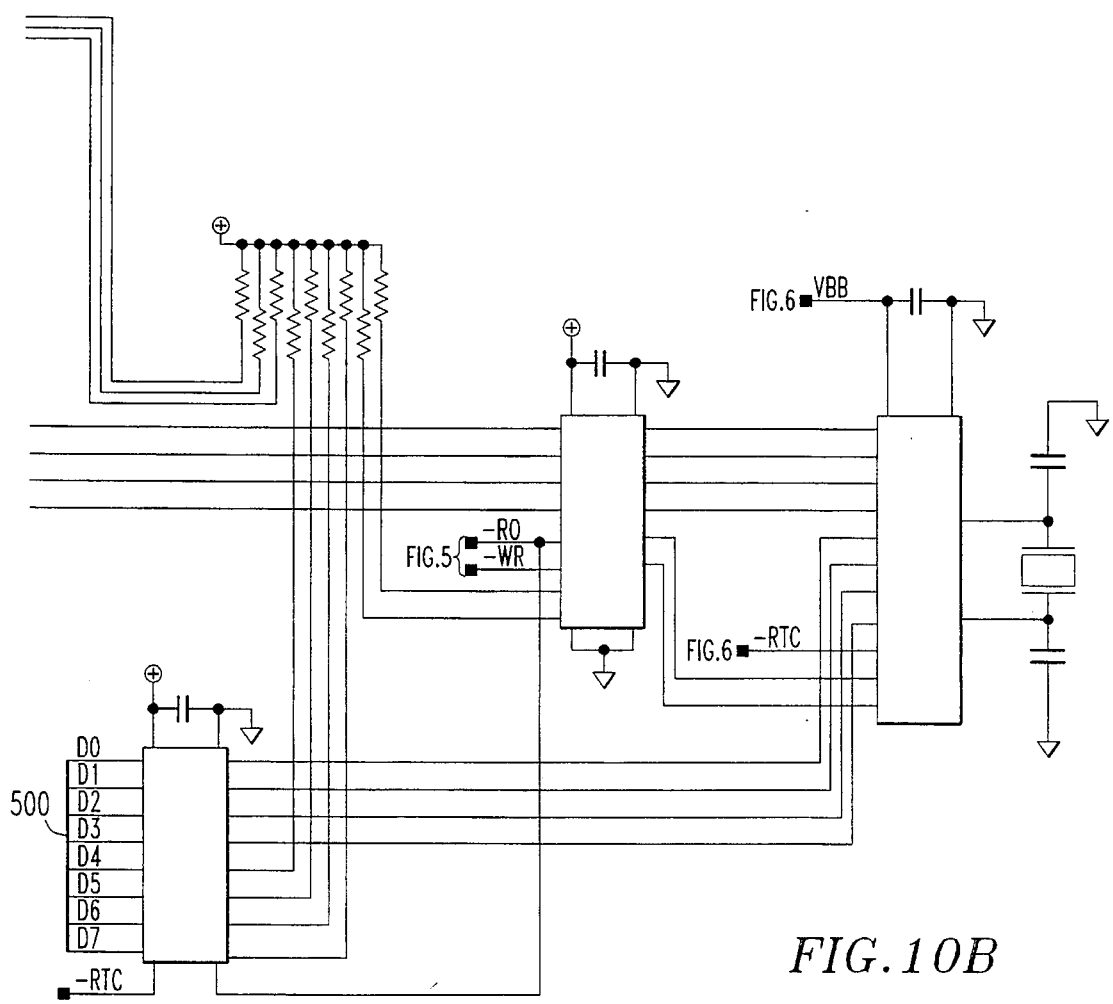
FIG. 10B

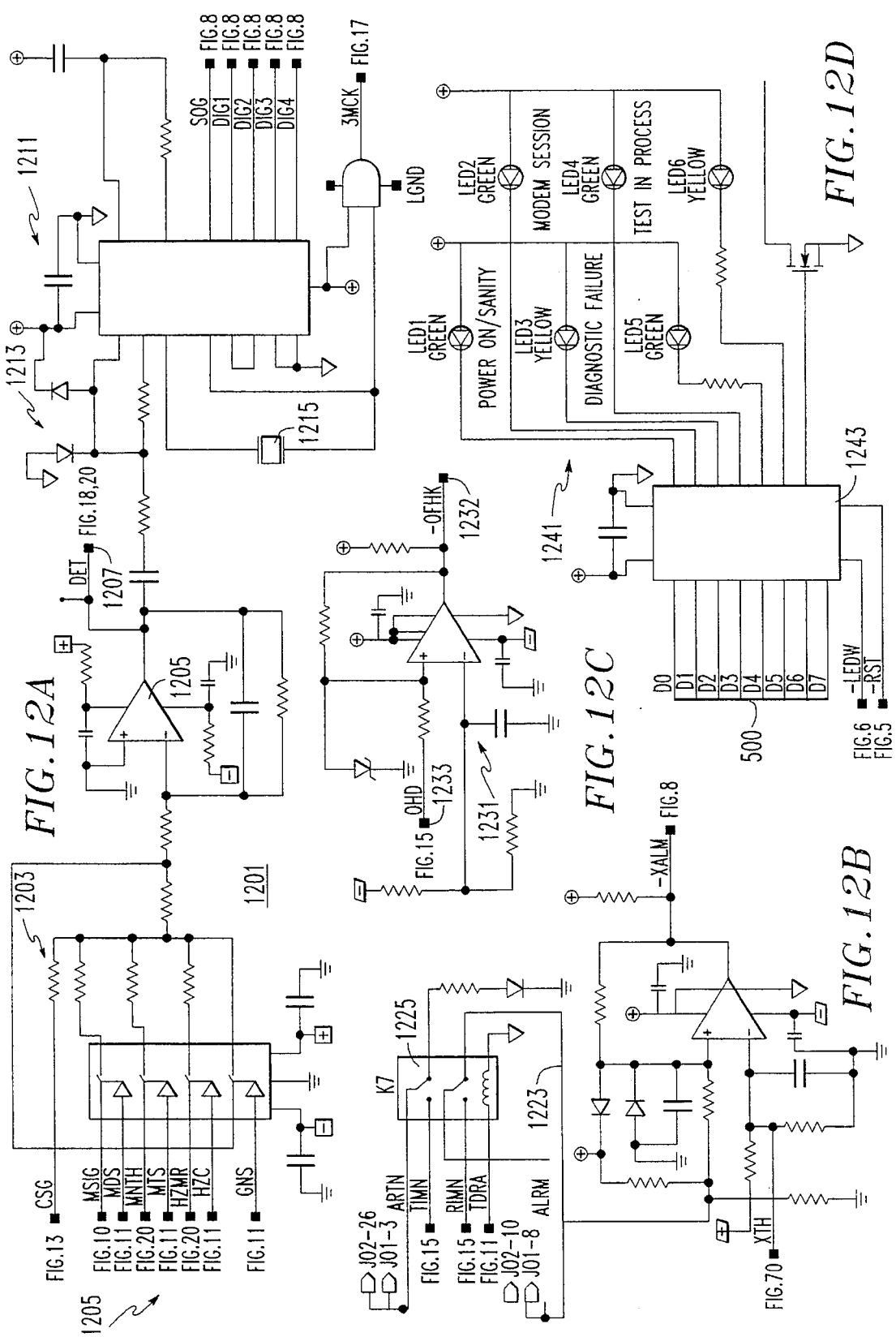

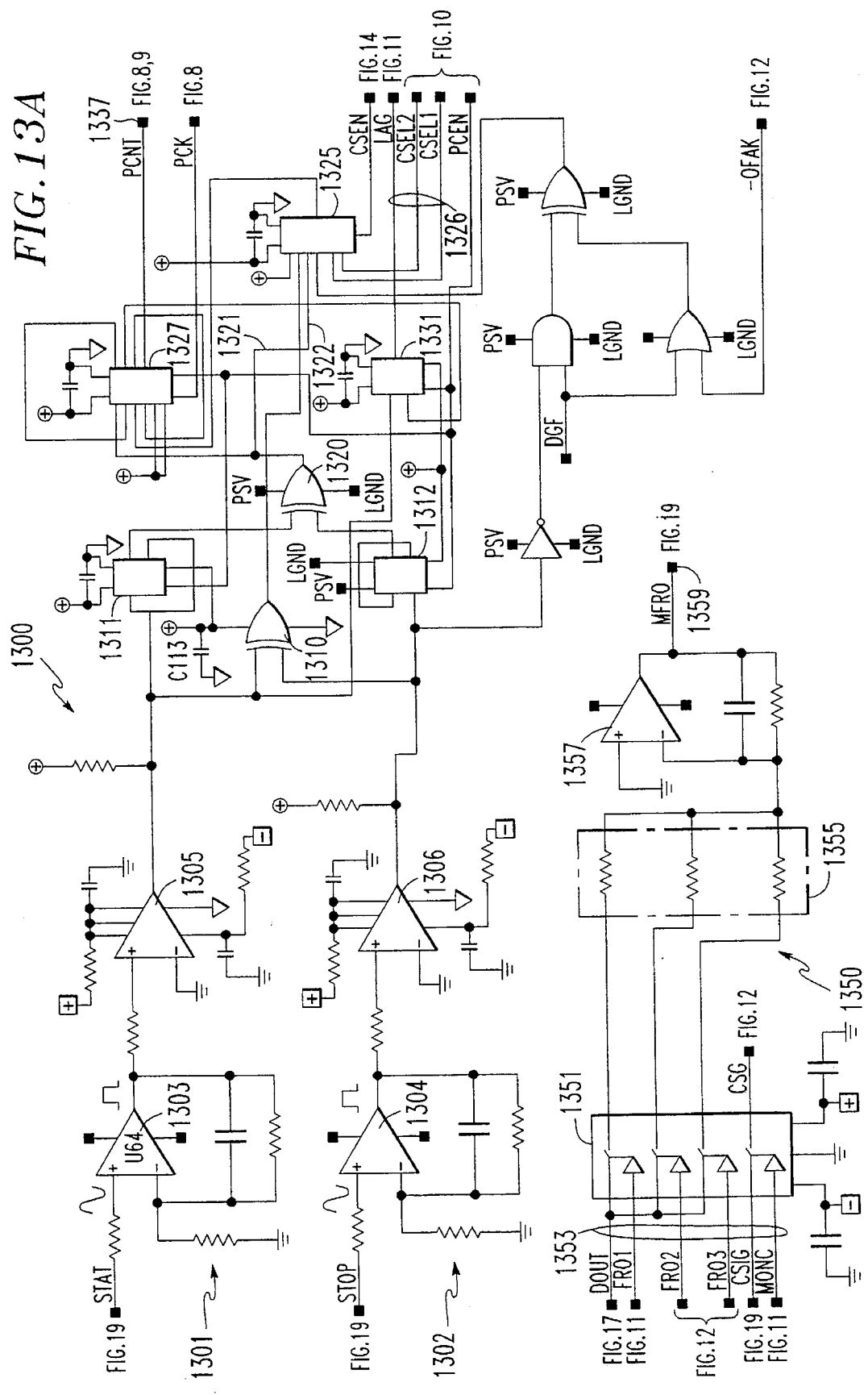

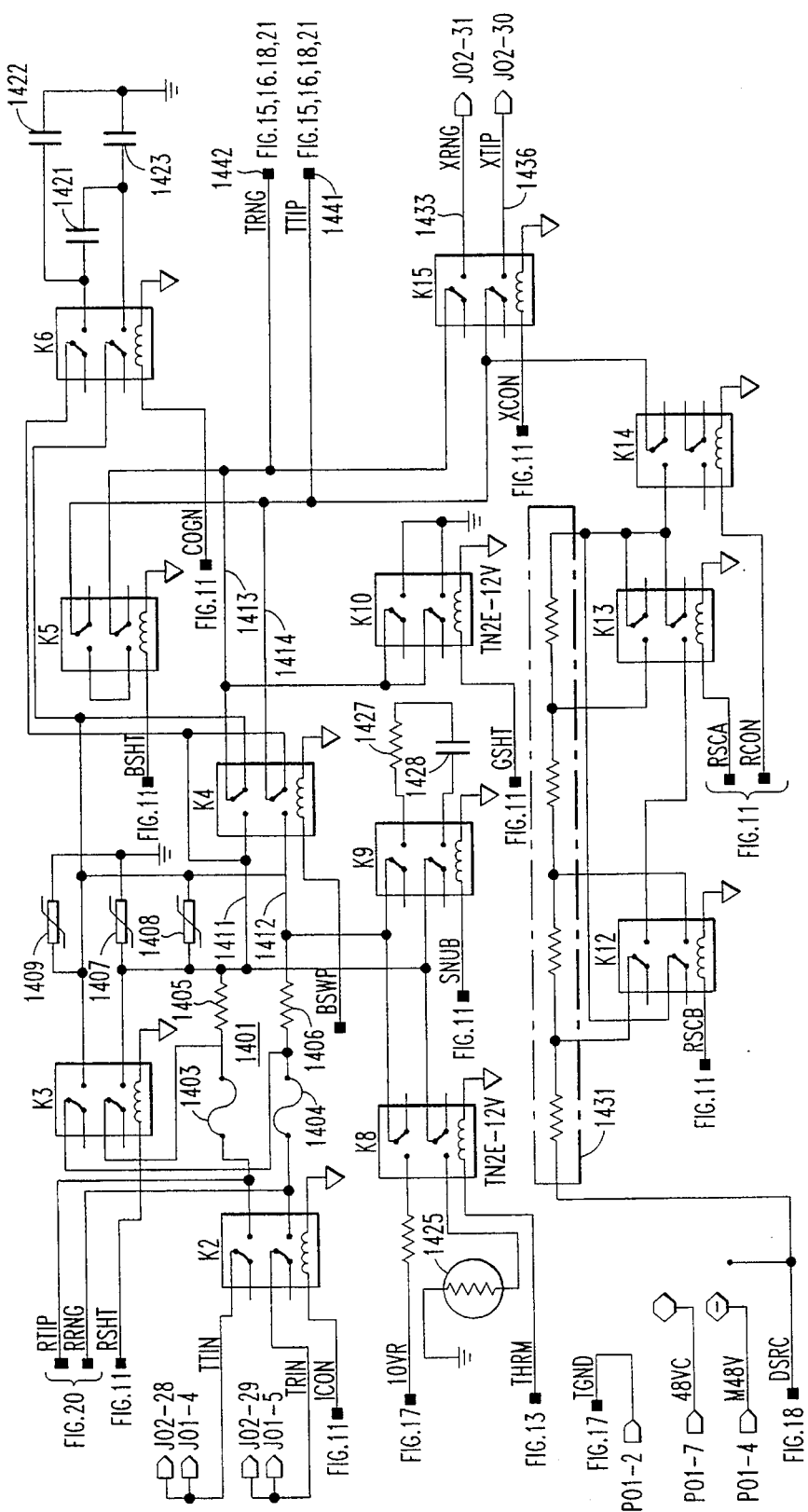
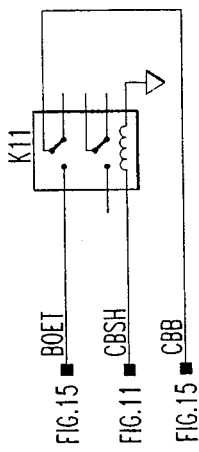
FIG. 14A
FIG. 14B

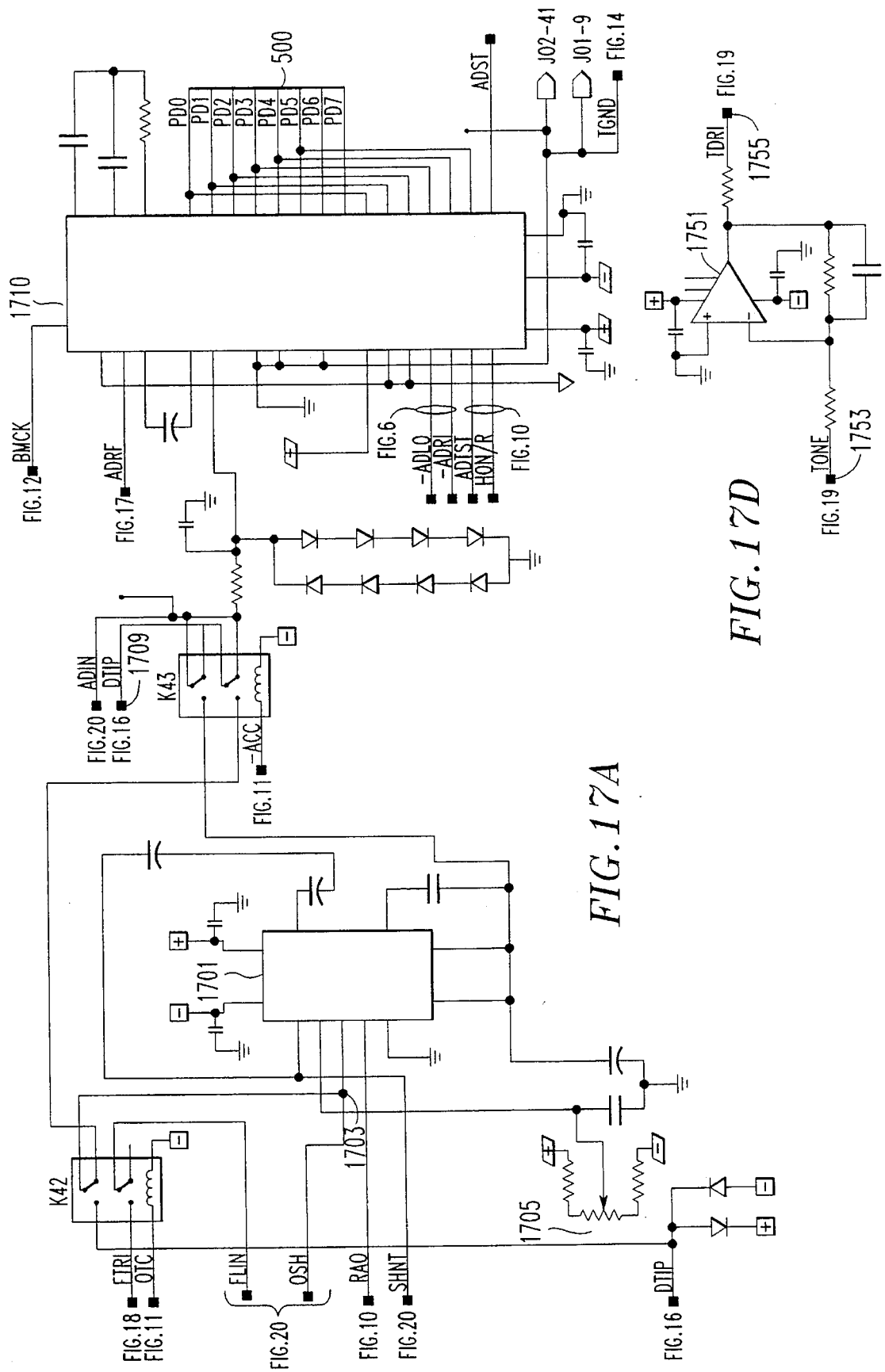

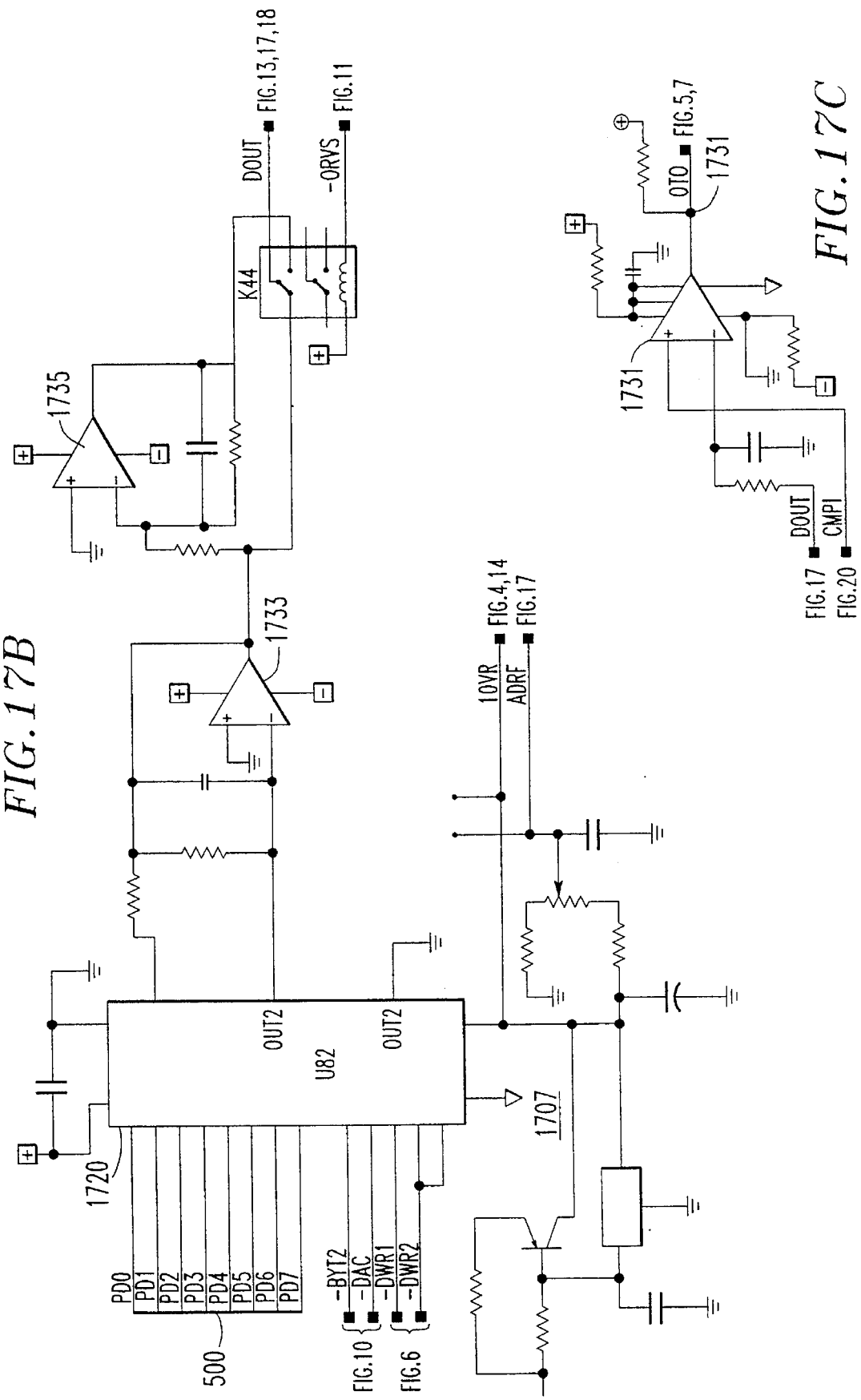

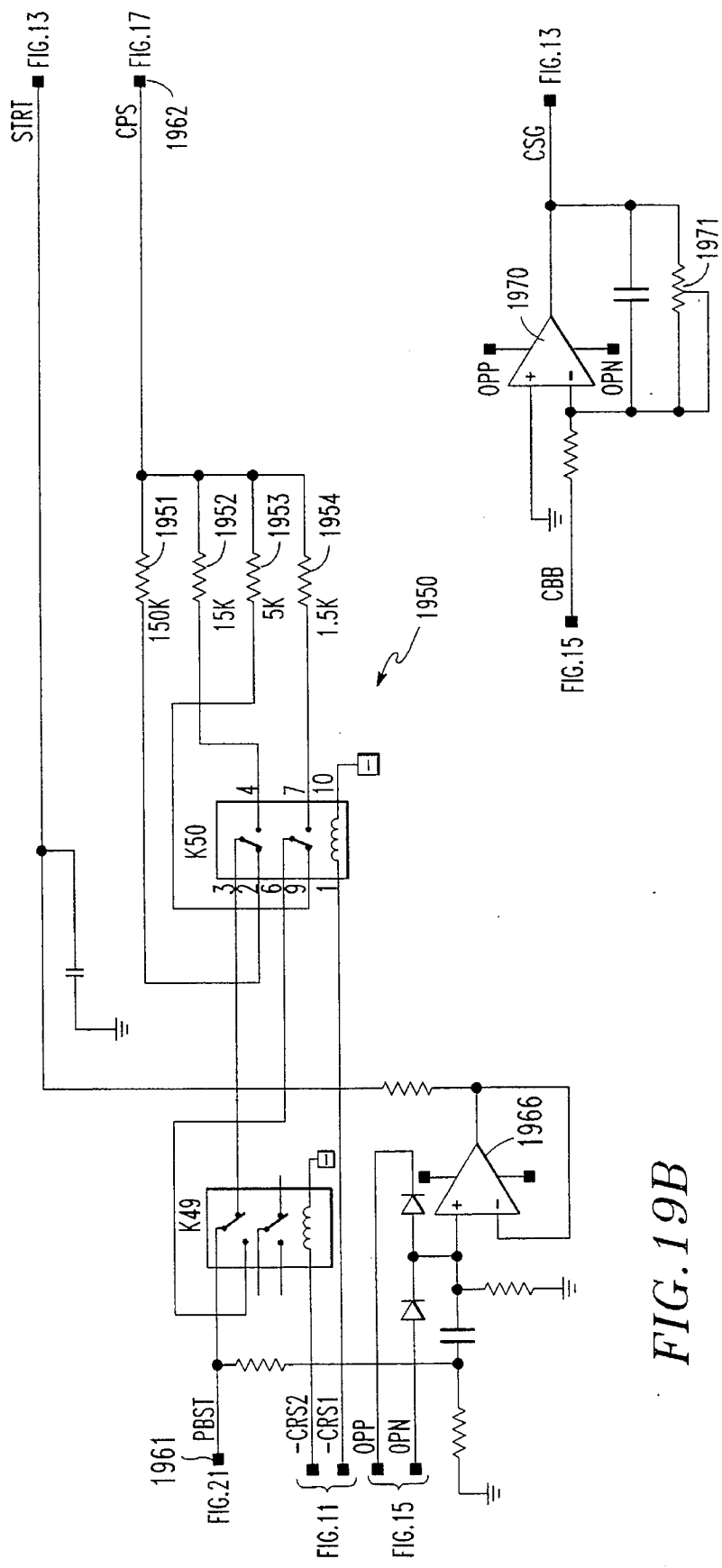

DC VOLTAGE MEASUREMENT

AC VOLTAGE MEASUREMENT

DC CURRENT MEASUREMENT

AC CURRENT MEASUREMENT

DC RESISTANCE MEASUREMENT

CAPACITANCE/AC RESISTANCE MEASUREMENT

TRANSMISSION LEVEL MEASUREMENT

DIAL TONE DETECTION

ROTARY DIAL ANALYSIS

DTMF DETECTION

CALLBACK FUNCTIONS
TALK

MONITOR

HOLD

TONE GENERATOR

*RING TEST*

*OFF-HOOK DETECTION*

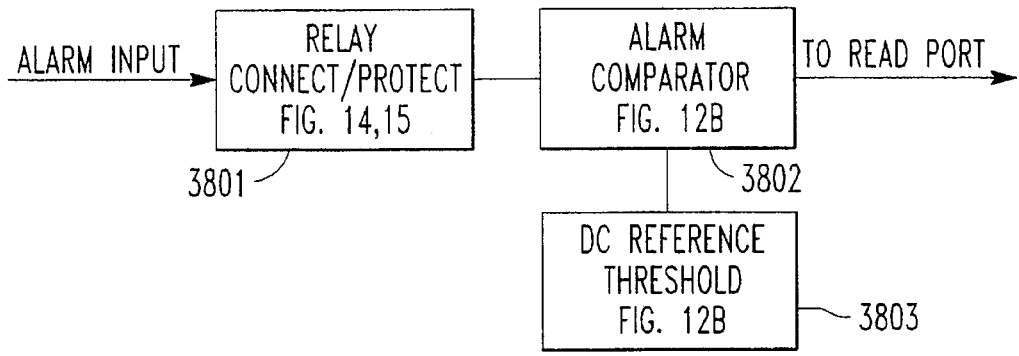

*FIG. 38*
ALARM CONTACT CLOSURE DETECTION

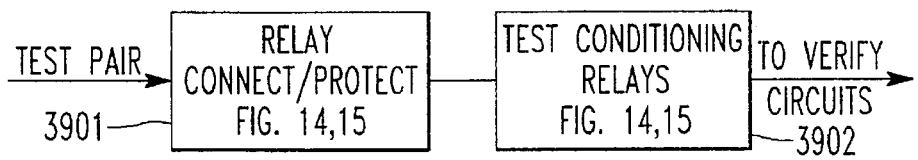

*FIG. 39*
MAU LINE CONDITIONING FUNCTIONS

| PIN # | NAME | DESCRIPTION |
|---|---|---|
| 1 | M48V | -48 VOLT BATTERY |
| 2 | TGND | TEST GROUND |
| 3 | RGN2 | RING GENERATOR 2 |
| 4 | M48V | -48 VOLT BATTERY |
| 5 | RGN1 | RING GENERATOR 1 |
| 6 | 48VC | 48 VOLT COMMON |
| 7 | 48VC | 48 VOLT COMMON |
| 8 | RGND | RING GENERATOR GROUND |
| 9 | RGND | RING GENERATOR GROUND |

*FIG. 40*
P01

| PIN # | NAME | DESCRIPTION |
|---|---|---|
| 1 | TMON | MONITOR PAIR TIP |
| 2 | MTIP | MODEM TIP |
| 3 | ARTN | ALARM RETURN |
| 4 | TTIN | TEST PAIR TIP |
| 5 | TRIN | TEST PAIR RING |
| 6 | RMON | MONITOR PAIR RING |
| 7 | MRING | MODEM RING |
| 8 | ALRM | ALARM |
| 9 | TGND | TEST GROUND |

*FIG. 41*
J01

| PIN # | NAME | DESCRIPTION |
|---|---|---|
| 1 | P5V | +5 VOLT RAIL |
| 2 | LGND | LOGIC GROUND |
| 3 | -XRST | EXTERNAL RESET |
| 4 | RTS | EXPANSION PORT REQUEST TO SEND |
| 5 | CTS | EXPANSION PORT CLEAR TO SEND |
| 6 | -SX1 | EXTERNAL SELECT 1 |
| 7 | MCR1 | MINIPROBE CONTROL 1 |
| 8 | AGND | ANALOG GROUND |
| 9 | FILI | BANDPASS FILTER INPUT |
| 10 | ALRM | ALARM |
| 11 | -CMB | MINIPROBE ID BIT |
| 12 | TMON | MONITOR PAIR TIP |
| 13 | RMON | MONITOR PAIR RING |
| 14 | XIN | EXTERNAL MEASUREMENT INPUT |
| 15 | XOUT | EXTERNAL MEASUREMENT OUTPUT |
| 16 | M48V | -48 VOLT BATTERY |
| 17 | P15V | +15 VOLT RAIL |
| 18 | LGND | LOGIC GROUND |
| 19 | +COM | RS-422 +COMMUNICATION |
| 20 | TX1 | EXPANSION PORT TRANSMIT |
| 21 | DCD | EXPANSION PORT DATA CARRIER DETECT |
| 22 | -SX2 | EXTERNAL SELECT 2 |
| 23 | MCR2 | MINIPROBE CONTROL 2 |
| 24 | AGND | ANALOG GROUND |
| 25 | FILO | BANDPASS FILTER OUTPUT |
| 26 | ARTN | ALARM RETURN |
| 27 | - | |
| 28 | TTIN | TEST PAIR TIP |
| 29 | TRIN | TEST PAIR RING |
| 30 | XTIP | EXTERNAL TIP |
| 31 | XRNG | EXTERNAL RING |
| 32 | 48VC | 48 VOLT COMMON |
| 33 | M15V | -15 VOLT RAIL |
| 34 | LGND | LOGIC GROUND |
| 35 | -COM | RS-422 -COMMUNICATION |
| 36 | RX1 | EXPANSION PORT RECEIVE |
| 37 | DTR | EXPANSION PORT DATA TERMINAL READY |
| 38 | -SX3 | EXTERNAL SELECT 3 |
| 39 | MCR3 | MINIPROBE CONTROL 3 |
| 40 | AGND | ANALOG GROUND |
| 41 | TGND | TEST GROUND |
| 42 | CNET | CAPACITOR FILTER NETWORK |
| 43 | - | |
| 44 | MTIP | MODEM TIP |
| 45 | MRING | MODEM RING |
| 46 | RGN1 | RING GENERATOR 1 |
| 47 | RGN2 | RING GENERATOR 2 |
| 48 | - | |

FIG. 42
J02

| PIN # | NAME | DESCRIPTION |
|---|---|---|
| 1 | – | |
| 2 | RX2 | LOCAL PORT RECEIVE |
| 3 | TX2 | LOCAL PORT TRANSMIT |
| 4 | – | |
| 5 | – | |
| 6 | – | |
| 7 | LGND | LOGIC GROUND |
| 8 | – | |
| 9 | – | |
| 10 | – | |
| 11 | – | |
| 12 | – | |
| 13 | – | |
| 14 | – | |
| 15 | – | |
| 16 | – | |
| 17 | – | |
| 18 | – | |
| 19 | – | |
| 20 | – | |
| 21 | – | |
| 22 | – | |
| 23 | – | |
| 24 | – | |
| 25 | – | |

FIG. 43
J03

| PIN # | NAME | DESCRIPTION |
|---|---|---|
| 1 | P5V | +5 VOLT RAIL |
| 2 | LGND | LOGIC GROUND |
| 3 | P15V | +15 VOLT RAIL |
| 4 | LGND | LOGIC GROUND |
| 5 | M15V | −15 VOLT RAIL |
| 6 | – | |
| 7 | LGND | LOGIC GROUND |
| 8 | LGND | LOGIC GROUND |
| 9 | – | |
| 10 | M100V | −100 VOLT RAIL |
| 11 | LGND | LOGIC GROUND |
| 12 | P100V | +100 VOLT RAIL |

FIG. 44
J04

MEMORY MAP (WITH −MREQ LOW)

| ADDRESS (HEX)/SPACE/USE | MMD0 | MMD1 | MMD2 | MMD3 | MMD4 | MMD5 | MMD6 | A13 | A14 | A15 | DNLD | MA16 | MA15 | MA14 | RCE | RCSL | MCE | MSL2 | MSL1 |
|---|---|---|---|---|---|---|---|---|---|---|---|---|---|---|---|---|---|---|---|
| SYSTEM: | | | | | | | | | | | | | | | | | | | |
| 0000-7FFF/32KX8/COMMON | X | X | X | X | X | X | X | 0 | 0 | 1 | | 0 | 0 | 0 | 1 | 0 | 0 | 0 | 0 |
|  | X | X | X | X | X | X | X | X | 1 | 0 | 1 | 0 | 0 | 1 | 1 | 0 | 0 | 0 | 0 |
| 8000-BFFF/16KX8/BANK 0 | X | X | 0 | 0 | 0 | 0 | 0 | X | 0 | 1 | 1 | 0 | 1 | 0 | 1 | 0 | 0 | 0 | 0 |
| 8000-BFFF/16KX8/BANK 1 | X | X | 1 | 0 | 0 | 0 | 0 | X | 0 | 1 | 1 | 0 | 1 | 1 | 1 | 0 | 0 | 0 | 0 |
| 8000-BFFF/16KX8/BANK 2 | X | X | 0 | 1 | 0 | 0 | 0 | X | 0 | 1 | 1 | 1 | 0 | 0 | 1 | 0 | 0 | 0 | 0 |
| 8000-BFFF/16KX8/BANK 3 | X | X | 1 | 1 | 0 | 0 | 0 | X | 0 | 1 | 1 | 1 | 0 | 1 | 1 | 0 | 0 | 0 | 0 |
| 8000-BFFF/16KX8/BANK 4 | X | X | 0 | 0 | 1 | 0 | 0 | X | 0 | 1 | 1 | 1 | 1 | 0 | 1 | 0 | 0 | 0 | 0 |
| 8000-BFFF/16KX8/BANK 5 | X | X | 1 | 0 | 1 | 0 | 0 | X | 0 | 1 | 1 | 1 | 1 | 1 | 1 | 0 | 0 | 0 | 0 |
| 8000-BFFF/16KX8/BANK 6 | X | X | 0 | 1 | 1 | 0 | 0 | X | 0 | 1 | 1 | 0 | 0 | 0 | 1 | 0 | 0 | 0 | 1 |
| 8000-BFFF/16KX8/BANK 7 | X | X | 1 | 1 | 1 | 0 | 0 | X | 0 | 1 | 1 | 0 | 0 | 1 | 1 | 0 | 0 | 0 | 1 |
| 8000-BFFF/16KX8/BANK 8 | X | X | 0 | 0 | 0 | 1 | 0 | X | 0 | 1 | 1 | 0 | 1 | 0 | 1 | 0 | 0 | 0 | 1 |
| 8000-BFFF/16KX8/BANK 9 | X | X | 1 | 0 | 0 | 1 | 0 | X | 0 | 1 | 1 | 0 | 1 | 1 | 1 | 0 | 0 | 0 | 1 |
| 8000-BFFF/16KX8/BANK 10 | X | X | 0 | 1 | 0 | 1 | 0 | X | 0 | 1 | 1 | 1 | 0 | 0 | 1 | 0 | 0 | 0 | 1 |
| 8000-BFFF/16KX8/BANK 11 | X | X | 1 | 1 | 0 | 1 | 0 | X | 0 | 1 | 1 | 1 | 0 | 1 | 1 | 0 | 0 | 0 | 1 |
| 8000-BFFF/16KX8/BANK 12 | X | X | 0 | 0 | 1 | 1 | 0 | X | 0 | 1 | 1 | 1 | 1 | 0 | 1 | 0 | 0 | 0 | 1 |
| 8000-BFFF/16KX8/BANK 13 | X | X | 1 | 0 | 1 | 1 | 0 | X | 0 | 1 | 1 | 1 | 1 | 1 | 1 | 0 | 0 | 0 | 1 |
| 8000-BFFF/16KX8/BANK 14 | X | X | 0 | 1 | 1 | 1 | 0 | X | 0 | 1 | 1 | 0 | 0 | 0 | 1 | 0 | 0 | 1 | 0 |
| 8000-BFFF/16KX8/BANK 15 | X | X | 1 | 1 | 1 | 1 | 0 | X | 0 | 1 | 1 | 0 | 0 | 1 | 1 | 0 | 0 | 1 | 0 |
| 8000-BFFF/16KX8/BANK 16 | X | X | 0 | 0 | 0 | 0 | 1 | X | 0 | 1 | 1 | 0 | 1 | 0 | 1 | 0 | 0 | 1 | 0 |
| 8000-BFFF/16KX8/BANK 17 | X | X | 1 | 0 | 0 | 0 | 1 | X | 0 | 1 | 1 | 0 | 1 | 1 | 1 | 0 | 0 | 1 | 0 |
| 8000-BFFF/16KX8/BANK 18 | X | X | 0 | 1 | 0 | 0 | 1 | X | 0 | 1 | 1 | 1 | 0 | 0 | 1 | 0 | 0 | 1 | 0 |
| 8000-BFFF/16KX8/BANK 19 | X | X | 1 | 1 | 0 | 0 | 1 | X | 0 | 1 | 1 | 1 | 0 | 1 | 1 | 0 | 0 | 1 | 0 |
| 8000-BFFF/16KX8/BANK 20 | X | X | 0 | 0 | 1 | 0 | 1 | X | 0 | 1 | 1 | 1 | 1 | 0 | 1 | 0 | 0 | 1 | 0 |
| 8000-BFFF/16KX8/BANK 21 | X | X | 1 | 0 | 1 | 0 | 1 | X | 0 | 1 | 1 | 1 | 1 | 1 | 1 | 0 | 0 | 1 | 0 |
| 8000-BFFF/16KX8/BANK 22 | X | X | 0 | 1 | 1 | 0 | 1 | X | 0 | 1 | 1 | 0 | 0 | 0 | 1 | 0 | 0 | 1 | 1 |
| 8000-BFFF/16KX8/BANK 23 | X | X | 1 | 1 | 1 | 0 | 1 | X | 0 | 1 | 1 | 0 | 0 | 1 | 1 | 0 | 0 | 1 | 1 |
| 8000-BFFF/16KX8/BANK 24 | X | X | 0 | 0 | 0 | 1 | 1 | X | 0 | 1 | 1 | 0 | 1 | 0 | 1 | 0 | 0 | 1 | 1 |
| 8000-BFFF/16KX8/BANK 25 | X | X | 1 | 0 | 0 | 1 | 1 | X | 0 | 1 | 1 | 0 | 1 | 1 | 1 | 0 | 0 | 1 | 1 |
| 8000-BFFF/16KX8/BANK 26 | X | X | 0 | 1 | 0 | 1 | 1 | X | 0 | 1 | 1 | 1 | 0 | 0 | 1 | 0 | 0 | 1 | 1 |
| 8000-BFFF/16KX8/BANK 27 | X | X | 1 | 1 | 0 | 1 | 1 | X | 0 | 1 | 1 | 1 | 0 | 1 | 1 | 0 | 0 | 1 | 1 |
| 8000-BFFF/16KX8/BANK 28 | X | X | 0 | 0 | 1 | 1 | 1 | X | 0 | 1 | 1 | 1 | 1 | 0 | 1 | 0 | 0 | 1 | 1 |
| 8000-BFFF/16KX8/BANK 29 | X | X | 1 | 0 | 1 | 1 | 1 | X | 0 | 1 | 1 | 1 | 1 | 1 | 1 | 0 | 0 | 1 | 1 |
| C000-DFFF/8KX8/STACK | X | X | X | X | X | X | X | 0 | 1 | 1 | 1 | 0 | 0 | 0 | 0 | 0 | 1 | 0 | 0 |
| E000-FFFF/8KX8/BANK 0 | 0 | 0 | X | X | X | X | X | 1 | 1 | 1 | 1 | 0 | 0 | 1 | 0 | 0 | 1 | 0 | 0 |
| E000-FFFF/8KX8/BANK 1 | 1 | 0 | X | X | X | X | X | 1 | 1 | 1 | 1 | 0 | 1 | 0 | 0 | 0 | 1 | 0 | 0 |
| E000-FFFF/8KX8/BANK 2 | 0 | 1 | X | X | X | X | X | 1 | 1 | 1 | 1 | 0 | 1 | 1 | 0 | 0 | 1 | 0 | 0 |

*FIG. 45*

| ADDRESS (HEX)/SPACE/USE | MMD0 | MMD1 | MMD2 | MMD3 | MMD4 | MMD5 | MMD6 | A13 | A14 | A15 | DNLD | MA16 | MA15 | MA14 | RCE | RCSL | MCE | MSL2 | MSL1 |
|---|---|---|---|---|---|---|---|---|---|---|---|---|---|---|---|---|---|---|---|
| DOWNLOADED: | | | | | | | | | | | | | | | | | | | |
| 0000-7FFF/32KX8/COMMON | X | X | X | X | X | X | X | 0 | 0 | 0 | 0 | 0 | 0 | 0 | 1 | 0 | 0 | 1 | 0 |
|  | X | X | X | X | X | X | X | 1 | 0 | 0 | 0 | 0 | 0 | 1 | 1 | 0 | 0 | 1 | 0 |
| 8000-BFFF/16KX8/BANK 0 | X | X | 0 | 0 | 0 | 0 | X | 0 | 1 | 0 | 0 | 0 | 1 | 0 | 1 | 0 | 0 | 1 | 0 |
| 8000-BFFF/16KX8/BANK 1 | X | X | 1 | 0 | 0 | 0 | X | 0 | 1 | 0 | 0 | 0 | 1 | 1 | 1 | 0 | 0 | 1 | 0 |
| 8000-BFFF/16KX8/BANK 2 | X | X | 0 | 1 | 0 | 0 | X | 0 | 1 | 0 | 0 | 1 | 0 | 0 | 1 | 0 | 0 | 1 | 0 |
| 8000-BFFF/16KX8/BANK 3 | X | X | 1 | 1 | 0 | 0 | X | 0 | 1 | 0 | 0 | 1 | 0 | 1 | 1 | 0 | 0 | 1 | 0 |
| 8000-BFFF/16KX8/BANK 4 | X | X | 0 | 0 | 1 | 0 | X | 0 | 1 | 0 | 0 | 1 | 1 | 0 | 1 | 0 | 0 | 1 | 0 |
| 8000-BFFF/16KX8/BANK 5 | X | X | 1 | 0 | 1 | 0 | X | 0 | 1 | 0 | 0 | 1 | 1 | 1 | 1 | 0 | 0 | 1 | 0 |
| 8000-BFFF/16KX8/BANK 6 | X | X | 0 | 1 | 1 | 0 | X | 0 | 1 | 0 | 0 | 0 | 0 | 0 | 1 | 0 | 0 | 1 | 1 |
| 8000-BFFF/16KX8/BANK 7 | X | X | 1 | 1 | 1 | 0 | X | 0 | 1 | 0 | 0 | 0 | 0 | 1 | 1 | 0 | 0 | 1 | 1 |
| 8000-BFFF/16KX8/BANK 8 | X | X | 0 | 0 | 0 | 1 | X | 0 | 1 | 0 | 0 | 0 | 1 | 0 | 1 | 0 | 0 | 1 | 1 |
| 8000-BFFF/16KX8/BANK 9 | X | X | 1 | 0 | 0 | 1 | X | 0 | 1 | 0 | 0 | 0 | 1 | 1 | 1 | 0 | 0 | 1 | 1 |
| 8000-BFFF/16KX8/BANK 10 | X | X | 0 | 1 | 0 | 1 | X | 0 | 1 | 0 | 0 | 1 | 0 | 0 | 1 | 0 | 0 | 1 | 1 |
| 8000-BFFF/16KX8/BANK 11 | X | X | 1 | 1 | 0 | 1 | X | 0 | 1 | 0 | 0 | 1 | 0 | 1 | 1 | 0 | 0 | 1 | 1 |
| 8000-BFFF/16KX8/BANK 12 | X | X | 0 | 0 | 1 | 1 | X | 0 | 1 | 0 | 0 | 1 | 1 | 0 | 1 | 0 | 0 | 1 | 1 |
| 8000-BFFF/16KX8/BANK 13 | X | X | 1 | 0 | 1 | 1 | X | 0 | 1 | 0 | 0 | 1 | 1 | 1 | 1 | 0 | 0 | 1 | 1 |
| 8000-BFFF/16KX8/BANK 14 | X | X | 0 | 1 | 1 | 1 | X | 0 | 1 | 0 | 0 | 0 | 0 | 0 | 1 | 0 | 0 | 0 | 0 |
| 8000-BFFF/16KX8/BANK 15 | X | X | 1 | 1 | 1 | 1 | X | 0 | 1 | 0 | 0 | 0 | 0 | 1 | 1 | 0 | 0 | 0 | 0 |
| 8000-BFFF/16KX8/BANK 16 | X | X | 0 | 0 | 0 | 0 | 1 | X | 0 | 1 | 0 | 0 | 1 | 0 | 1 | 0 | 0 | 0 | 0 |
| 8000-BFFF/16KX8/BANK 17 | X | X | 1 | 0 | 0 | 0 | 1 | X | 0 | 1 | 0 | 0 | 1 | 1 | 1 | 0 | 0 | 0 | 0 |
| 8000-BFFF/16KX8/BANK 18 | X | X | 0 | 1 | 0 | 0 | 1 | X | 0 | 1 | 0 | 1 | 0 | 0 | 1 | 0 | 0 | 0 | 0 |
| 8000-BFFF/16KX8/BANK 19 | X | X | 1 | 1 | 0 | 0 | 1 | X | 0 | 1 | 0 | 1 | 0 | 1 | 1 | 0 | 0 | 0 | 0 |
| 8000-BFFF/16KX8/BANK 20 | X | X | 0 | 0 | 1 | 0 | 1 | X | 0 | 1 | 0 | 1 | 1 | 0 | 1 | 0 | 0 | 0 | 0 |
| 8000-BFFF/16KX8/BANK 21 | X | X | 1 | 0 | 1 | 0 | 1 | X | 0 | 1 | 0 | 1 | 1 | 1 | 1 | 0 | 0 | 0 | 0 |
| 8000-BFFF/16KX8/BANK 22 | X | X | 0 | 1 | 1 | 0 | 1 | X | 0 | 1 | 0 | 0 | 0 | 0 | 1 | 0 | 0 | 0 | 1 |
| 8000-BFFF/16KX8/BANK 23 | X | X | 1 | 1 | 1 | 0 | 1 | X | 0 | 1 | 0 | 0 | 0 | 1 | 1 | 0 | 0 | 0 | 1 |
| 8000-BFFF/16KX8/BANK 24 | X | X | 0 | 0 | 0 | 1 | 1 | X | 0 | 1 | 0 | 0 | 1 | 0 | 1 | 0 | 0 | 0 | 1 |
| 8000-BFFF/16KX8/BANK 25 | X | X | 1 | 0 | 0 | 1 | 1 | X | 0 | 1 | 0 | 0 | 1 | 1 | 1 | 0 | 0 | 0 | 1 |
| 8000-BFFF/16KX8/BANK 26 | X | X | 0 | 1 | 0 | 1 | 1 | X | 0 | 1 | 0 | 1 | 0 | 0 | 1 | 0 | 0 | 0 | 1 |
| 8000-BFFF/16KX8/BANK 27 | X | X | 1 | 1 | 0 | 1 | 1 | X | 0 | 1 | 0 | 1 | 0 | 1 | 1 | 0 | 0 | 0 | 1 |
| 8000-BFFF/16KX8/BANK 28 | X | X | 0 | 0 | 1 | 1 | 1 | X | 0 | 1 | 0 | 1 | 1 | 0 | 1 | 0 | 0 | 0 | 1 |
| 8000-BFFF/16KX8/BANK 29 | X | X | 1 | 0 | 1 | 1 | 1 | X | 0 | 1 | 0 | 1 | 1 | 1 | 1 | 0 | 0 | 0 | 1 |
| C000-DFFF/8KX8/STACK | X | X | X | X | X | X | X | 0 | 1 | 1 | 0 | 0 | 0 | 0 | 0 | 0 | 1 | 0 | 0 |
| E000-FFFF/8KX8/BANK 0 | 0 | 0 | X | X | X | X | X | 1 | 1 | 1 | 0 | 0 | 0 | 1 | 0 | 0 | 1 | 0 | 0 |
| E000-FFFF/8KX8/BANK 1 | 1 | 0 | X | X | X | X | X | 1 | 1 | 1 | 0 | 0 | 1 | 0 | 0 | 0 | 1 | 0 | 0 |
| E000-FFFF/8KX8/BANK 2 | 0 | 1 | X | X | X | X | X | 1 | 1 | 1 | 0 | 0 | 1 | 1 | 0 | 0 | 1 | 0 | 0 |
|  | | | | | | | | | | | | | | | | | | | |
| E000-FFFF REAL/TIME CLOCK ENABLE | 1 | 1 | 1 | 1 | 1 | 1 | 1 | 1 | 1 | 1 | X | 0 | 0 | 0 | 0 | 1 | 1 | 0 | 0 |

*FIG. 46*

I/O BIT MAP

| ADDRESS IN HEX | REGISTER MNEMONIC | DESCRIPTION |
|---|---|---|
| 00–1F | IOEN1 | FIRST GROUP OF I/O REGISTERS |
| 20–3F | IOEN2 | SECOND GROUP OF I/O REGISTERS |
| 40–5F | MDEN | MODEM COMMAND/DATA CONTROL |
| 60–7F | CTC1 | CTC #1 CONTROL |
| 80–9F | CTC2 | CTC #2 CONTROL |
| A0–BF | CTC3 | CTC #3 CONTROL |
| C0–DF | CTC4 | CTC #4 CONTROL |
| E0–FF | KIO | KIO CAMMAND/DATA CONTROL |

*FIG. 47*

I/O SEGMENT BREAKDOWN

| ADDRESS IN HEX | REGISTER MNEMONIC | DESCRIPTION |
|---|---|---|
| 00-03 | ADLO (READ) | A/D CONVERTER LOW BYTE |
| 04-07 | ADHI (READ) | A/D CONVERTER HIGH BYTE |
| 08-0B | DSRD (READ) | DIP SWITCH 2 READ REGISTER |
| 0C-0F | MSRD (READ) | MISCELLANEOUS READ REGISTER |
| 10-13 | DPRD (READ) | DIP SWITCH 3 READ REGISTER |
| | | |
| 00-03 | MLCH (WRITE) | MEMORY MAP LATCH |
| 04-07 | DWR1 (WRITE) | DAC WRITE 1 STROBE |
| 08-0B | DWR2 (WRITE) | DAC WRITE 2 STROBE |
| 0C-0F | BRW (WRITE) | BRIDGE WRITE REGISTER |
| 10-13 | BFW (WRITE) | BRIDGE FUNCTIONS WRITE REGISTER |
| 14-17 | XSW (WRITE) | EXTERNAL SOURCE WRITE REGISTER |
| 18-1B | TBW (WRITE) | TEST BUS WRITE REGISTER |
| 1C-1F | TMW (WRITE) | TEST MEASUREMENT WRITE REGISTER |
| 20-23 | TFW (WRITE) | TEST FUNCTIONS WRITE REGISTER |
| 24-27 | ASW (WRITE) | ANALOG SIGNAL WRITE REGISTER |
| 28-2B | TCW (WRITE) | TIME CLOCK WRITE REGISTER |
| 2C-2F | CCW (WRITE) | COUNTER CONTROL WRITE REGISTER |
| 30-33 | CEW (WRITE) | CLOCK ENABLE WRITE REGISTER |
| 34-37 | MIW (WRITE) | MULTIPLE INTERCONNECT WRITE REGISTER |
| 38-3B | WDOG (WRITE) | WATCHDOG TIMER STROBE |
| 3C-3F | LEDW (WRITE) | LED WRITE REGISTER |
| E0 | KIO PORT A (READ/WRITE) | KIO PORT A DATA REGISTER |
| E2 | KIO PORT B (READ/WRITE) | KIO PORT B DATA REGISTER |

*FIG. 48*

REGISTER NAME: ADLO 1710 (FIG. 17A)
REGISTER ADDRESS: I/O READ FROM ADDRESS 00H
DESCRIPTION: A/D CONVERTER LOW BYTE

| BIT # | NAME | RESET STATE | DESCRIPTION |
|---|---|---|---|
| PD0 | B1 | X | A/D CONVERTER DATA BIT 1 |
| PD1 | B2 | X | A/D CONVERTER DATA BIT 2 |
| PD2 | B3 | X | A/D CONVERTER DATA BIT 3 |
| PD3 | B4 | X | A/D CONVERTER DATA BIT 4 |
| PD4 | B5 | X | A/D CONVERTER DATA BIT 5 |
| PD5 | B6 | X | A/D CONVERTER DATA BIT 6 |
| PD6 | B7 | X | A/D CONVERTER DATA BIT 7 |
| PD7 | B8 | X | A/D CONVERTER DATA BIT 8 |

*FIG. 49*

REGISTER NAME: ADHI 1710 (FIG. 17A)
REGISTER ADDRESS: I/O READ FROM ADDRESS 04H
DESCRIPTION: A/D CONVERTER HIGH BYTE

| BIT # | NAME | RESET STATE | DESCRIPTION |
|---|---|---|---|
| PD0 | B9 | X | A/D CONVERTER DATA BIT 9 |
| PD1 | B10 | X | A/D CONVERTER DATA BIT 10 |
| PD2 | B11 | X | A/D CONVERTER DATA BIT 11 |
| PD3 | B12 | X | A/D CONVERTER DATA BIT 12 |
| PD4 | OR | X | A/D CONVERTER OVER-RANGE (HIGH IF OVER-RANGED) |
| PD5 | POL | X | A/D CONVERTER POLARITY (HIGH FOR POSITIVE INPUT) |
| PD6 | --- | X | UNUSED |
| PD7 | --- | X | UNUSED |

*FIG. 50*

REGISTER NAME: DSRD 821 (FIG. 8B)
REGISTER ADDRESS: I/O READ FROM ADDRESS 08H
DESCRIPTION: DIP SWITCH 2 READ REGISTER

| BIT # | NAME | RESET STATE | DESCRIPTION |
|---|---|---|---|
| D0 | S0 | X | IF LOW, THEN THE DIAGNOSTIC TRACE IS ENABLED |
| D1 | S1 | X | SPARE SWITCH |
| D2 | S2 | X | SPARE SWITCH |
| D3 | S3 | X | SPARE SWITCH |
| D4 | S4 | X | SPARE SWITCH |
| D5 | S5 | X | SPARE SWITCH |
| D6 | S6 | X | SPARE SWITCH |
| D7 | S7 | X | IF LOW, THEN LOOP DIAGNOSTICS ARE ENABLED ON POWER-UP |

*FIG. 51*

REGISTER NAME: MSRD 1121 (FIG. 11)
REGISTER ADDRESS: I/O READ FROM ADDRESS 0CH
DESCRIPTION: MISCELLANEOUS READ REGISTER

| BIT # | NAME | RESET STATE | DESCRIPTION |
|---|---|---|---|
| D0 | ADST | X | LOW INDICATES THAT THE A/D CONVERTER IS IN AUTO-ZERO MODE |
| D1 | -LAG | X | LOW INDICATES THAT THE START REFERENCE PULSE LAGS THE STOP PULSE IN CAPACITANCE MEASUREMENTS |
| D2 | SBIT | X | SPARE BIT FROM DIP SWITCH 1 |
| D3 | -CMB | X | LOW INDICATES THAT A MINIPROBE EXPANSION BOARD IS CONNECTED TO THE FALCON SUPERVISOR BOARD |
| D4 | --- | X | UNUSED |
| D5 | --- | X | UNUSED |
| D6 | --- | X | UNUSED |
| D7 | --- | X | UNUSED |

*FIG. 52*

REGISTER NAME: DPRD 822 (FIG. 8B)
REGISTER ADDRESS: I/O READ FROM ADDRESS 10H
DESCRIPTION: DIP SWITCH 3 READ REGISTER

| BIT # | NAME | RESET STATE | DESCRIPTION |
|---|---|---|---|
| D0 | S8 | X | HIGH INDICATES THAT THE -SUPERIMPOSED RING GENERATOR IS CONNECTED |
| D1 | S9 | X | HIGH INDICATES THAT THE +SUPERIMPOSED RING GENERATOR IS CONNECTED |
| D2 | S10 | X | HIGH INDICATES THAT THE MONITOR PAIR CAN BE TESTED FOR THE PRESENCE OF DIAL TONE DURING DIAGNOSTICS |
| D3 | S11 | X | HIGH INDICATES THAT THE SYSTEM SOFTWARE IS DOWNLOADABLE |
| D4 | -DNLD | X | LOW INDICATES DOWNLOAD EXECUTE MODE; HIGH INDICATES SYSTEM MODE |
| D5 | BBM | X | LOW INDICATES BBM CLEAR; HIGH INDICATES VOLATILE MEMORY IS BATTERY BACKED-UP |
| D6 | --- | X | UNUSED |
| D7 | --- | X | UNUSED |

FIG. 53

REGISTER NAME: MLCH 601 (FIG. 6A)
REGISTER ADDRESS: I/O WRITE TO ADDRESS 00H
DESCRIPTION: MEMORY MAP LATCH

| BIT # | NAME | RESET STATE | DESCRIPTION |
|---|---|---|---|
| PD0 | MMD0 | L | MEMORY MAP DATA BIT 0 |
| PD1 | MMD1 | L | MEMORY MAP DATA BIT 1 |
| PD2 | MMD2 | L | MEMORY MAP DATA BIT 2 |
| PD3 | MMD3 | L | MEMORY MAP DATA BIT 3 |
| PD4 | MMD4 | L | MEMORY MAP DATA BIT 4 |
| PD5 | MMD5 | L | MEMORY MAP DATA BIT 5 |
| PD6 | MMD6 | L | MEMORY MAP DATA BIT 6 |
| PD7 | --- | L | UNUSED |

FIG. 54

REGISTER NAME: DWR1 1720 (FIG. 17B)
REGISTER ADDRESS: I/O WRITE TO ADDRESS 04H
DESCRIPTION: DAC WRITE 1 STROBE FOR DAC INPUT LATCH
(SEE-BYT2 LINE IN CCW REGISTER)

| BIT # | NAME | RESET STATE | DESCRIPTION |
|---|---|---|---|
| PD0 | DI4 | X | DAC DATA INPUT 4 |
| PD1 | DI5 | X | DAC DATA INPUT 5 |
| PD2 | DI6 | X | DAC DATA INPUT 6 |
| PD3 | DI7 | X | DAC DATA INPUT 7 |
| PD4 | DI8/DI0 | X | DAC DATA INPUT 8/DAC DATA INPUT 0 |
| PD5 | DI9/DI1 | X | DAC DATA INPUT 9/DAC DATA INPUT 1 |
| PD6 | DI10/DI2 | X | DAC DATA INPUT 10/DAC DATA INPUT 2 |
| PD7 | DI11/DI3 | X | DAC DATA INPUT 11/DAC DATA INPUT 3 |

FIG. 55

REGISTER NAME: DWR2 1720 (FIG. 17B)
REGISTER ADDRESS: I/O WRITE TO ADDRESS 08H
DESCRIPTION: DAC WRITE 2 STROBE FOR TRANSFER OF DATA TO 12-BIT DAC REGISTER

| BIT # | NAME | RESET STATE | DESCRIPTION |
|---|---|---|---|
| PD0 | DI4 | X | DAC DATA INPUT 4 |
| PD1 | DI5 | X | DAC DATA INPUT 5 |
| PD2 | DI6 | X | DAC DATA INPUT 6 |
| PD3 | DI7 | X | DAC DATA INPUT 7 |
| PD4 | DI8/DI0 | X | DAC DATA INPUT 8/DAC DATA INPUT 0 |
| PD5 | DI9/DI1 | X | DAC DATA INPUT 9/DAC DATA INPUT 1 |
| PD6 | DI10/DI2 | X | DAC DATA INPUT 10/DAC DATA INPUT 2 |
| PD7 | DI11/DI3 | X | DAC DATA INPUT 11/DAC DATA INPUT 3 |

FIG. 56

REGISTER NAME: BRW 1105 (FIG. 11)
REGISTER ADDRESS: I/O WRITE TO ADDRESS 0CH
DESCRIPTION: BRIDGE WRITE REGISTER

| BIT # | NAME | RESET STATE | DESCRIPTION |
|---|---|---|---|
| D0 | DVDA | L | SEE TABLE 1 FIG. 58 |
| D1 | DVDB | L | SEE TABLE 1 FIG. 58 |
| D2 | DVDC | L | SEE TABLE 1 FIG. 58 |
| D3 | DVDD | L | SEE TABLE 1 FIG. 58 |
| D4 | DVDE | L | SEE TABLE 1 FIG. 58 |
| D5 | 1MEG | L | IF HIGH, THE VOLTAGE BRIDGE IS 1M OHMS |
| D6 | 100K | L | IF HIGH, THE VOLTAGE BRIDGE IS 100K OHMS |
| D7 | BCAP | L | IF HIGH, SMALL CAPACITANCE IS PLACED ACROSS 900K RESISTOR IN VOLTAGE BRIDGE |

FIG. 57

| BRIDGE TYPE – DIVIDER RATIO | DVDE | DVDD | DVDC | DVDB | DVDA | BCON |
|---|---|---|---|---|---|---|
| 10M V BRIDGE – V/1 | 0 | 0 | 0 | 0 | 0 | 0 |
| 10M V BRIDGE – V/10 | 0 | 0 | 0 | 0 | 1 | 0 |
| 10M V BRIDGE – V/100 | 0 | 0 | 0 | 1 | 0 | 0 |
| 10M V BRIDGE – V/1000 | 0 | 0 | 1 | 0 | 0 | 0 |
| 1M V BRIDGE – V/1 | 0 | 0 | 0 | 0 | 1 | 0 |
| 1M V BRIDGE – V/10 | 0 | 0 | 0 | 1 | 0 | 0 |
| 1M V BRIDGE – V/100 | 0 | 0 | 1 | 0 | 0 | 0 |
| 1M V BRIDGE – V/1000 | 0 | 1 | 0 | 0 | 0 | 0 |
| 100K V BRIDGE – V/1 | 0 | 0 | 0 | 0 | 1 | 0 |
| 100K V BRIDGE – V/10 | 0 | 0 | 0 | 1 | 0 | 0 |
| 100K V BRIDGE – V/100 | 0 | 0 | 1 | 0 | 0 | 0 |
| 100K V BRIDGE – V/1000 | 0 | 1 | 0 | 0 | 0 | 0 |
| I BRIDGE – V/1000 | 0 | 0 | 0 | 0 | 0 | 0 |
| I BRIDGE – V/100 | 0 | 0 | 1 | 0 | 0 | 1 |
| I BRIDGE – V/10 | 0 | 1 | 0 | 0 | 1 | 0 |
| I BRIDGE – V/1 | 1 | 0 | 0 | 1 | 0 | 1 |

FIG. 58

REGISTER NAME: BFW 106 (FIG. 11)
REGISTER ADDRESS: I/O WRITE TO ADDRESS 10H
DESCRIPTION: BRIDGE FUNCTIONS WRITE REGISTER

| BIT # | NAME | RESET STATE | DESCRIPTION |
|---|---|---|---|
| D0 | -V/I | L | IF LOW, THE VOLTAGE BRIDGE IS SELECTED; IF HIGH, THE CURRENT BRIDGE IS SELECTED |
| D1 | MSEL | L | IF HIGH, THE MINIPROBE FILETR(S) IS CONNECTED IN LINE WITH THE BRIDGE OUTPUT |
| D2 | DTC | L | SEE TABLE 2 FIG. 60 |
| D3 | ACC | L | SEE TABLE 2 FIG. 60 |
| D4 | BCON | L | SEE TABLE 1 ON FIG. 58 |
| D5 | CRS1 | L | SEE TABLE 3 FIG 61 |
| D6 | CRS2 | L | SEE TABLE 3 FIG 61 |
| D7 | RNGS | L | IF LOW, IT IS POSSIBLE TO CONNECT TEST RING TO BRIDGE; IF HIGH, IT IS POSSIBLE TO MEASURE OTHER VOLTAGES |

*FIG. 59*

TABLE 2

| DTC | ACC | FUNCTION |
|---|---|---|
| 0 | 0 | DC VOLTAGE MEASUREMENT |
| 0 | 1 | AC VOLTAGE MEASUREMENTO |
| 1 | 0 | SINGLE FREQUENCY OR PULSE MEASUREMENT |
| 1 | 1 | FILTERED AC VOLTAGE MEASUREMENT |

*FIG. 60*

TABLE 3

| CRS2 | CRS1 | FUNCTION |
|---|---|---|
| 0 | 0 | 150K CAPACITANCE SOURCE RESISTANCE |
| 0 | 1 | 15K CAPACITANCE SOURCE RESISTANCE |
| 1 | 0 | 5.11K CAPACITANCE SOURCE RESISTANCE |
| 1 | 1 | 1.5K CAPACITANCE SOURCE RESISTANCE |

*FIG. 61*

REGISTER NAME: XSW 1107 (FIG. 11)
REGISTER ADDRESS: I/O WRITE TO ADDRESS 14H
DESCRIPTION: EXTERNAL SOURCE WRITE REGISTER

*FIG. 62*

| BIT # | NAME | RESET STATE | DESCRIPTION |
|---|---|---|---|
| D0 | SX1 | L | IF HIGH, OPEN-COLLECTOR EXTERNAL SELECT LINE 1 IS ACTIVE-LOW |
| D1 | SX2 | L | IF HIGH, OPEN-COLLECTOR EXTERNAL SELECT LINE 2 IS ACTIVE-LOW |
| D2 | SX3 | L | IF HIGH, OPEN-COLLECTOR EXTERNAL SELECT LINE 3 IS ACTIVE-LOW |
| D3 | SRCC | L | IF HIGH, THE DEPENDENT SOURCE OUTPUT IS CONNECTED TO TEST RING |
| D4 | DRVS | L | IF LOW, DAC OUTPUT POLARITY IS NEGATIVE; IF HIGH, DAC OUTPUT POLARITY IS POSITIVE |
| D5 | TDRB | L | IF HIGH, THE ALARM INPUT IS CONNECTED TO THE MONITOR PAIR TRANSFORMER |
| D6 | IFA | L | IF HIGH, IT IS POSSIBLE TO CONNECT THE MINIPROBE CAPACITOR LADDER OUTPUT TO BRIDGE INPUT; IF LOW, IT IS POSSIBLE TO MEASURE OTHER VOLTAGES |
| D7 | XCON | L | IF HIGH, TEST TIP AND TEST RING ARE EXTERNALLY CONNECTED TO A MINIPROBE EXPANSION BOARD |

REGISTER NAME: TBW 1101 (FIG. 11)
REGISTER ADDRESS: I/O WRITE TO ADDRESS 18H
DESCRIPTION: TEST BUS WRITE REGISTER

*FIG. 63*

| BIT # | NAME | RESET STATE | DESCRIPTION |
|---|---|---|---|
| D0 | RSHT | L | IF HIGH, 100 OHM TEST BUS INPUT RESISTORS ARE SHORTED OUT |
| D1 | ICON | L | IF HIGH, THE TEST PAIR IS CONNECTED THROUGH AT THE INPUT |
| D2 | SNUB | L | IF HIGH, THE SNUBBER NETWORK IS PLACED ACROSS TIP AND RING |
| D3 | BSWP | L | IF HIGH, TIP AND RING ARE INTERNALLY SWAPPED |
| D4 | BSHT | L | IF HIGH, TIP AND RING ARE SHORTED TOGETHER |
| D5 | CDGN | L | IF HIGH, DIAGNOSTIC CAPACITORS ARE PLACED ON TEST BUS |
| D6 | GSHT | L | IF HIGH, TEST RING IS SHORTED TO GROUND |
| D7 | CBSH | L | IF HIGH, A LOW-IMPEDANCE MONITOR CONDITION IS ESTABLISHED |

REGISTER NAME: TMW 1102 (FIG. 11)
REGISTER ADDRESS: I/O WRITE TO ADDRESS 1CH
DESCRIPTION: TEST MEASUREMENT WRITE REGISTER

| BIT # | NAME | RESET STATE | DESCRIPTION |
|---|---|---|---|
| D0 | RSCA | L | SEE TABLE 4 FIG. 65 |
| D1 | RSCB | L | SEE TABLE 4 FIG. 65 |
| D2 | RCON | L | IF HIGH, THE SOURCE RESISTANCE IS CONNECTED TO TEST TIP |
| D3 | ACMON | L | IF HIGH, THE TEST BUS TRANSFORMER IS CONNECTED TO THE TEST BUS |
| D4 | TRMC | L | IF LOW, THE TERMINATION RESISTANCE IS CONNECTED ACROSS THE TEST BUS TRANSFORMER SECONDARY; IF HIGH, THE TERMINATION RESISTANCE IS CONNECTED ACROSS THE TEST BUS |
| D5 | TRMD | L | IF HIGH, THE TERMINATION RESISTANCE IS DISCONNECTED |
| D6 | 600T | L | IF LOW, THE TERMINATION RESISTANCE IS 900 OHMS; IF HIGH, THE TERMINATION RESISTANCE IS 600 OHMS |
| D7 | CBMF | L | SEE TABLE 5 FIG. 67 |

*FIG. 64*

TABLE 4

| RSCB | RSCA | FUNCTION |
|---|---|---|
| 0 | 0 | 1M SOURCE RESISTANCE |
| 0 | 1 | 100K SOURCE RESISTANCE |
| 1 | 0 | 10K SOURCE RESISTANCE |
| 1 | 1 | 1K SOURCE RESISTANCE |

*FIG. 65*

REGISTER NAME: TFW 1103 (FIG. 11)
REGISTER ADDRESS: I/O WRITE TO ADDRESS 20H
DESCRIPTION: TEST FUNCTIONS WRITE REGISTER

| BIT # | NAME | RESET STATE | DESCRIPTION |
|---|---|---|---|
| D0 | CBSL | L | SEE TABLE 5 FIG. 67 |
| D1 | GNDST | L | IF HIGH, TEST RING IS CONNECTED THROUGH 200 OHM RESISTOR TO 48 VOLT COMMON LINE |
| D2 | CRG1 | L | IF HIGH, RING GENERATOR 1 IS CONNECTED TO TEST TIP |
| D3 | CRG2 | L | IF HIGH, RING GENERATOR 2 IS CONNECTED TO TEST TIP |
| D4 | PWRLP | L | IF HIGH, TEST TIP IS CONNECTED THROUGH 200 OHM RESISTOR TO -48 VOLT LINE |
| D5 | HZCON | L | SEE TABLE 5 FIG. 67 |
| D6 | TDRA | L | IF HIGH, THE ALARM CIRCUIT IS DISCONNECTED FROM THE ALARM INPUT |
| D7 | MCON | L | IF HIGH, THE MONITOR PAIR IS CONNECTED THROUGH AT THE MONITOR PAIR INPUT |

*FIG. 66*

TABLE 5

| CBMF | CBSL | HZCON | FUNCTION |
|---|---|---|---|
| 0 | 0 | 0 | CAPACITANCE MEASUREMENT |
| 0 | 0 | 1 | HIGH-IMPEDANCE MEASUREMENT ON TEST PAIR |
| 0 | 1 | 0 | UNUSED |
| 0 | 1 | 1 | HIGH-IMPEDANCE MONITOR |
| 1 | 0 | 0 | TONE(S) TO MONITOR PAIR |
| 1 | 0 | 1 | TONE(S) TO MONITOR PAIR |
| 1 | 1 | 0 | TONE(S) TO TEST PAIR |
| 1 | 1 | 1 | TONE(S) TO TEST PAIR AND HIGH-Z MEASUREMENT |

*FIG. 67*

REGISTER NAME: ASW 1104 (FIG. 11)
REGISTER ADDRESS: I/O WRITE TO ADDRESS 24H
DESCRIPTION: ANALOG SIGNAL WRITE REGISTER

| BIT # | NAME | RESET STATE | DESCRIPTION |
|---|---|---|---|
| D0 | MDS | L | IF HIGH, AC SIGNALS FROM THE MODEM ARE CONNECTED TO THE MEASUREMENT CIRCUITRY |
| D1 | MTS | L | IF HIGH, AC SIGNALS FROM THE TEST BUS TRANSFORMER ARE CONNECTED TO THE MEASUREMENT CIRCUITRY |
| D2 | HZC | L | IF HIGH, AC SIGNALS FROM THE HIGH-IMPEDANCE AMPLIFIER ARE CONNECTED TO THE MEASUREMENT CIRCUITRY |
| D3 | GNS | L | IF LOW, THE GAIN OF THE ABOVE SIGNALS IS UNITY; IF HIGH, THE SIGNAL GAIN IS X 10 |
| D4 | MONC | L | IF HIGH, AC SIGNALS FROM THE MONITOR PAIR ARE CONNECTED TO THE MEASUREMENT CIRCUITRY |
| D5 | ASHT | L | IF HIGH, A 100 OHM SHUNT TO GROUND IS PRODUCED AT THE INPUT OF THE RMS-TO-DC CONVERTER |
| D6 | SRCN | L | IF HIGH, THE INDEPENDENT SOURCE OUTPUT IS CONNECTED TO TEST TIP AND THE DEPENDENT SOURCE OUTPUT IS CONNECTED TO THE BANDPASS FILTER |
| D7 | FLTS | L | IF LOW, TEST TIP IS MEASURED; IF HIGH, TEST RING OR OTHER VOLTAGES CAN BE MEASURED |

FIG. 68

REGISTER NAME: TCW 1041 (FIG. 10)
REGISTER ADDRESS: I/O WRITE TO ADDRESS 28H
DESCRIPTION: TIME CLOCK WRITE REGISTER

| BIT # | NAME | RESET STATE | DESCRIPTION |
|---|---|---|---|
| D0 | RA0 | L | REAL TIME CLOCK ADDRESS BIT 0 AND ACTIVE-HIGH RMS-TO-DC CONVERTER CHIP SELECT |
| D1 | RA1 | L | REAL TIME CLOCK ADDRESS BIT 1 AND ACTIVE-HIGH RC NETWORK SWITCH FOR THE LP1 FILTER |
| D2 | RA2 | L | REAL TIME CLOCK ADDRESS BIT 2 AND ACTIVE-HIGH RC NETWORK SWITCH FOR THE HP1 FILTER |
| D3 | RA3 | L | REAL TIME CLOCK ADDRESS BIT 3 AND ACTIVE-HIGH RC NETWORK SWITCH FOR THE LP2 FILTER |
| D4 | PHTM | L | IF HIGH, THE MEMORY IS CONFIGURED FOR EXECUTING THE DOWNLOADED SOFTWARE |
| D5 | RSTR | L | IF HIGH, THE MEMORY IS RESTORED TO THE SYSTEM CONFIGURATION |
| D6 | ADTST | L | IF LOW, ALL A/D CONVERTER OUTPUT BITS ARE FORCED HIGH; IF HIGH, THE A/D CONVERTER IS SET FOR NORMAL OPERATION |
| D7 | RUN/H | L | IF LOW, THE A/D CONVERTER WILL TEMINATE ITS NORMAL OPERATION IN DEINTEGRATE MODE AND WILL HOLD IN AUTO-ZERO MODE; IF HIGH, THE A/D CONVERTER WILL PERFORM NORMAL CONVERSIONS |

FIG. 69

REGISTER NAME: CCW 1042 (FIG. 10)
REGISTER ADDRESS: I/O WRITE TO ADDRESS 2CH
DESCRIPTION: COUNTER CONTROL WRITE REGISTER

| BIT # | NAME | RESET STATE | DESCRIPTION |
|---|---|---|---|
| D0 | CSEL1 | L | SEE TABLE 6 FIG. 71 |
| D1 | CSEL2 | L | SEE TABLE 6 FIG. 71 |
| D2 | -CSEN | L | IF HIGH, THE AVOVE COUNTER FUNCTIONS ARE DISABLED |
| D3 | -DAC | L | IF LOW, THE DAC IS SELECTED |
| D4 | -BYT2 | L | IF HIGH, THE MOST SIGNIFICANT DAC BYTE IS WRITTEN; IF LOW, ONLY THE 4 LEAST SIGNIFICANT DAC BITS ARE WRITTEN |
| D5 | MC1 | L | MINIPROBE EXPANSION BOARD RELAY CONTROL SIGNAL 1 |
| D6 | MC2 | L | MINIPROBE EXPANSION BOARD RELAY CONTROL SIGNAL 2 |
| D7 | MC3 | L | MINIPROBE EXPANSION BOARD RELAY CONTROL SIGNAL 3 |

*FIG. 70*

TABLE 6

| CSEL2 | CSEL1 | FUNCTION |
|---|---|---|
| 0 | 0 | TRACER TONE OR DTMF TONES |
| 0 | 1 | 1/2-CYCLE CAPACITANCE MEASUREMENT |
| 1 | 0 | FULL-CYCLE CAPACITANCE MEASUREMENT |
| 1 | 1 | ROTARY DIAL ANALYSIS OR DTMF TONES |

*FIG. 71*

REGISTER NAME: CEW 1043 (FIG. 10)
REGISTER ADDRESS: I/O WRITE TO ADDRESS 30H
DESCRIPTION: CLOCK ENABLE WRITE REGISTER

*FIG. 72*

| BIT # | NAME | RESET STATE | DESCRIPTION |
|---|---|---|---|
| D0 | FR1EN | L | IF HIGH, THE 1ST FREQUENCY TONE OUTPUT IS ENABLED |
| D1 | FR2EN | L | IF HIGH, THE 2ND FREQUENCY TONE OUTPUT IS ENABLED |
| D2 | FR3EN | L | IF HIGH, THE 3RD FREQUENCY TONE OUTPUT IS ENABLED |
| D3 | TREN | L | IF HIGH, THE TRACER INTERVALS-PER SECOND PULSE IS ENABLED |
| D4 | LP1EN | L | IF HIGH, THE 1ST LOW-PASS FILTER CLOCK IS ENABLED |
| D5 | LP2EN | L | IF HIGH, THE 2ND LOW-PASS FILTER CLOCK IS ENABLED |
| D6 | HP1EN | L | IF HIGH, THE HIGH-PASS FILTER CLOCK IS ENABLED |
| D7 | PCEN | L | IF HIGH, THE PULSE COUNTING CIRCUITRY FOR CAPACITANCE, ROTARY DIAL ANALYSIS AND SINGLE FREQUENCY MEASUREMENTS IS ENABLED |

REGISTER NAME: MIW 1108 (FIG. 11)
REGISTER ADDRESS: I/O WRITE TO ADDRESS 34H
DESCRIPTION: MULTIPLE INTERCONNECT WRITE REGISTER

*FIG. 73*

| BIT # | NAME | RESET STATE | DESCRIPTION |
|---|---|---|---|
| D0 | UGN1 | L | IF UGN1 AND UGN2 ARE BOTH LOW, THE DEPENDENT SOURCE IS SET FOR A GAIN OF X 10; IF UGN1 AND UGN2 ARE BOTH HIGH, THE DEPENDENT SOURCE IS SET FOR UNITY GAIN |
| D1 | UGN2 | L | SEE ABOVE DESCRIPTION (NOTE THAT UGN2 SHOULD BE SET HIGH BEFORE AND MADE LOW AFTER UGN1 |
| D2 | BATM | L | IF LOW, IT IS POSSIBLE TO MEASURE AC SIGNALS; IF HIGH, IT IS POSSIBLE TO MEASURE BATTERY VOLTAGE |
| D3 | THRM | L | IF HIGH, THE THERMISTOR IS PLACED ACROSS TEST PAIR |
| D4 | HLS1 | L | IF HIGH, HIGH-LEVEL TONE IS PLACED ON TEST TIP |
| D5 | HLS2 | L | IF HIGH, HIGH-LEVEL TONE (WHICH IS 180 DEGREES OUT OF PHASE WITH THE TIP-SIDE SIGNAL) IS PLACED ON TEST RING |
| D6 | DTCN | L | IF LOW, IT IS POSSIBLE TO CONNECT THE BANDPASS FILTER OUTPUT TO THE BRIDGE INPUT; IF HIGH, THE MEASUREMENT COMPARATOR IS CONNECTED TO THE A/D INPUT AND IT IS POSSIBLE TO MEASURE OTHER VOLTAGES |
| D7 | RDGN | L | IF HIGH, A 10K DIAGNOSTIC RESISTOR IS PLACED ACROSS TIP AND RING |

REGISTER NAME: LEDW 1243 (FIG. 12D)
REGISTER ADDRESS: I/O WRITE TO ADDRESS 3CH
DESCRIPTION: LED WRITE REGISTER

| BIT # | NAME | RESET STATE | DESCRIPTION |
|---|---|---|---|
| D0 | LD1 | L | IF LOW, LED 1 IS LIT, INDICATING POWER IS ON; FLASHING LIGHT INDICATES SANITY OF PROCESSOR SECTION |
| D1 | LD2 | L | IF LOW, LED 2 IS LIT, INDICATING A MODEM SESSION |
| D2 | LD3 | L | IF LOW, LED 3 IS LIT, INDICATING A DIAGNOSTIC FAILURE; IF A DIAGNOSTIC TEST IS MARGINAL, LED≤ WILL FLASH |
| D3 | LD4 | L | IF LOW, LED 4 IS LIT, INDICATING A TEST IN PROCESS |
| D4 | LD5 | L | IF LOW, LED 5 IS LIT |
| D5 | LD6 | L | IF LOW, LED 6 IS LIT |
| D6 | FTRC | L | IF LOW, THE BANDPASS FILTER IS USABLE INTERNALLY; IF HIGH, THE BANDPASS FILTER CAN BE USED EXTERNALLY |
| D7 | --- | L | UNUSED |

FIG. 74

REGISTER NAME: KIO PORT A 801 (FIG. 8A)
REGISTER ADDRESS: I/O WRITE OR READ TO/FROM ADDRESS E0H
DESCRIPTION: KIO PORT A DATA REGISTER

| BIT # | NAME | RESET STATE | DESCRIPTION |
|---|---|---|---|
| PD0 | MINT | X | HIGH INDICATES AN INTERRUPT REQUEST FROM THE MODEM |
| PD1 | DTD | X | HIGH INDICATES THAT THE DAC THRESHOLD HAS BEEN EXCEEDED BY A MORE POSITIVE VOLTAGE FROM THE TEST BUS |
| PD2 | PCNT | X | PULSE COUNT SIGNAL FROM THE FREQUENCY/PHASE DIFFERENTIAL MEASUREMENT CIRCUITRY |
| PD3 | SDIG | X | HIGH INDICATES THAT VALID DTMF TONES HAVE BEEN RECEIVED |
| PD4 | DGF | L | IF LOW, ROTARY DIAL ANALYSIS IS POSSIBLE; IF HIGH, SINGLE FREQUENCY MEASUREMENT IS POSSIBLE |
| PD5 | VPPON | L | IF HIGH, THE VPP PROGRAMMING VOLTAGE FOR THE FLASH EPROMs IS GENERATED |
| PD6 | -DTD | X | LOW INDICATES THAT THE DAC THRESHOLD HAS BEEN EXCEEDED BY A MORE POSITIVE VOLTAGE FROM THE TEST BUS |
| PD7 | --- | X | UNUSED |

FIG. 75

REGISTER NAME: KIO PORT B 801 (FIG. 8A)
REGISTER ADDRESS: I/O WRITE OR READ TO/FROM ADDRESS E2H
DESCRIPTION: KIO PORT B DATA REGISTER

FIG. 76

| BIT # | NAME | RESET STATE | DESCRIPTION |
|---|---|---|---|
| PD0 | DIG1 | X | DTMF DETECTOR DATA BIT 1 |
| PD1 | DIG2 | X | DTMF DETECTOR DATA BIT 2 |
| PD2 | DIG3 | X | DTMF DETECTOR DATA BIT 3 |
| PD3 | DIG4 | X | DTMF DETECTOR DATA BIT 4 |
| PD4 | -OFHK | X | LOW INDICATES AN OFF-HOOK CONDITION ON THE TEST PAIR |
| PD5 | -XALM | X | LOW INDICATES AN EXTERNAL ALARM CONDITION |
| PD6 | SDIG | X | HIGH INDICATES THAT VALID DTMF TONES HAVE BEEN RECEIVED |
| PD7 | PCNT | X | PULSE COUNT SIGNAL FROM THE FREQUENCY/PHASE DIFFERENTIAL MEASUREMENT CIRCUITRY |

COUNTER FUNCTIONS TABLE *

| CTC# | CHANNEL | VARIOUS FUNCTIONS |
|---|---|---|
| 1 | 0 | PRESCALED ROTARY DIAL ANALYSIS CLOCK |
| 1 | 0&1 | LOWPASS FILTER #1 CLOCK |
| 1 | 2 | PRESCALED CLOCK FOR 20MS SCHEDULERS |
| 1 | 2&3 | PRIMARY 20MS SCHEDULER (TICK) |
| 2 | 0 | PRESCALED CLOCK FOR ALL FILTERS DURING CAPACITANCE |
| 2 | 0&1 | 1ST FREQUENCY TONE |
| 2 | 0&1 | PRESCALED INPUT FOR GENERATING VERY LOW FREQUENCY FOR 2ND FREQUENCY TONE |
| 2 | 2 | SERIAL COMMUNICATION PORT A CLOCK |
| 2 | 3 | 2ND 20MS SCHEDULER |
| 3 | 0 | CAPACITANCE PERIOD COUNTER |
| 3 | 0&1 | ROTARY DIAL ANALYSIS MAKE COUNTER |
| 3 | 0&1&2 | TRACER TONE INTERRUPTS-PER-SECOND PULSE |
| 3 | 1&2&3 | CAPACITANCE PHASE COUNTER |
| 3 | 2&3 | ROTARY DIAL ANALYSIS BREAK TIMER |
| 4 | 0&1 | 2ND FREQUENCY TONE |
| 4 | 2 | SERIAL COMMUNICATION PORT B CLOCK |
| 4 | 3 | 3RD 20MS SCHEDULER |
| KIO | 0&1 | LOWPASS FILTER #2 CLOCK |
| KIO | 0&1 | 3RD FREQUENCY TONE |
| KIO | 2&3 | HIGHPASS FILTER #1 CLOCK |

* - NOTE THAT THESE COUNTER FUNCTIONS ARE SELECTABLE, DEPENDING ON TASK BEING PERFORMED.

FIG. 77

DSW1 SETTINGS 616 (FIG. 6A)

| SWITCH # | SETTING | DESCRIPTION |
|---|---|---|
| 1 | OFF | BATTERY BACKED-UP MEMORY NOT CLEARED |
| 1 | OFF | BATTERY BACKED-UP MEMORY CLEARED |
| 2 | OFF | NOT YET SPECIFIED |
| 2 | OFF | NOT YET SPECIFIED |

*FIG. 78*

DSW2 SETTINGS 821 (FIG. 8B)

| SWITCH # | SETTING | DESCRIPTION |
|---|---|---|
| 1 | OFF | DIAGNOSTIC TRACE DISABLED |
| 1 | ON | DIAGNOSTIC TRACE ENABLED |
| 2 | OFF | DIAGNOSTIC TRACE |
| 2 | ON | NOT YET SPECIFIED (SPARE FOR INTERNAL USE) |
| 3 | OFF | NOT YET SPECIFIED (SPARE FOR INTERNAL USE) |
| 3 | ON | NOT YET SPECIFIED (SPARE FOR INTERNAL USE) |
| 4 | OFF | NOT YET SPECIFIED (SPARE FOR INTERNAL USE) |
| 4 | ON | NOT YET SPECIFIED (SPARE FOR INTERNAL USE) |
| 5 | OFF | NOT YET SPECIFIED (SPARE FOR INTERNAL USE) |
| 5 | ON | NOT YET SPECIFIED (SPARE FOR INTERNAL USE) |
| 6 | OFF | NOT YET SPECIFIED (SPARE FOR INTERNAL USE) |
| 6 | ON | NOT YET SPECIFIED (SPARE FOR INTERNAL USE) |
| 7 | OFF | NOT YET SPECIFIED (SPARE FOR INTERNAL USE) |
| 7 | ON | NOT YET SPECIFIED (SPARE FOR INTERNAL USE) |
| 8 | OFF | POWER-UP LOOP DIAGNOSTICS DISABLED |
| 8 | ON | LOOP DIAGNOSTICS |

*FIG. 79*

DSW3 SETTINGS 822 (FIG. 8B)

| SWITCH # | SETTING | DESCRIPTION |
|---|---|---|
| 1 | OFF | -SUPERIMPOSED RINGER CONNECTED |
| 1 | ON | -SUPERIMPOSED RINGER NOT CONNECTED |
| 2 | OFF | +SUPERIMPOSED RINGER CONNNECTED |
| 2 | ON | +SUPERIMPOSED RINGER NOT CONNECTED |
| 3 | OFF | MONITOR PAIR CAN BE TESTED IN DIAGNOSTICS |
| 3 | ON | MONITOR PAIR CAN'T BE TESTED IN DIAGNOSTICS |
| 4 | OFF | SYSTEM SOFTWARE DOWNLOADABLE |
| 4 | ON | SYSTEM SOFTWARE NOT DOWNLOADABLE |

*FIG. 80*

REMOTE MEASUREMENT UNIT CONTAINING INTEGRATED LINE MEASUREMENT AND CONDITIONING FUNCTIONALITY FOR PERFORMING REMOTELY COMMANDED TESTING AND CONDITIONING OF TELEPHONE LINE CIRCUITS

FIELD OF THE INVENTION

The present invention relates in general to communication systems, and is particularly directed to a new and improved telephone line measurement and conditioning circuit architecture, which includes a combination of communication and electrical parameter measurement, conditioning and processing circuits and an attendant control processor, through which both line circuit measurement functions and line conditioning functions, that have been previously carried out by separately dedicated remote measurement units and metallic access units, may be selectively controlled from a remote command site.

BACKGROUND OF THE INVENTION

Conventional measurement and test equipments employed by telephone service providers customarily contain a variety of conditioning and signal generation capabilities, which enable service and maintenance personnel to command a remote terminal (RT), provided at the terminating end of a digital loop carrier (DLC) system (which extends phone service to subscribers beyond the normal physical limits of a central office), to apply a prescribed number of electrical stimuli to a line (e.g. a (digital) subscriber loop), for the purpose of trouble-shooting the line and measuring its performance.

A non-limitative example of the installation of such equipment in a telephone network is diagrammatically illustrated in FIG. 1, wherein a plurality of (microprocessor-controlled) remote terminals 11 are installed at a plurality of sites geographically remote and dispersed with respect to each other and a central office 12. Each remote terminal 11 includes various resource components, such as tone generation and electrical conditioning circuitry, which, under the control of associated internal processors, selectively transmit test signals to the line, and may also condition the line with prescribed electrical circuit parameters, that allow an associated line monitoring unit to conduct line measurements and thereby determine the current state of the line and its ability to successfully perform as intended. Each remote terminal unit 11 is typically of the type that conforms to computer interface requirements defined in Issue 3 of AT&T Publication KS-23253.

Conventionally, the remote terminal 11 employs a separately dedicated measurement and test unit 11T and a (metallic access) line conditioning unit 11C, each performing a unique set of communication capability and signal processing functions with respect to a selected network line 13 and subscriber termination equipment 15, under the control of one or more host computers, video display terminals (VDTs) or data terminal units (DTUs) 14 at a supervisory site 16. The remote control devices are of the type which have the capability of accessing the remote terminals 11 through attendant modem devices 17, such as industry standard Hayes 'AT'-compatible 300/1200 units, that are linked to central office 12. Additionally, via an attendant test set coupled to a direct access test unit (DATU) and pair gain (PG) interface 18, a field technician may gain access to either of the test circuitry or the conditioning circuitry of the remote terminal, and thereby remotely test or condition a line, in substantially the same manner as performed by a maintenance administrator at supervisory site 16.

Associated with each of the resources of a remote terminal, including phone lines for testing and modem access, power supply, ring generators, physical mounting space, etc., is a finite cost. In addition, servicing of the equipment including initial system installation and provisioning, as well as continued maintenance of a variety of testing, conditioning and monitoring equipments all contribute substantially to cost.

In an attempt to reduce cost, some terminal equipment providers produce individual devices, the hardware of which is constrained to perform only a limited subset of testing, monitoring or conditioning functions, that have been selectively tailored to satisfy a 'preferred' set of requirements of the user. As a result, should the user request additional performance capability, a new piece of equipment must be purchased and installed. At present, no conventional remote terminal device provides the capability of substantially any function that a user may desire, including each of testing, monitoring and conditioning of a line.

SUMMARY OF THE INVENTION

In accordance with the present invention, the substantial cost associated with the installation and servicing of separate testing and conditioning systems and the limited capabilities of such conventional systems are effectively obviated by a new and improved processor-controlled telephone line measurement and conditioning circuit architecture, which is equipped with a broad spectrum of measurement and conditioning functions that are selectively executable in response to commands issued from a remote command site. In effect, the architecture of the present invention may be considered to contain circuitry and control software for implementing the functionality of each of a remote measurement unit (RMU) and a metallic access unit (MAU) that may be individually accessed and controlled. The RMU operates primarily as a test head that performs mechanized loop testing (MLT) tasks, while the MAU is operative to impart prescribed electrical conditions to a specified line circuit.

When controllably accessed to operate as an RMU, the present invention responds to instructions from a command site (loop maintenance operations system) and performs single-line demand tests on a line provided by a pair gain system. As will be described, included within the RMU functionality is its ability to measure AC and DC voltage and current, and three way resistance and capacitance (between tip and ground, ring and ground, and tip and ring). With this testing capability, the RMU provides MLT type features for remote subscriber loops which are not otherwise accessible by MLT units in a central office. The RMU can also analyze rotary dial pulses, dial tone, and dual tone multi-frequency (DTMF) tones. It can also measure signal transmission levels, generate test tones, and allow test personnel to establish callback and alternatively monitor, apply ringing, talk and perform tests on a separate telephone line.

To operate as an MAU, the system receives commands from a direct access test unit (DATU) and performs line conditioning functions on the test line provided by the pair gain system. When operating in the MAU mode, the system may open the line, it may shunt tip to ring, or it may shunt either or both of tip and ring to ground. It may also apply high-level metallic tones to tip and ring, or single-sided tones individually to the tip or ring side of the line. In addition, it may cause a line condition to be maintained on the line for a prescribed period of time following disconnect.

The system architecture of the remote measurement unit of the present invention includes a central processing unit (CPU), which is operative to execute respective instructions of operating system firmware that is stored in an on-line remotely programmable dual flash memory system, so as to control system functionality and operation in accordance with commands communicated to the unit from an external site.

In addition to the dual flash (PROM) memory system, the system employs a random access memory (RAM) module. Each flash memory system contains a pair of flash PROM modules. One flash memory system is on-line, and the other of which is off-line as a quasi-redundant system. The system is configured to normally boot up in a given flash memory system. Since the firmware contained in either memory system is reprogrammable, then, when a change in operating system configuration is carried out, reset control logic ensures that the intended operating system (e.g. an upgraded system) is run. When the system of the present invention is initially configured for installation at a test and monitoring site, each of its two flash memory systems will have been loaded with the same firmware, so that the two flash memory systems contain redundant versions of the same operating system software.

The architecture and selective programming of the flash PROMs of the primary and secondary memory systems is preferably conducted in the manner described in co-pending application Ser. No. 08/194,203, now U.S. Pat. No. 5,452,203, issued Sep. 19, 1995, filed coincident herewith, by O. Schillaci et al, entitled: "Local/Remote Modification of Electronically Alterable Operating System Firmware Resident in Redundant Flash Memory of Remote Unit for Testing/Conditioning Subscriber Line Circuits," assigned to the assignee of the present application and the disclosure of which is herein incorporated. Each flash memory module may be erased and programmed through a modem link.

When the system is powered-up, a (phantom/restore) memory system selection logic circuit will normally cause a prescribed default flash memory system to be accessed by the processor, which then continues to use operating system resident in the default memory system until that system is modified. Thereafter, when the operating system is to be changed, the inactive (off-line redundant) system is modified by means of a download sequence and the system is reset. Upon reset, the previously inactive system becomes the active system, while the previously active system goes off-line.

Access to memory is by way of a memory access controller comprised of a processor data buffer register and an associated address mapping look up table PROM which are cascaded together to form a memory decoder. The memory decoder is coupled to the processor data portion and prescribed address bits of the system bus. Coupled to the memory map PROM is a non-volatile random access memory controller chip which prevents corruption of RAM memory during power outages. The memory controller chip monitors the battery line and is operative to couple a 3.6 volt battery to the flash memory to preserve its firmware during a power outage.

The central processing unit is interfaced via a communication unit to external communication links for receiving commands and reporting the results of executed commands to a supervisory site.

An input/output (I/O) unit includes a plurality of testing and conditioning function relays that are operated under processor control so as to interconnect circuit components of the system in a prescribed connectivity path for a given RMU or MAU functionality. Also included are peripheral registers and relay driver circuits through which the CPU controls the relays.

The communication unit may include an on-board modem which is compatible with Bell 212A/103 and CCITT V.22/V.21 operating standards, so that communications may be carried out at customary baud rates. The modem includes a conventional UART for interfacing with the central processor, a data access arrangement (DAA) for a telephone line interface, and additional telephone line signalling circuitry which is controllably operative to present an off-hook condition, generate dual tone multi-frequency (DTMF) or rotary dial signals, detect ringing signals, carrier, call-progress and answer-tone signals. The communication unit also includes local and expansion serial communication ports, through which serial communications may be conducted at different baud rates.

Internal timing for the system is provided by timer/counter chips which includes oscillators, frequency counters and timer circuits that are operative to provide various clocks for the CPU, modem, DTMF circuitry, analog-to-digital converter, and additional signal processing components. An input/output control/communication (KIO) supervisory unit may comprise a Zilog Z84C90-based counter/timer chip (CTC) which has parallel I/O ports, a multi-clock port, and of full-duplex serial ports. Internally, a CTC comprises four presetable, eight bit counters, which are employed to generate prescribed clock signals for the system. The serial communication ports have variable baud rate and synchronous or asynchronous capability and are coupled to an RS-232 serial communication driver/receiver.

Additional counter/timer chips are employed as scheduler timers, time interval counters, pulse counters and clock generators for various system functions. The additional counter/timer chips and the KIO counter/timer chip are connected in a daisy chain, prioritized interrupt configuration. Associated with the timer/counter chips are respective selector logic circuits through which the various clock and timing signals provided by the CTCs are shared among the CTCs for tone and timing signal generation, such as that employed for rotary pulse generation and capacitance tone generation for capacitance measurements.

An AC source unit contains analog filter, amplifier and signal conditioning components, which convert digital frequencies to analog tones having prescribed electrical characteristics and required source or termination resistors. These components enable the system to generate a wide range of variable amplitude audio band tones, such as DTMF tones, test tones, ring-back tones, and a reference tone used for line capacitance measurements.

A DC source unit contains DC coupling circuitry which provides CO battery voltage for powering a line under test, and producing precision, variable DC voltages under CPU control. Variable DC voltages may be generated using a prescribed voltage reference, a digital-to-analog converter (DAC), a power source voltage stage, and selectable source resistors, so that precision line resistance measurements may be made.

Also employed is a detector unit which is operative to detect DTMF signalling, external closed-contact alarms, and an off-hook condition on the line under test for any standard subscriber loop length. It may also perform high impedance and low impedance monitoring of test line conditions over the monitor line, or detect single frequency pulses employed for rotary dial analysis or phase difference intervals between a reference and a delayed signal used in capacitance measurements.

A measurement unit performs extremely precise AC and DC voltage and current measurements on the line under test. The measurement unit includes a set of termination resistors, precision voltage divider and current shunt resistor networks, a bandpass filter to eliminate noise, a precision AC-RMS DC converter, a high-speed comparator for performing quick voltage checks on the line, an ADC for making DC measurements, and a set of capacitors used for self diagnostic tests.

Power for the respective units of the system is provided by way of a power supply unit which receives a set of prescribed power supply voltages and includes DC—DC converter circuitry for providing the necessary DC voltages for powering the circuit components of the various units. It also couples CO battery for powering the line under test.

As noted previously, the integrated line test and conditioning architecture of the present invention is capable of performing both remote measurement unit (RMU) and metallic access unit (MAU) functionality, each of which may be individually accessed and controlled. The RMU performs mechanized loop testing (MLT) tasks, while the MAU imparts prescribed electrical conditions to a specified line circuit.

When controllably accessed to operate as an RMU, the system responds to instructions from a command site and performs single-line demand tests on a line provided by a pair gain system. Access to the system may be effected by a modem link with the central office, employing a modem interface communication protocol used mechanized loop testing system to drive the system as an RMU. The RMU functionality that is embedded in the circuit architecture and software that controls the operation of such circuitry includes the ability to measure AC and DC voltage and current, and three way resistance and capacitance (between tip and ground, ring and ground, and tip and ring). The RMU is also able to analyze rotary dial pulses, dial tone, and dual tone multi-frequency (DTMF) tones. It can also measure signal transmission levels, generate test tones, and allow test personnel to establish callback and alternatively monitor, apply ringing, talk and perform tests on a separate telephone line.

A DC voltage measurement measures DC voltage conditions presented on the test bus. The conditions can be internally generated or they may be presented externally from the outside line under test via relay. DC test pair voltages (e.g. tip-ground or ring-ground) are applied through input connect/protect relay circuitry and, through test conditioning relays, the test pair analog voltages are steered to a prescribed resistor ladder segment of a voltage divider network. The divided analog DC voltages are read by the system's AD converter which then forwards digital data representative of the measured analog DC voltage to the CPU.

An AC voltage measurement is similar to a DC voltage measurement in that it measures AC voltage conditions presented on the test bus, and requires that the signal be routed the AC/DC RMS converter prior to being coupled to the AD converter, where the voltage is read and digitized. Both DC and AC current measurements are similar to voltage measurements, except that a current resistor network is employed in lieu of the voltage divider resistor network.

There are three DC resistance measurements that may be conducted, respectively associated with differential resistances across tip-ring, ring-ground, and tip-ground. For each resistance measurement to be performed, a respectively different resistance measurement condition is asserted by the processor. In response to a prescribed digital resistance measurement input code from the CPU, the digital-to-analog converter (DAC) generates an associated analog DC voltage. This voltage is coupled to a power operational amplifier, where it is amplified and then fed through prescribed resistance components of a source resistance ladder, and applied to one side of the test pair through the test conditioning relays and to the input relay connect/protect circuitry. During DC resistance measurements, depending on MLT command parameters, that side of the test pair not being sourced with the DC measurement voltage is either open, shorted to ground or shorted to the other side of the test pair, via the test conditioning relays, while tip-ground or ring-ground voltages are divided down by the voltage divider network and read by the AD converter, which sends the data to the CPU. The processor then extrapolates the differential or 'delta' resistances on the test pair from this measurements data, taking into account the source voltage and source resistance used.

Capacitance measurements are conducted by applying a prescribed test tone (e.g. 30 Hz) to the line and measuring phase delay between the source and the effect of the line on the tone transmission. The tone signal is applied for three respectively different conditions of the test pair (corresponding to those described above for resistance measurements) and line voltage attenuation and phase shift are measured for each test line configuration. The resulting measurements are then processed to derive a differential capacitance.

A transmission level measurement performs a measurement of a signal applied to the test pair and calculates the dBm value of the signal. The signal is band-limited through a programmable filter (e.g. between 300 and 3000 Hz). The system bridges onto the test pair, reads the AC voltage on the test pair and reports the converted dBm value. If the initial voltage reading is less than a prescribed value (e.g. 150 mV), the X10 amplifier circuitry, described above, may be employed to provide improved granularity from which a second measurement and associated calculation may be performed. This second dBm value is then reported as the measurement value of the line transmission level.

Dial tone detection is employed by the RMU to evaluate the dial tone on the line which is connected to the test pair. Dial tone testing includes monitoring for, may include and attempting to break, dial tone for prescribed periods of time. In order to detect dial tone, either the test pair relay or a pair of monitor relays are coupled through relay connection/ protection paths to respective isolation transformers, depending on the test requirement. Via test conditioning relays, the dial tone signal is coupled to the amplifier circuitry. The dial tone signal is amplified to correct as necessary for isolation transformer losses, and the amplified signal is band-limited by a bandpass filter. The bandpass-filtered signal is applied to the voltage divider network. The resultant divided signal is converted into a DC voltage by the RMS/DC converter and sensed by a high-speed comparator. The high speed comparator provides a high digital logic level to a parallel port read by the CPU, if the dial tone signal exceeds a reference voltage, which is set at a threshold value representative of a converted −30 dB signal level. On the other hand, a low logic level from the high-speed comparator indicates the absence of dial tone.

Rotary dial analysis monitors the make and break times of the pulses being examined on the test pair. For rotary dial signal analysis, the (rotary dial) signal is coupled through relay connect/protect circuitry, and test conditioning relays which provide C.O. battery loop power to an off-hook detection comparator. The off-hook comparator provides a digital low logic level during the "make" part of the cycle, when the rotary signal is more negative than a prescribed threshold. "Breaks" are indicated by a high logic level. The time intervals of the make and breaks pulses are measured by the counter/timer chip (CTC) which couples the information to the CPU.

Touch tone or DTMF signal analysis performs a test of the DTMF digits received on the test pair during the test period. A prescribed number of digits and a given wait time are employed. In order to detect DTMF signals, either the test pair relay or the monitor pair relays are coupled through relay connection/protection paths to respective isolation transformers, depending on the DTMF path of interest. Via test conditioning relays, the signal is coupled to amplifier circuitry which compensates for transformer loss. The loss-compensated (amplified) signal is then coupled to a DTMF receiver, which reports data of DTMF signals to the CPU.

A callback may be established on the talk pair telephone line connected to the RMU. This functionality allows the party to whom the callback is placed to have access to the line under test for the purpose of talking (Talk), monitoring (Monitor) and ringing (hold). Before any of these functions can be provided, a callback condition must be established. In order to establish a callback condition, it is necessary to have the RMU dial a predefined telephone number via the monitor pair. Then, when a connection is made with the monitor pair, a callback condition has been established.

The Talk function involves maintaining a low-impedance connection between the test and monitor pairs (by interconnecting the test pair and monitor pair transformer secondaries, so that an AC-coupled speech communication between the test and monitor pairs is possible). In addition, the test pair is powered with C.O. battery loop power. (Battery may be applied to the loop in either forward or reverse polarity.) For this purpose, either the test pair relay or the monitor pair relays are coupled through relay connection/protection paths to respective isolation transformers, depending on the talk path of interest. Via test conditioning relays, C.O. battery loop power is provided.

The Monitor function involves maintaining a one-way, high-impedance connection from the test pair to the monitor pair (using the high-impedance amplifier circuit, which will not make noise when connected to a busy subscriber line), without applying C.O. battery power to the test pair. This allows the party on the talk pair to monitor the activity on the test pair, but not the reverse.

For callback monitor mode, the test pair relay is coupled through a relay connection/protection path to an isolation transformer. Via test conditioning relays, a path is provided to high impedance monitor buffer amplifier circuit. The cascaded monitor pair relay path is coupled via isolation transformer to high impedance monitor amplifier.

The Hold function involves remaining off-hook on the monitor pair without a test pair-to-monitor pair connection or battery loop power being applied, via a relay connection for the monitor pair, per se, and the relay connection to test conditioning relays for the test pair, separate from a connection to the monitor pair.

All tone signals are generated in accordance with digitally generated clock signals that are controllably combined, filtered and amplified to produce the desired tone signal. Tone generation may involve the provision of a prescribed tracer tone (e.g. 577.5 Hz at 10.6 dBm) to the test pair and interrupting the tone at a defined rate. For tone generation, processor clock signals are applied to the timing/counter chips and selectively divided down to produce the digital clock components of which the tone signal is comprised. The peak-to-peak amplitude of these signals is set by the DC level output by a DAC and the signals are selectively summed as necessary by frequency adder/selector circuitry. The resulting sine waves are coupled to lowpass filter circuitry, and the filtered tones are then amplified through a tone amplifier and coupled through test conditioning relays, which provide connections with the required termination resistors.

The ring subscriber function applies a selected one of a plurality of available types of ringing signals to the test pair. Ringing signals include a negative superimposed ring signal applied to the ring side of the line, a positive superimposed ring signal applied to the ring side of the line, a negative superimposed ring signal applied to the tip side of the line, and a positive superimposed ring signal applied to the tip side of the line.

When performing a ringing test, the RMU applies the ringing signal to the test pair and monitors the line for a subsequent ring trip. Once the test pair goes off-hook, the RMU removes the ringing signal from the test pair and places the callback in talk mode, with battery lop power applied in the forward polarity state.

To conduct a ringing signal test, a signal is connected from a ringer (or also applied to the test pair) with the proper ring cadence through the relay connect/protect circuitry to respective test conditioning relays. Via the conditioning relay circuit path, the signals are then steered to the voltage divider network. The divided analog AC voltages are then coupled to the RMS/DC converter, which translates the RMS voltage to an analog DC voltage. This analog DC voltage is then read by the AD converter which sends digital AC voltage measurement data to the CPU.

Off-hook detection monitors the line under test to determine whether line voltage indicates that the subscriber termination device is off-hook. For off-hook detection, the subscriber line is coupled 3702 through relay connect/protect circuitry and test conditioning relays, which provide C.O. battery loop power, to an off-hook detection comparator. The off-hook comparator is operative to output a digital low logic level to a parallel port read by the CPU when the subscriber is off-hook. As described previously, an 'off-hook' condition is declared when the signal level is more negative than a prescribed DC threshold.

To detect an alarm contact closure, the alarm input is coupled through relay connect/protect circuitry and applied to an alarm threshold detector circuit, the input of which is coupled to detect the open or closed condition of contact of an alarm relay. The alarm input level is compared in the threshold circuit with a prescribed DC reference voltage to indicate whether an external alarm contact closure condition has occurred. The alarm comparator output is low when an alarm contact closure condition has been asserted.

To operate the integrated RMU/MAU system of the present invention as a metallic access unit, the system receives commands from a direct access test unit (DATU) and performs line conditioning functions on the test line provided by the pair gain system. In the MAU mode, the system is capable of conditioning a line in accordance with selectively invoked MAU functionality, using the relay connect/protect circuitry and test conditioning relays, as described above in connection with the description of the RMU operating system. In the MAU mode the following (verifiable on demand) conditioning functions may be invoked: open line (in which the line under test is disconnected), short line (tip and ring are shorted together), short to ground (tip, ring, and ground are all shorted together), tip ground (tip is shorted to ground, with ring open), and ring ground (ring is shorted to ground, with tip open). To verify any of the above conditions (with the exception of open line), an internal resistance measurement is conducted, prior to providing a connection to the external line.

For AC line conditioning, a high level (tracer) metallic tone is coupled to the line as a tip and ring tone, using the tone generation circuitry and path connections described above for RMU functionality, except that prescribed parameters of MAU tone signals are different from RMU tones. For tip tone and ring tone conditioning, the tone is coupled to the line single sided (tip-ground or ring-ground). The interruption rate for an MAU tone differs from that of an RMU tone. To verify placement of a tracer tone on the line, an internal transmission level measurement is conducted prior to connection to the line.

The MAU may also conduct a hold test by maintaining the line conditioning currently invoked for a prescribed period of time (e.g. 1–99 minutes), which begins when the system goes back on-hook. Functions which may be held are open line, shorted line, short-to-ground, tip-to-ground, ring-to-ground, tip tone, ring tone, and tip and ring tone, referenced above.

BRIEF DESCRIPTION OF THE DRAWINGS

FIGS. 3–21 are schematic diagrams showing the detailed configuration of the units of the RMU/MAU system architecture of FIG. 2, wherein FIGS. 3 and 4 are schematic diagrams of the details of power supply unit, FIGS. 5A and 5B shows the central processing unit and associated interface circuitry;

FIGS. 6A and 6B schematically illustrates a memory access controller and timing logic circuitry;

FIG. 7 schematically illustrates dual flash (PROM) memory systems, and a random access memory (RAM) module;

FIGS. 8A and 8B show input/output control/communication (KIO) supervisory and read port circuitry;

FIG. 9 schematically illustrates a set of counter/timer chips (CTCs) and associated coupling logic circuits;

FIG. 10 schematically illustrates the circuit configuration of the communication unit 210 of FIG. 2;

FIG. 11 shows a plurality of write ports and associated relay drivers for setting up test functions of the system;

FIG. 12A schematically illustrates components of detector unit 260 of FIG. 2;

FIG. 12B shows a threshold detector circuit;

FIG. 12C schematically illustrates an off-hook detection comparator;

FIG. 12D depicts a bank of light emitting diodes (LEDs), which to provide visual status information to service and maintenance personnel;

FIG. 13A schematically illustrates components of measurement unit 270 of FIG. 2, which performs extremely precise AC and DC voltage and current measurements;

FIG. 13B shows a tone generator circuit;

FIG. 14A schematically illustrates testing and conditioning function relays of input/output (I/O) unit 230 of FIG. 2;

FIG. 14B shows a relay circuit that provides an auxiliary low impedance monitor connection between a test pair line and a monitor line;

FIG. 15 schematically illustrates controllable connection circuitry, which is operative to couple test pair signals applied to a tip and ring test pair of a line under test to a test pair isolation transformer;

FIG. 16 shows voltage and current measurement circuitry employed for remote measurement AC/DC voltage and current measurements;

FIG. 17A schematically illustrates the circuit configuration of that portion of the measurement unit 270 of FIG. 2, which contains a precision AC-DC RMS converter and an analog-to-digital converter (ADC) for making DC measurements;

FIG. 17B shows digital-to-analog converter circuitry;

FIG. 17C shows a high-speed comparator for performing quick voltage checks on the line;

FIG. 17D shows a tone generator amplifier;

FIG. 18 schematically shows the circuit configuration of a discrete output power amplifier circuit, which is operative to provide AC voltages employed in capacitance measurements and DC voltages used in resistance measurements;

FIG. 19B shows a selectable resistor network employed for source resistors for capacitor measurements;

FIG. 19C shows a buffer amplifier having a potentiometer feedback resistor coupled in circuit with the monitor pair transformer of FIG. 15;

FIG. 20 schematically illustrates a set of buffer amplifiers employed in various circuit paths of FIGS. 15 and 17C;

FIG. 21 schematically illustrates the configuration of an AC source amplifier (power boost circuit) employed for metallic access conditioning applications;

FIGS. 22–38 are respective block diagrams which show the signal processing functions involved in executing respective RMU operations, wherein FIG. 22 is an RMU operational block diagram associated with DC voltage measurement;

FIG. 23 is an RMU operational block diagram associated with AC voltage measurement;

FIG. 24 is an RMU operational block diagram associated with DC current measurement;

FIG. 25 is an RMU operational block diagram associated with AC current measurement;

FIG. 26 is an RMU operational block diagram associated with DC resistance measurement;

FIG. 27 is an RMU operational block diagram associated with capacitance/AC resistance measurement;

FIG. 28 is an RMU operational block diagram associated with transmission level measurement;

FIG. 29 is an RMU operational block diagram associated with dial tone detection;

FIG. 30 is an RMU operational block diagram associated with rotary dial analysis;

FIG. 31 is an RMU operational block diagram associated with DTMF detection;

FIG. 32 is an RMU operational block diagram associated with a callback talk function;

FIG. 33 is an RMU operational block diagram associated with a callback monitor function;

FIG. 34 is an RMU operational block diagram associated with a callback hold function;

FIG. 35 is an RMU operational block diagram associated with tone generation;

FIG. 36 is an RMU operational block diagram associated with a ring test;

FIG. 37 is an RMU operational block diagram associated with off-hook generation;

FIG. 38 is an RMU operational block diagram associated with alarm contact closure;

FIG. 39 is an MAU operational block diagram associated with MAU line conditioning functions;

FIGS. 40–44 are respective pin connector tables which describe the functions associated with respective connector pins;

FIG. 45 and 46 are memory map tables;

FIG. 47 is a table showing the association of input/output bit map mnemonics with respective system registers;

FIG. 48 is a table showing the association of input/output segment breakdown mnemonics with respective system byte/registers;

FIGS. 49–50 are descriptions of respective lower and upper bytes associated with the register inputs to the analog-to-digital converter 1710 of FIG. 17A;

FIG. 51 is a description of the data ports of register 821 of FIG. 8B;

FIG. 52 is a description of the data ports of register 1121 of FIG. 11;

FIG. 53 is a description of the data ports of register 822 of FIG. 8B;

FIG. 54 is a description of the data ports of register 601 of FIG. 6A;

FIGS. 55–56 are descriptions of respective lower and upper bytes associated with the register inputs to the digital-to-analog converter 1720 of FIG. 17B;

FIG. 57 is a description of the data ports of register 1105 of FIG. 11;

FIG. 58 is a Table 1 associated with the data port description of FIG. 57;

FIG. 59 is a description of the data ports of register 1106 of FIG. 11;

FIGS. 60–61 contain Tables 1 and 2 associated with the data port description of FIG. 59;

FIG. 62 is a description of the data ports of register 1107 of FIG. 11;

FIG. 63 is a description of the data ports of register 1101 of FIG. 11;

FIG. 64 is a description of the data ports of register 1102 of FIG. 11;

FIG. 65 is a Table 4 associated with the data port description of FIG. 64;

FIG. 66 is a description of the data ports of register 1103 of FIG. 11;

FIG. 67 is a Table 5 associated with the data port description of FIG. 66;

FIG. 68 is a description of the data ports of register 1104 of FIG. 11;

FIG. 69 is a description of the data ports of register 1041 of FIG. 10;

FIG. 70 is a description of the data ports of register 1042 of FIG. 10;

FIG. 71 is a Table 6 associated with the data port description of FIG. 70;

FIG. 72 is a description of the data ports of register 1043 of FIG. 10;

FIG. 73 is a description of the data ports of register 1362 of FIG. 13B;

FIG. 74 is a description of the data ports of register 1243 of FIG. 12D;

FIGS. 75–76 contain a description of the data ports of CTC 801 of FIG. 8A;

FIG. 77 contains a Counter Functions Table associated with the CTCs of FIGS. 8 and 9; and FIGS. 78–80 are tables showing respective DIP switch setting descriptions associated with switch 616 in FIG. 6A and switches 821 and 822 in FIG. 8B.

DETAILED DESCRIPTION

Figure 1:
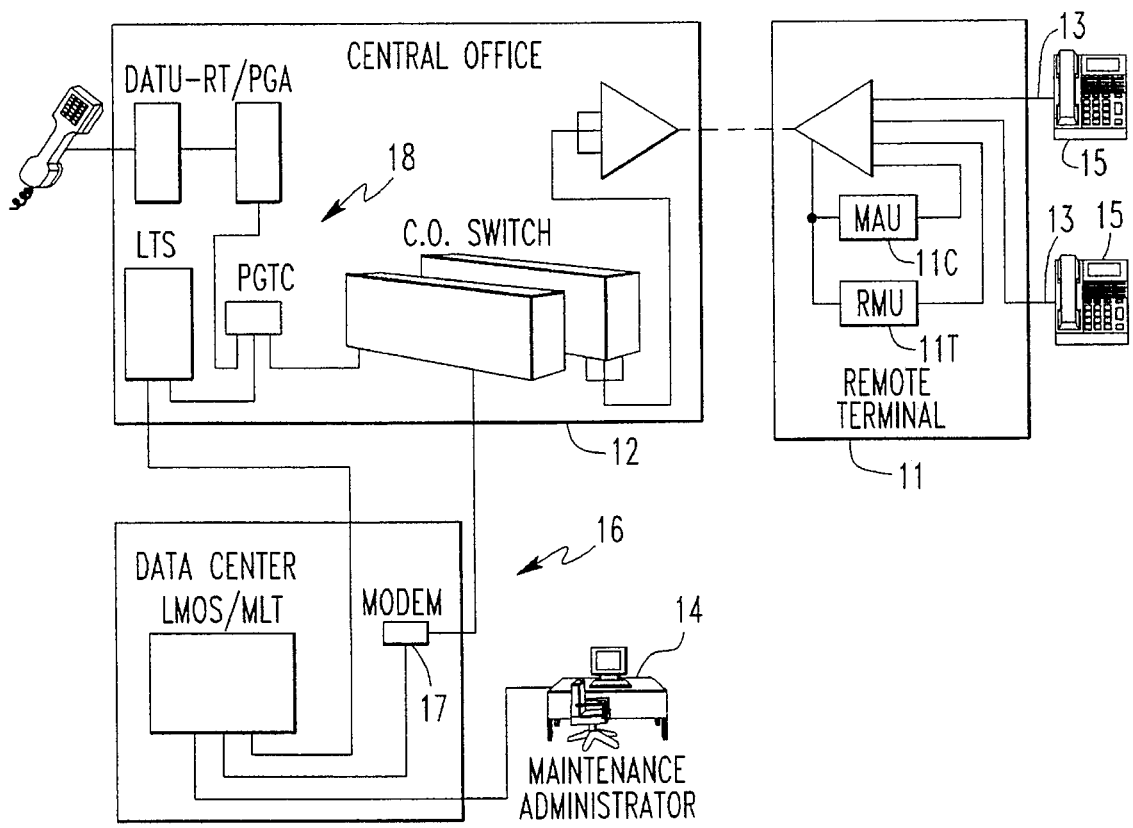
FIG. 1 diagrammatically illustrates a telephone network having remote terminals installed at a plurality of sites geographically remote and dispersed with respect to each other and a central office.

Before describing in detail the remote measurement unit in accordance with the present invention, it should be observed that the present invention resides primarily in a self-contained combination of a set of communication and electrical parameter measurement, conditioning and processing circuits and an attendant control processor, through which line circuit test and measurement functions, as well as line conditioning functions, that have been previously carried out by separately dedicated remote measurement devices and metallic access devices, may be selectively controlled from a remote command site. As described previously, remote commands may be sourced from a field technician's test set, coupled in circuit with a central office switch by way of a direct access test unit and associated pair gain applique, pair gain test control circuitry, or by way of a maintenance administrator's computer terminal, which is modem-connected to the central office.

In order to facilitate the description, the configuration of the remote measurement unit, the manner in which it is interfaced with other communication equipment of a telephone network, and its functionality have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components and functions of the system in a convenient functional grouping, whereby the present invention may be more readily understood. In addition, schematics of the circuit components of the respective blocks of the overall system architecture of the remote terminal unit of the present invention, to be described with reference to FIG. 2, are shown in FIGS. 3–21.

Figure 2:
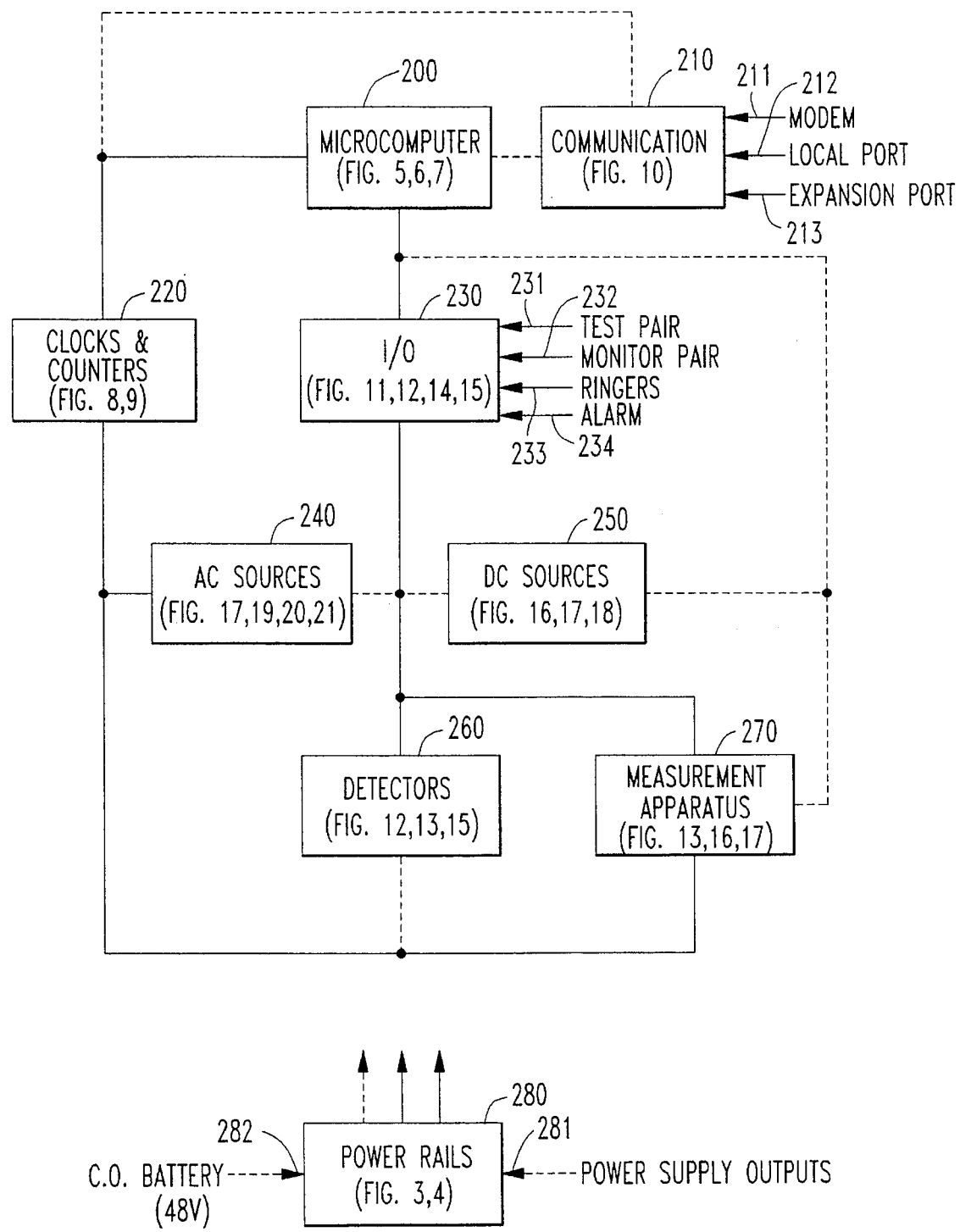
FIG. 2 is a block diagram of the overall system architecture of the integrated remote measurement unit, metallic access unit of the present invention.

Referring now to FIG. 2, a block diagram of the overall system architecture of the remote measurement unit of the present invention is shown as including a control processor or microcomputer unit 200 (shown schematically in FIGS. 5, 6 and 7, to be described), which includes microprocessor, memory and associated logic and circuitry for controlling system functionality and operation in accordance with commands communicated to the unit from an external site and reporting the results of the execution of commands. The microprocessor is operative to execute the respective instructions of operating system firmware that is stored in an on-line remotely programmable flash memory system. Also included as part of the circuitry of microcomputer unit 200 are a watchdog timer (which is operative to reset the system in response to one or more prescribed ambient anomalies), and a phantom/restore circuit which is operative to specify which operating system in the two flash memories is to be run. Also included is address decoding circuitry which enables the processor to address specified peripheral devices.

Associated with microcomputer unit 200 is a communication unit 210, through which the system is interfaced with external communication links and. Communication unit 210 (shown schematically in FIG. 10, to be described), includes an on-board modem circuit which is compatible with Bell 212A/103 and CCITT V.22/V.21 operating standards, so that, via a modem port 211, communications may be carried out at customary baud rates (e.g. 1200 or 300 bits per second). The internal modem includes a conventional universal asynchronous receiver and transmitter (UART) for interfacing with microcomputer unit 200, a data access arrangement (DAA) for a telephone line interface, and additional telephone line signalling circuitry which is controllably operative to present an off-hook condition, generate dual tone multi-frequency (DTMF) or rotary dial signals, detect ringing signals, carrier, call-progress and answer-tone signals. Communication unit 210 also includes local and expansion serial communication ports 212 and 213, through either of which serial communications at various baud rates (such as 1200, 2400, 4800 or 9600 baud) may be conducted. Each serial port has a respective universal synchronous/asynchronous receiver and transmitter (USART) for interfacing with microcomputer unit 200 and associated serial (e.g. RS-232) driver/receivers.

In accordance with a preferred embodiment of the present invention, the baud rate employed for serial digital communications is established by means of an autobaud rate detection mechanism described in co-pending patent application Ser. No. 08/193,813, now U.S. Pat. No. 5,490,209, issued Feb. 6, 1996, by Michael Kennedy et al, entitled "Autobaud Rate Detection Mechanism," filed coincident herewith, assigned to the assignee of the present application and the disclosure of which is incorporated herein.

As described in that application, conventional baud rate setting and adjustment schemes require the participation of technical personnel to determine and then perform parameter adjustments of the control settings of the device. To obviate these shortcomings an 'autobaud' detection mechanism is installed as part of the communication control software of the serial communication device's microcontroller, which enables the microcontroller to automatically determine the baud rate employed by a remote digital data communications device, so that the baud rate of the internal modem of the unit may be readily set and locked to that baud rate.

To this end, rather than employ conventional baud-setting switches through which baud rate must be set by an on-site craftsperson, the autobaud rate detection mechanism employs a table of baud rate entries (e.g. 9600, 4800, 2400, 1200, 600, 300), at each of which the terminal unit's serial communication device (modem) is capable of operating. Because the baud rate table is microcontroller-resident, it is programmable, so that the tuning capabilities of the serial input output device may be updated, for example by the replacement of a modem card capable of handling a prescribed set of baud rates with a more enhanced modem card having an expanded set of baud rates.

Pursuant to the autobaud rate detection mechanism the highest baud rate within the table is the default baud rate, which the detection mechanism employs when initiating a baud rate detection routine in response to an incoming call. The routine is operative to step through successively lower baud rates from the highest baud rate in the course of a search for the baud rate at which the remote device is transmitting. The baud rate entries of the table are stored in sequential addresses in memory, which may be scanned by an associated soft-counter which controls baud rate entry access, the soft-counter rolling over to the highest entry once it has stepped to the lowest entry address. This roll-over to the default entry ensures that the search will not become 'hung up' on any baud rate.

Internal timing for the integrated RMU/MAU system is provided by a clock/counter unit 220 (shown schematically in FIGS. 8 and 9, to be described), which includes oscillators, frequency counters and timer circuits that are operative to provide a 4.9152 MHz CPU clock, an 11.0592 MHz modem clock, a 3.58 MHz DTMF receiver and analog-to-digital converter (ADC) clock, and clocks for additional components, to be described.

Also coupled to microcomputer unit 200 is an input/output (I/O) unit 230 (shown schematically in FIGS. 11, 13, 14 and 15, to be described), which includes a plurality of testing and conditioning function relays that are operated under processor control to interconnect circuit components of the system in a prescribed connectivity path for a given system functionality. Also included are peripheral registers and relay driver circuits through which the processor controls the relays. As will be described the relays allows a line under test pair 231 and a monitored line pair 232 to be internally accessed by the processor. Also coupled to I/O unit 230 is a ringing signal port 233.

Analog filter, amplifier and signal conditioning components are contained in an AC source unit 240 (shown schematically in FIGS. 17–21, to be described), which is operative to convert digital frequencies to analog tones with prescribed electrical characteristics and required source or termination resistors. These components enable the system to generate a wide range of variable amplitude audio band tones (e.g. 20–10 kHz and 0–40 V, peak-to-peak), such as DTMF tones, test tones, ring-back tones, and a reference tone used for line capacitance measurements.

A DC source unit 250 (shown schematically in FIGS. 16–18, to be described) contains DC coupling circuitry which is operative to provide CO battery voltage for powering the line under test, and producing precision, variable DC voltages (e.g. −80 VDC–+80 VDC) under CPU control. As will be described, variable DC voltages may be generated using a prescribed voltage reference (e.g. 10 VDC), a digital-to-analog converter (DAC), a power source voltage stage, and selectable source resistors, so that precision line resistance measurements may be made.

A detector unit 260 (shown schematically in FIGS. 12, 13 and 15, to be described) serves to detect DTMF signalling, external closed-contact alarms, and an off-hook condition on the line under test for any standard subscriber loop length. It may also perform high impedance and low impedance monitoring of test line conditions over the monitor line, or detect single frequency pulses employed for rotary dial analysis or phase difference intervals between a reference and a delayed signal used in capacitance measurements.

A measurement unit 270 (shown schematically in FIGS. 13, 16 and 17, to be described) is employed to perform extremely precise AC and DC voltage and current measurements on the line under test. For this purpose, measurement unit includes a set of termination resistors, precision voltage divider and current shunt resistor networks, a bandpass filter to eliminate noise, a precision AC—RMS DC converter, a high-speed comparator for performing quick voltage checks on the line, an ADC for making DC measurements, and a set of capacitors used for self diagnostic tests.

Power for the respective units of the system is provided by way of a power supply unit 280, which receives a set of prescribed power supply voltages at ports 281 and includes DC—DC converter circuitry for providing the necessary DC voltages for powering the circuit components of the various units. It also couples CO battery (48 VDC), applied to an external port 282, for powering the line.

As pointed out above, respective schematics of the circuit components of the respective blocks of the overall system architecture of FIG. 2 are shown in FIGS. 3-21. To avoid line cluttering and thereby reduce, to the extent possible, the 'busyness' of the schematics, interconnections among various components have been shown by mnemonic identifiers. In addition, respective tables showing the association of the respective pins of the pin banks, circuit connection mnemonics and register data port identifiers are set forth in FIGS. 40-80.

Figure 3:
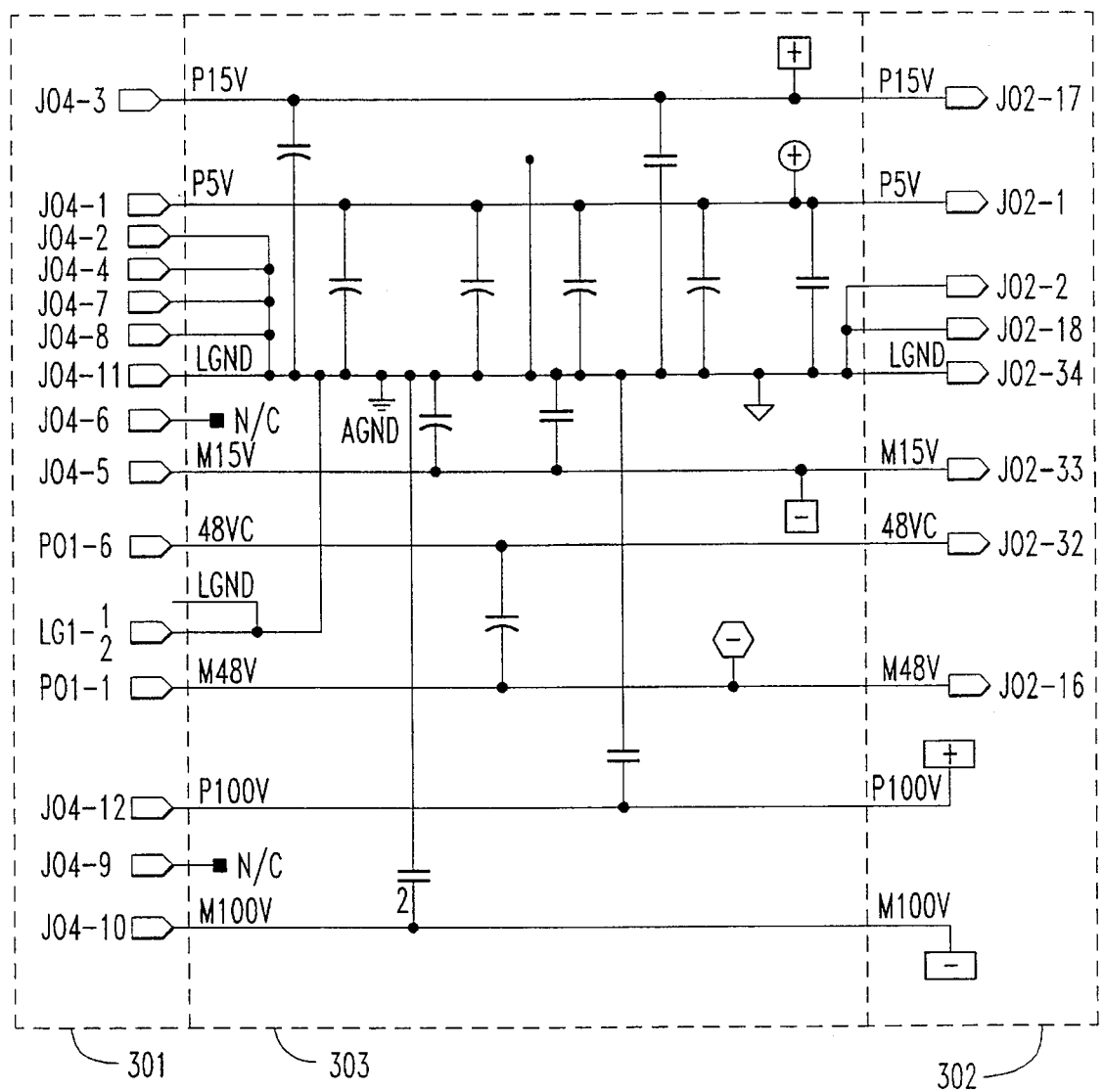
Figure 4:
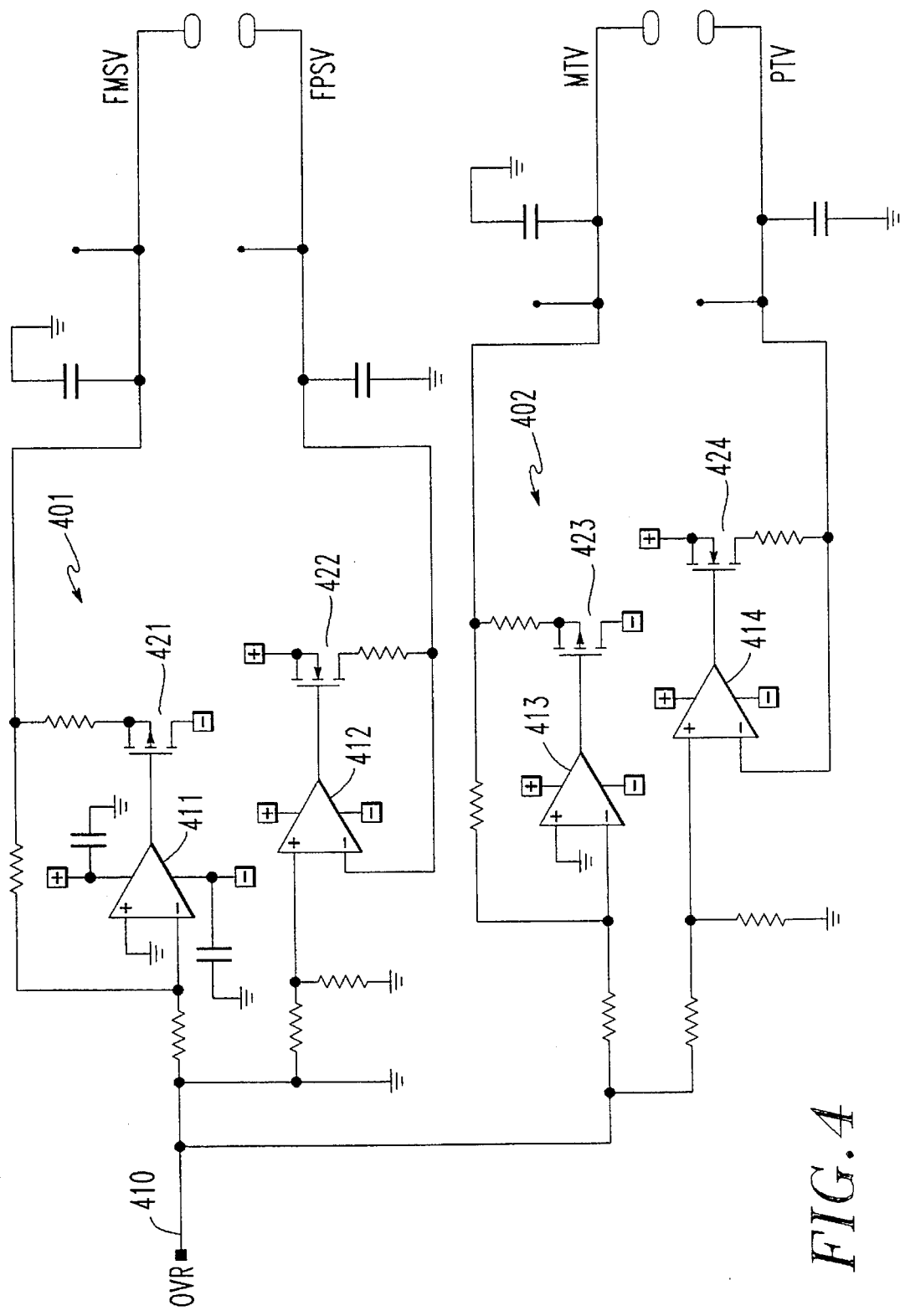
Figure 5:
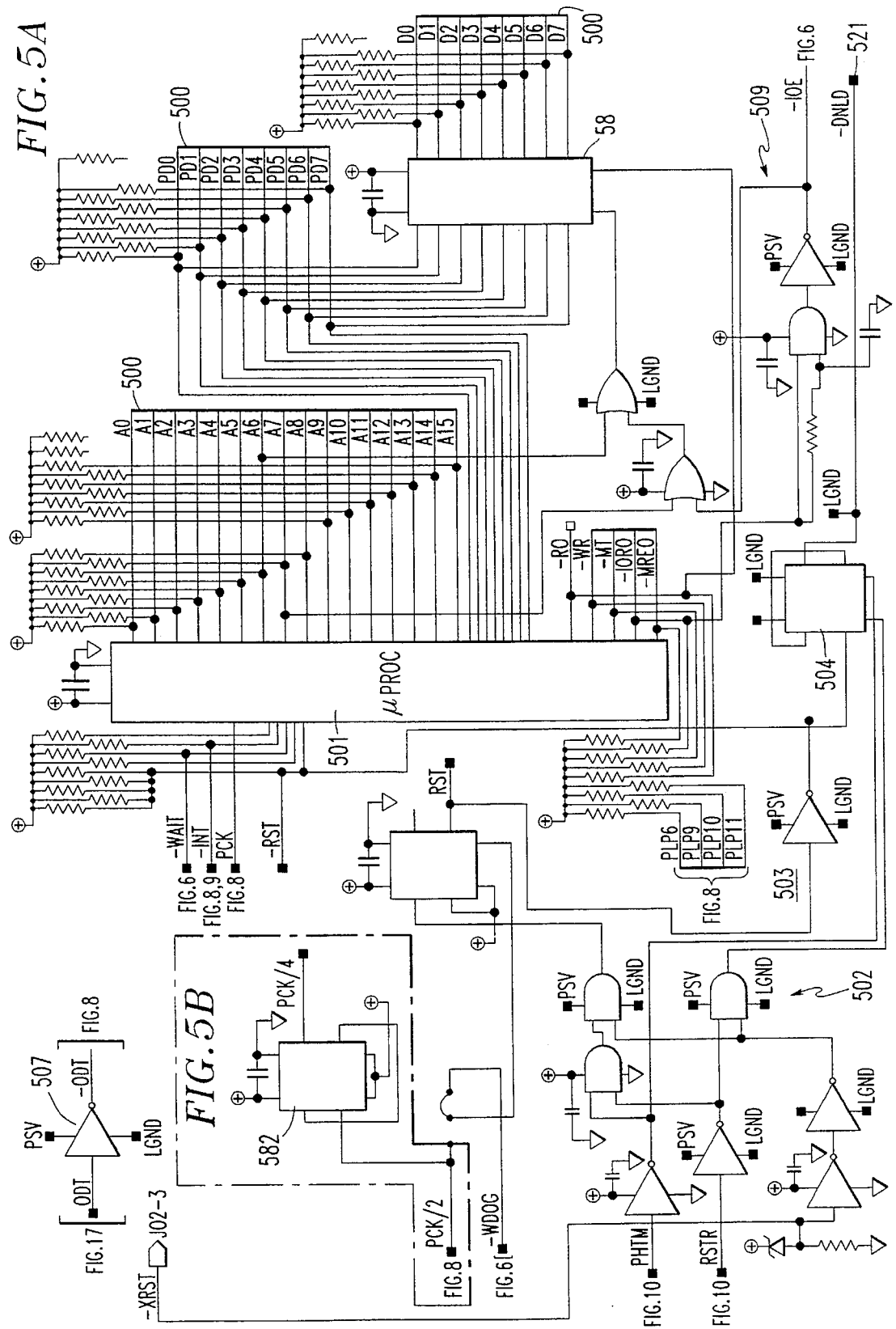
Figure 6:
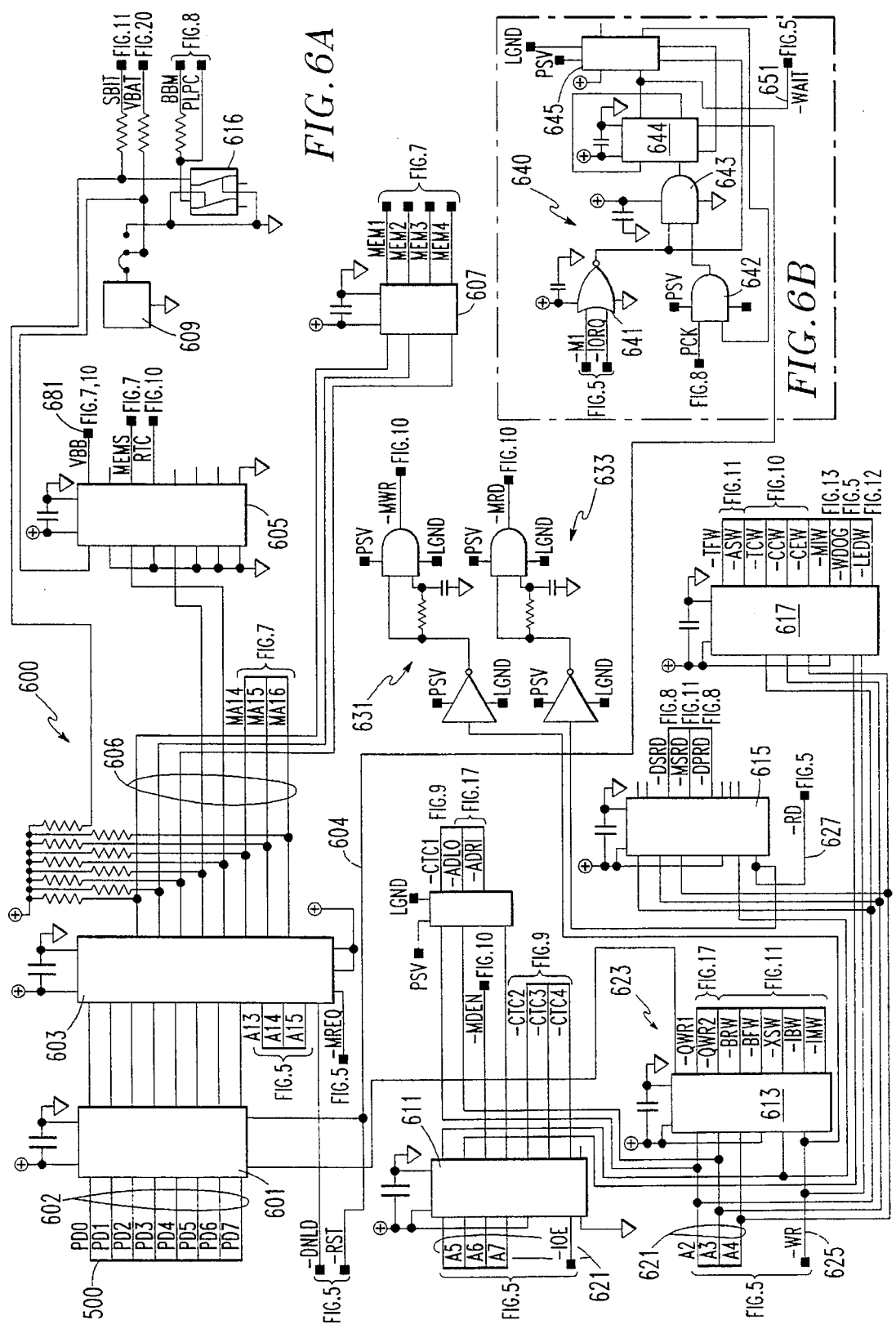

Referring now to FIGS. 3 and 4 which are schematic diagrams of the details of power supply unit 280, FIG. 3 shows a bank of power connection input pins 301 and a bank of power connection output pins 302, between which a power supply filter capacitor circuit 303 is connected. Power supply filter capacitor circuit 303 contains respective power supply filter capacitors for each of the respectively identified power supply voltages employed. In the circuit schematic of FIG. 3, the various power supply terminals include +5 VDC, +/−15 VDC, +/−100 VDC and −48 VDC central office battery. As shown, the pin terminals also provide for digital logic ground, analog ground, a 48 V common ground, and chassis ground.

FIG. 4 schematically illustrates a pair of DC—DC converter circuits 401 and 402, which are operative to provide supplementary regulated +/−5 VDC and +/−7.5 VDC power supply voltages employed by A–D and switched capacitor filter circuitry, to be described. DC—DC converter circuit 401 includes a pair of operational amplifiers 411 and 412 which are fed a stable voltage (10 VDC) applied to input node 410, from the voltage reference port VREF of a digital-to-analog converter 1720, shown in FIG. 17, to be described. Feedback regulating power output MOSFETs 421 and 422 are gated by the outputs of amplifiers 411 and 412 to supply the current necessary for circuitry that draws its power from the supplementary −/−5 VDC rails. (The +/−5 VDC is used primarily for ADC circuitry.) Similarly, DC—DC converter circuit 402 includes a pair of operational amplifiers 413 and 414 which are coupled to the 10 VDC input node 410. Power output MOSFETs 423 and 424 are gated by the outputs of amplifiers 413 and 414 to supply the current necessary for circuitry that draws its power from the supplementary +/−7.5 VDC rails. (The +/−7.5 VDC is used primarily for switched capacitor filters, to be described.)

Figure 7:
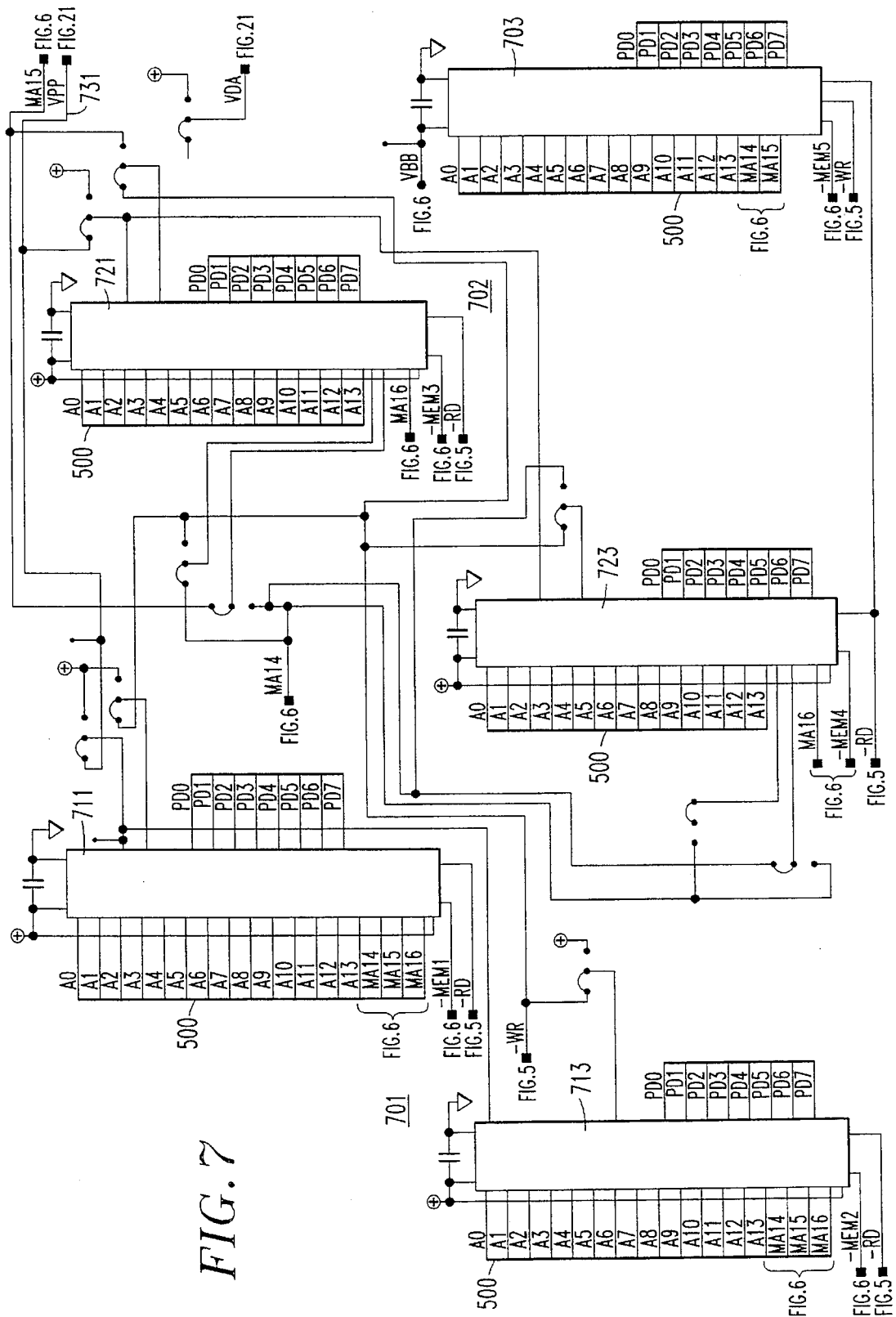

Referring now to FIG. 5A, the microcomputer unit 200 of the system diagram of FIG. 2 is schematically shown as comprising a (Z80 microprocessor-based) central processing unit 501, which is operative to execute the various RMU and MAU functions of the system (to be described below with reference to FIGS. 22–39), through which both RMU line circuit measurement functions and MAU line conditioning functions may be selectively controlled from a remote command site, in accordance with an operating system stored in that one of a pair of flash memory systems, schematically illustrated in FIG. 7, that has been declared to be active or 'on-line'. Microprocessor 501 has associated address ports (16 bits: A0–A15) and data ports (8 bits: D0–D7) coupled to a digital system bus 500. A buffer 580 provides isolation between a processor data bit (PD0–PD7) portion and a general data bit (D0–D7) portion of the system bus 500.

FIG. 5A further shows a (phantom/restore) memory system selection logic circuit 502, including input driver/gate circuit 503, which is coupled to receive respective phantom (PHTM) and restore (RSTR) mode logic levels, and a set/reset flip-flop 504, driven by driver/gate circuit 503, which is operative to specify which operating system in the two flash memory systems of FIG. 7 is to be executed. The system is configured to normally boot up in a given flash memory system (system 1). However, since the firmware contained in either memory system is reprogrammable, then, when a change in operating system configuration is carried out, it is necessary to ensure that the intended operating system (e.g. an upgraded system that has been downloaded into system 2) is run. To ensure that this happens, the logic levels of the PHTM and RSTR mode inputs are appropriately set, via external modem access, to control which operating system will be run (e.g. an upgraded operating system reprogrammed into flash memory system 2).

The architecture and selective programming of the pair of flash memory systems (flash memory system 1 and flash memory system 2) is preferably conducted in the manner described in the above-referenced co-pending Schillaci et al application. As described in that application, each of the flash memory systems has a cumulative address which space which is partitioned in banks of a prescribed depth each. As will be described below with reference to FIG. 7, a respective flash memory system is comprised of a pair of memory modules. An initial portion of each of flash memory system contains the same or common operating system code, while the remainder of that flash memory system is divided into contiguous, but individually addressable, banks of memory.

Each flash memory system is programmed by initially resetting the entirety of each bank to all '1''s; the binary state of selected ones of the memory cells in each reset bank is then changed to a '0'. In order to reprogram a previously programmed flash memory system, it is necessary to initially reset the entirety of each to-be-reprogrammed bank to all '1''s, and then change the binary state of one or more memory cells of each reset bank to a '0'.

When the RMU system of the present invention is initially configured for installation at a test and monitoring site, each of its two flash memory systems will have been loaded with the same firmware, so that the two flash memory systems contain redundant versions of the same operating system software. When the RMU is powered-up, the (phantom/restore) memory system selection logic circuit 502 will normally cause flip-flop 504 to set the logic level on download (−DNLD) control port 521, so that a prescribed flash memory system (normally system 1 as default) is accessed by processor 501, which then uses the operating system resident in the default memory system (until that system is modified). Thereafter, when the operating system is to be changed (e.g. upgraded or a previously inactive feature activated), the inactive (off-line redundant) system is modified by means of a download sequence and the system is reset. Upon reset, the previously inactive system (e.g. flash memory system 2) becomes the active system, while the previously active system (e.g. flash memory system 1) goes off-line.

As noted above, the respective phantom (PHTM) and restore (RSTR) mode logic applied to the selection logic circuit 502 will control whether operating system software that has been downloaded into the currently off-line flash memory system (phantom mode) or the normal system memory system (restore mode) is to be run, by asserting the appropriate register bit. On subsequent resets with power still being applied, the (DOWNLOAD) Q output (−DNLD) of flip-flop 504, which determines memory system mode (i.e. which flash memory system is to be employed), will toggle. The logical operation of driver/gate circuit 503 is such that the default state of the −DNLD bit is active high (restore) on power-up, which will initialize the DNLD bit when the +5 VDC power supply rail is approximately half of 5 VDC.

Also shown in FIG. 5A is a watchdog timer logic circuit 506, which is gated to driver/gate circuit 503 and serves to reset the processor circuit if the +5 VDC power supply rail drops to a value less than a prescribed voltage (e.g. 4.25–4.5 volts), or if the processor fails to periodically send a write strobe to the watchdog timer. The purpose of logic circuit 506 is to ensure that, upon system reset or power up, no write operations are effected until the system has been allowed to stabilize. The remainder of FIG. 5A is interface circuitry for coupling the requisite logic levels/signal timing to other components of the system, to be described. In addition, an output driver, signal conditioning logic circuit 509 is employed to tailor the characteristics of an input/output enable pulse to satisfy prescribed modem chip select parameters.

Shown in FIG. 5B is a processor clock divider flip-flop 582 divides a processor clock signal PCK/2 generated by a counter/timing signal chip 801, shown in FIG. 8A, to be described.

FIG. 6A schematically illustrates a memory access controller comprised of a processor data buffer register 601 and an associated address mapping look up table PROM (programmable read only memory) 603, which are cascaded together to form a memory decoder 600. The inputs of the memory decoder 600 are coupled via links 602 to the processor data portion of the system bus 500 and address bits A13–A15 of the address portion of the system bus. The translation matrix for memory map PROM 603 is shown in FIGS. 45 and 46. Memory map PROM 603 is also coupled to link 604 to receive the download logic bit (−DNLD) from the memory selection logic circuit shown in FIG. 5A, referenced above. As a consequence, blocks of a selected flash memory are accessed in accordance with the combination of the eight bits from decoder 601 on link 602, the (−DNLD) bit on link 604 and the processor address bits A13–A15, from the system bus. The outputs of PROM 603, on links 606, are employed to select flash memories of FIG. 7, to be described, via a decoder 607.

Coupled downstream of memory map PROM 603, a non-volatile random access memory controller chip 605 is employed to prevent corruption of RAM memory during power outages. Controller 605 monitors the battery line and is operative to couple a 3.6 volt battery voltage supplied by battery 609 to battery supply (VBB) port 681, which is coupled to the flash memory to preserve its firmware during a power outage. A two-bit DIP switch 616 is coupled to provide a manual switch capability for connecting the battery 609 to the system. Controller 605 also provides an enable output MEM5 at port 682 for random access memory shown in FIG. 7. FIG. 78 shows a switch table associated with the settings for switch 616.

FIG. 6A further shows input/output decoding circuitry for addressing peripheral devices with which the control processor communicates, or the various (I/O) relay drivers. The decoding circuitry is comprised of set of address decoders 611, 613, 615 and 617 which are coupled via address links 621 to the address bits A2–A7 of the system bus, and are operative to select respective ones of a set of input/output ports 623 during I/O write or read cycles, in accordance with write and read control inputs on lines 625 and 627, respectively. A write control signal on line 625 is further coupled through signal conditioning circuit 631 to condition a modem write strobe signal MWR, while a read control signal on line 627 is further coupled through signal conditioning circuit 633 to condition a modem read strobe signal MRD.

FIG. 6B shows a timing logic circuit 640 comprised of gates 641–643 and flip-flops 644, 645 which provide a prescribed delay or 'wait' signal WAIT at output port 651, which is used in association with the timing signals generated by counter timer chip circuitry to be described, to ensure that sufficient time is allowed for accommodating the propagation of processor interrupt signals that have been asserted.

FIG. 7 schematically illustrates, at 701 and 702, the above described dual flash (PROM) memory systems, and a random access memory (RAM) module 703. The first flash memory system (system 1) 701 contains flash PROMs 711, 713; the second flash memory system (system 2) 702 contains flash PROMs 721, 723. For purposes of a non-limiting example, each memory module is a sixteen bit address, eight bit data device, with the address and data bit ports being coupled to the system bus, as described previously.

As pointed out above, the architecture and selective programming of the flash PROMs 711, 713 and 721, 723 of the primary and secondary memory systems 701 and 702, respectively, is preferably conducted in the manner described in the previously identified co-pending Schillaci et al application. As pointed out in that application, and is shown by the system bus connections in FIG. 7, each flash memory module may be erased and programmed through a modem link. For this purpose, a DC programming or write voltage VPP, supplied via link 731, is activated at 12 VDC for flash erasure or reprogramming, one device at a time. To read the contents of a flash memory module, VPP is inactive at zero volts.

The operating system firmware that is stored in flash memory systems 701 and 702 is preferably programmable and modifiable in accordance with the mechanism described in co-pending patent application by L. Moser et al, filed on even date herewith, Ser. No. 08/193,814, now U.S. Pat. No. 5,504,801, issued Apr. 2, 1996, entitled: "User-Controlled Electronic Modification of Operating System Firmware Resident in Remote Measurement Unit for Testing and Conditioning of Subscriber Line Circuits," assigned to the assignee of the present application and the disclosure of which is incorporated herein.

As described in that application, the problem of labor costs and down time required for a craftsperson to perform on-site or factory-returned modification of operating system firmware in a remote measurement and test unit are substantially reduced by configuring the firmware-memory architecture of the unit's micro-controller of a pair of redundant, erasable flash memory systems, that enable the operating system firmware of a remote monitoring unit to be selectively, electronically modified, in particular erased, replaced and features selectively turned on, from a supervisory device (e.g. a data terminal coupled via an attendant modem to the central office, or via a personal computer connection to a serial port (e.g. RS-232 port) of the test unit).

FIG. 8A shows an input/output control/communication (KIO) supervisory unit, diagrammatically illustrated as comprising a Zilog Z84C90-based counter/timer chip (CTC) 801, which has a pair of (eight bit) parallel I/O ports 802, 803, a multi-clock port 806, and a pair of full-duplex serial ports 811, 812. Each of parallel I/O ports 802, 803 has eight, individually configurable read or write bits. When employed as read inputs, these bits may be configured to initiate interrupt routines. Internally, CTC 801 comprises four presetable, eight bit counters, which are employed to generate prescribed clock signals for the system. Serial communication ports 811, 812 have variable baud rate and synchronous or asynchronous capability and are coupled to an RS-232 serial communication driver/receiver 820. The functions of counter/timer chip 801 are listed in a Counter Functions Table shown in FIG. 77. Also shown in FIG. 8A is a clock divider flip-flop 851 which subdivides a counter/timer clock to provide a fifty percent duty cycle clock signal.

FIG. 8B shows read port registers 821 and 822 associated with eight and four bit DIP switch 831 and 832, respectively, settings for which are employed to set prescribed system configuration parameters in accordance with the DIP switch tables shown in FIGS. 79 and 80.

Figure 9A:
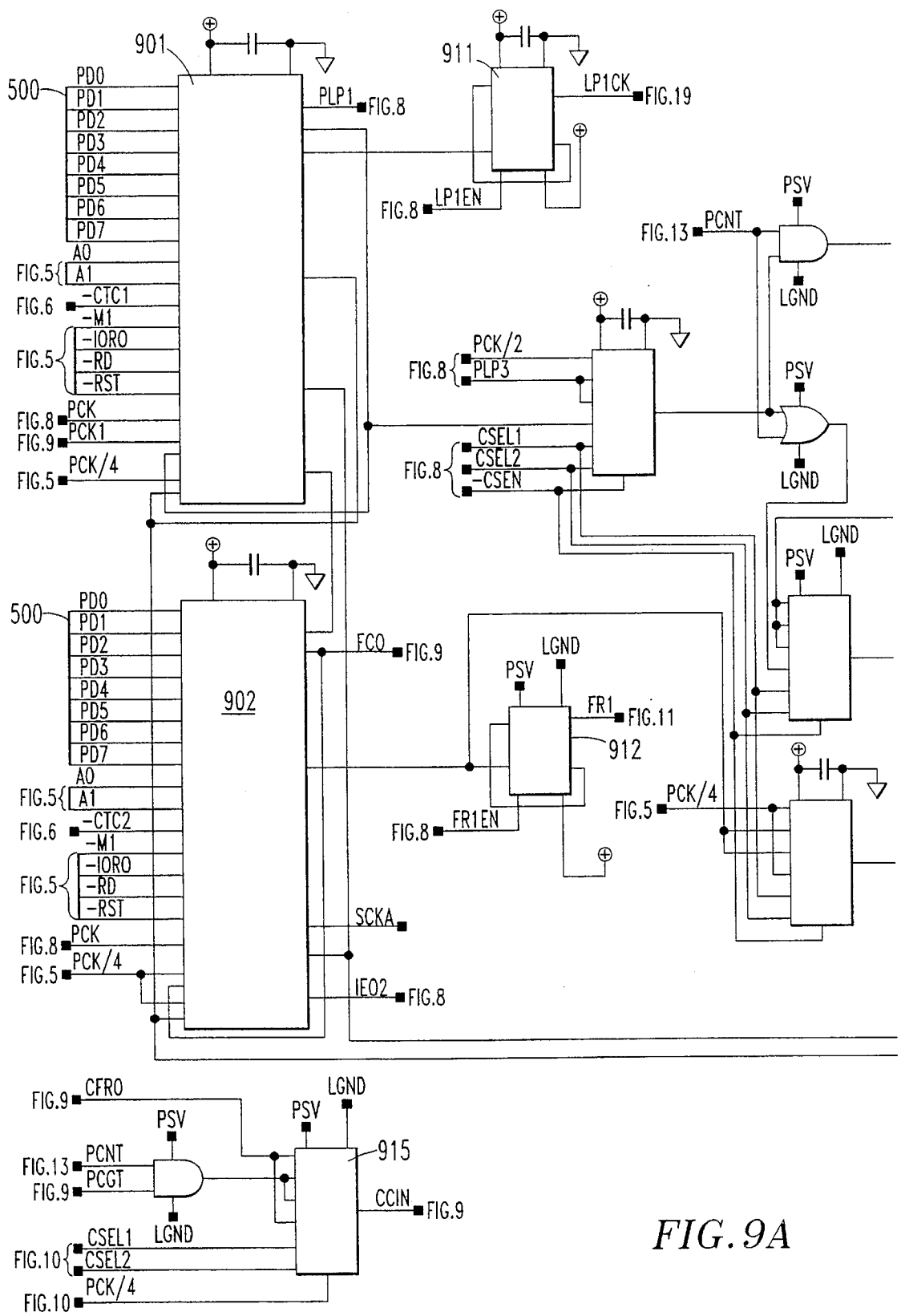
Figure 9B:
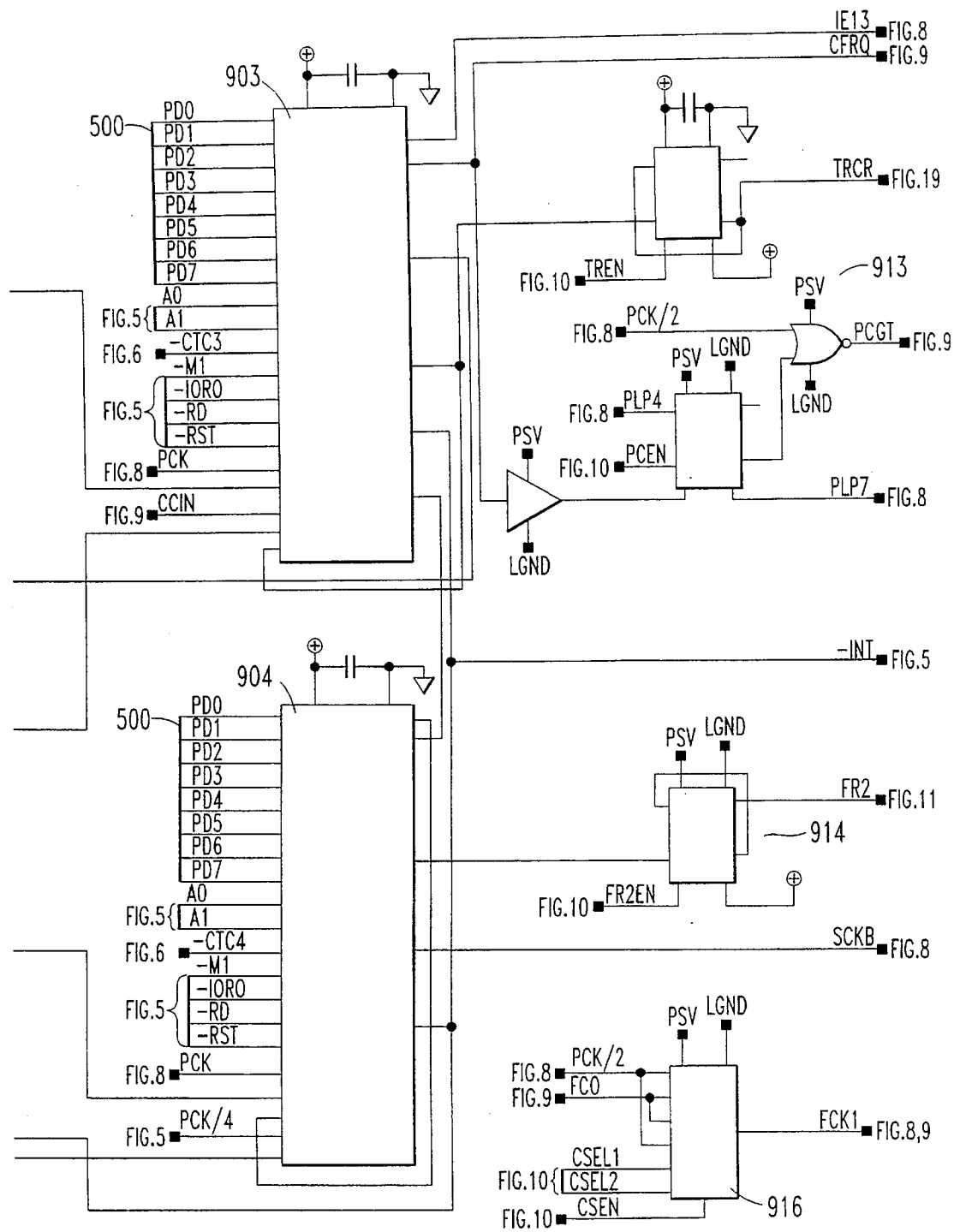

FIG. 9 schematically illustrates a set of four counter/timer chips (CTCs) 901, 902, 903, 904, and associated coupling logic circuits 907, 908, each counter having four internal eight bit counter channels. These counter/timer chips are employed as scheduler timers, time interval counters, pulse counters and clock generators for various system functions listed in the Counter Functions Table of FIG. 77. The four counter/timer chips 901–904 and counter/timer chip 801 (FIG. 8A) are connected in a daisy chain configuration via the higher priority IEO output bits and lower priority IEI input bits. As can be seen from FIGS. 8 and 9, from highest to lowest priority interrupts, the counter units are connected in the order: 901-902-801-903-904. Associated with the timer/counter chips are respective selector logic circuits 911–9164, through which the various clock and timing signals provided by CTCs 901–904 are shared among the CTCs for tone and timing signal generation, such as that employed for rotary pulse generation and capacitance tone generation for capacitance measurements, to be described.

Figure 10A:
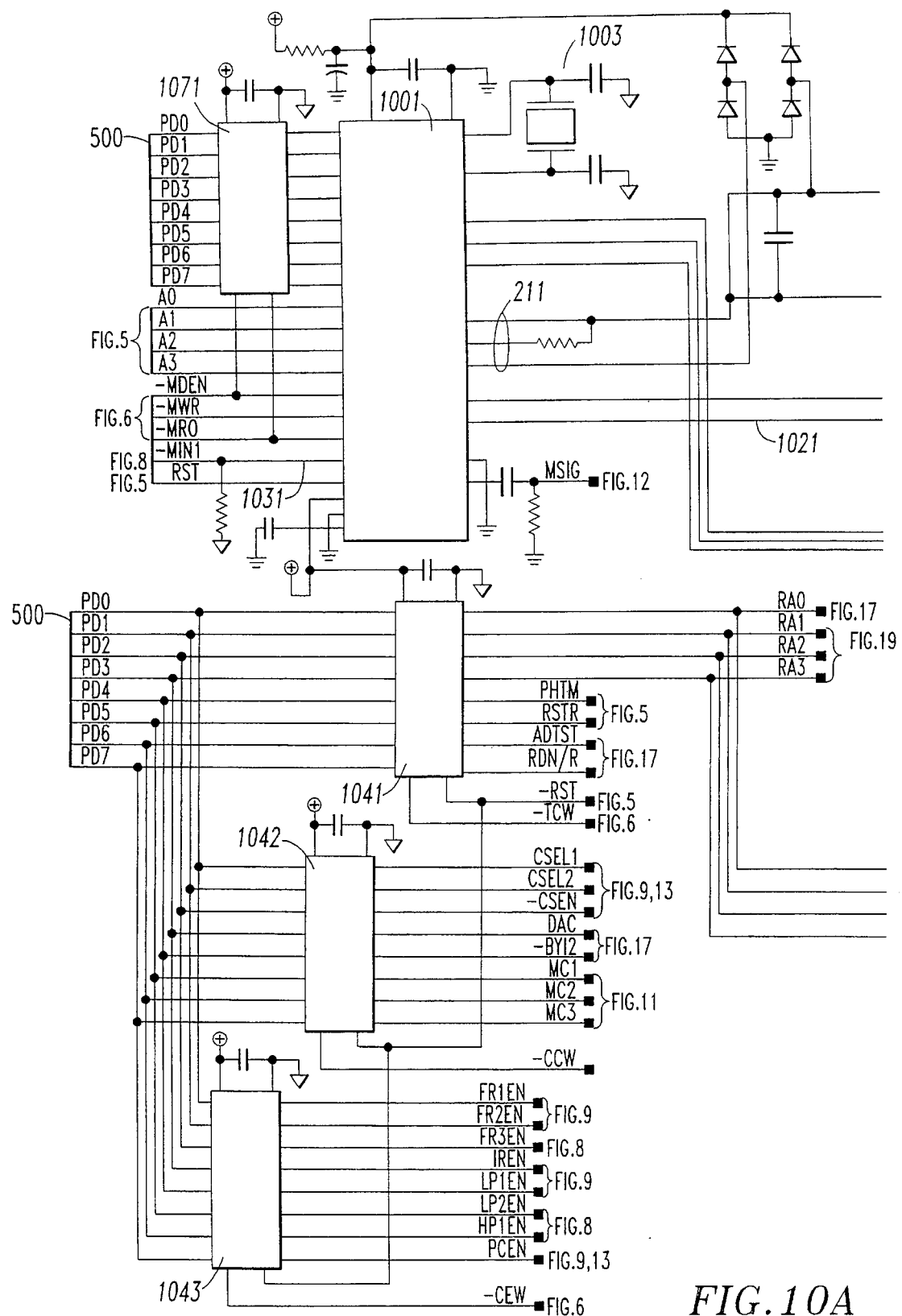

FIG. 10 schematically illustrates the circuit configuration of communication unit 210, through which the system is interfaced with external communication links. Communication unit 210 includes an on-board modem circuit 1001, such as a Bell 212A/103 modem, having an internal UART, as described above, for interfacing with processor 501 (FIG. 5). Modem 1001 is driven by an associated 11.0592 MHz oscillator 1003, and has a selectable baud rate of 300 or 1200 baud, so that, via modem port 211, communications may be carried out at customary baud rates of 300 or 1200 bits per second, for data access for a telephone line interface.

Modem port 211 is coupled through modem/line interface circuitry, including a transformer 1010 and a solid state relay K1 to modem tip and ring ports 1011 and 1012. A ring detect circuit 1015, including opto-isolator 1016, is coupled across the modem tip and ring lines 1013 and 1014 and has its output coupled to a ring detect input port 1021 of modem 1001. If a legitimate ring signal is detected, a ring detect logic level is asserted at ring detect input port 1021. Modem 1001 signals the processor by means of modem interrupt outputs on port MINT to CTC 801. A buffer 1071 provides a transceiver interface between the processor data portion of the system bus. Also shown in FIG. 10 is a set of (three) write port registers 1041, 1042, 1043, the D inputs of which are coupled to the system bus, employed for the control and selection of test functions detailed in the register tables of FIGS. 49–76.

Figure 11A:
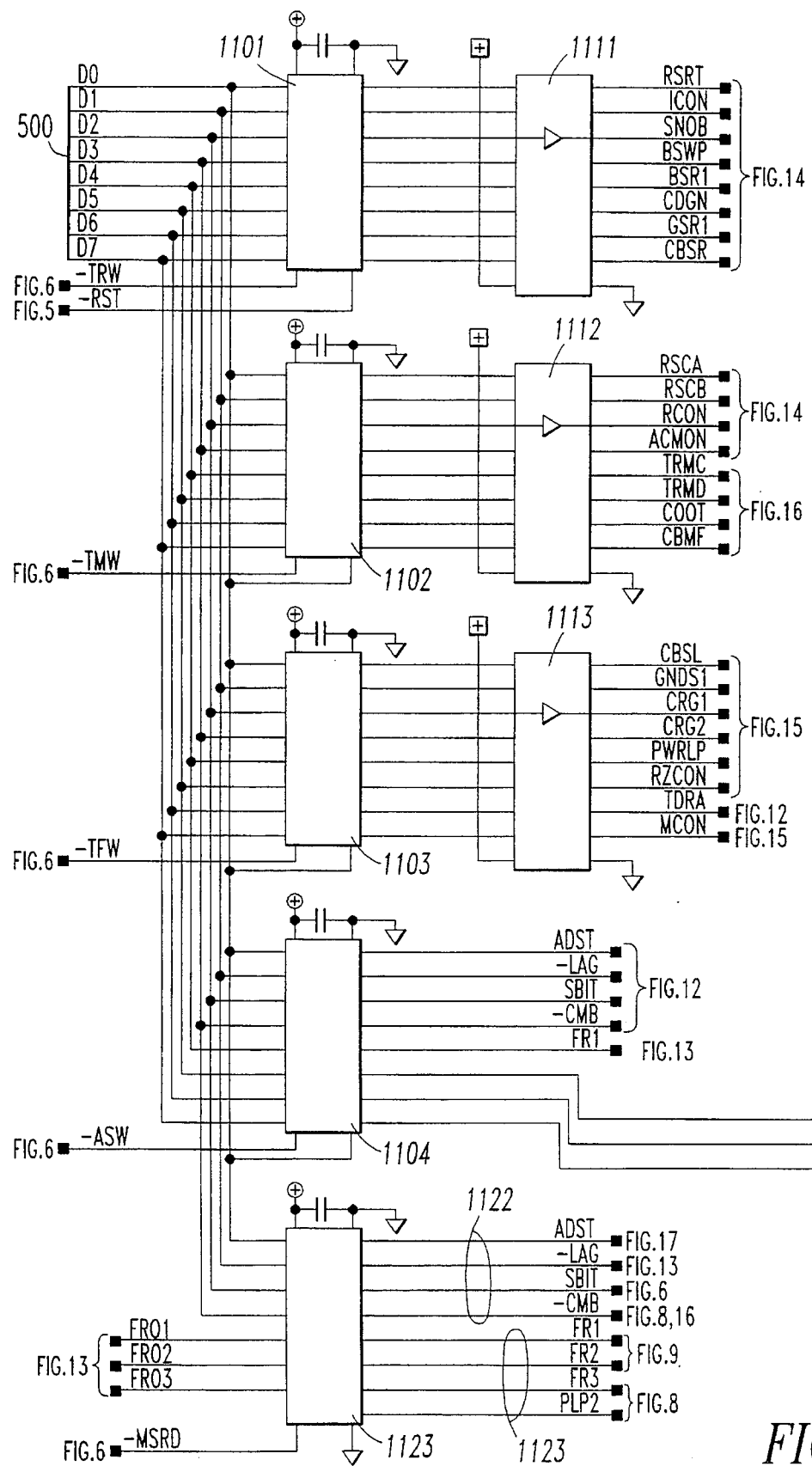
Figure 11B:
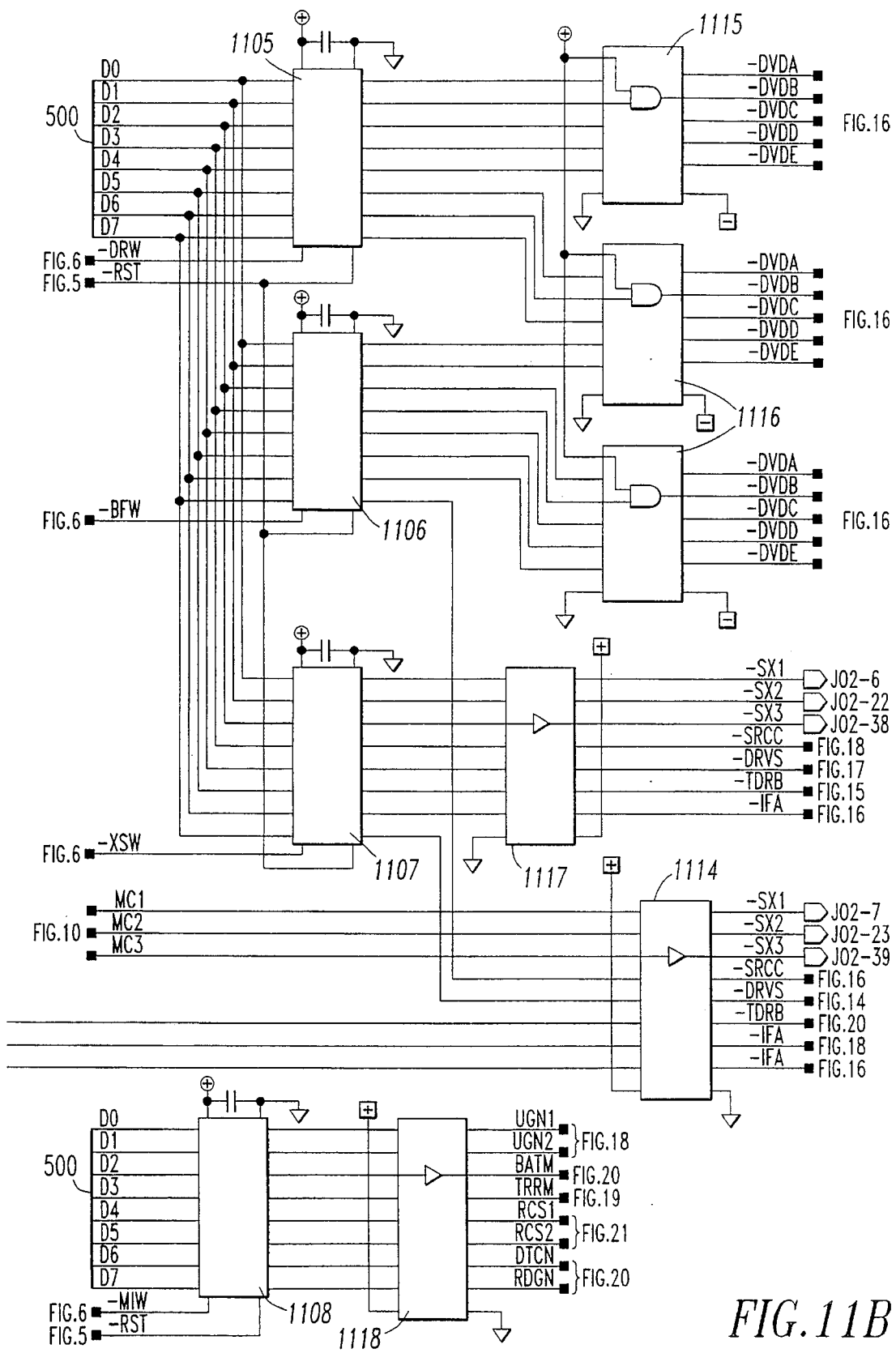

FIG. 11 shows a plurality of write ports 1101–1108 and associated relay drivers 1111–1118 for setting up test functions of the system. Write ports 1101–1108 are comprised of latches which store data asserted on the data bus each time a new event or stage of a test function requires that the test function bits change state. For the most part, the write bits are used to control the relays for establishing the requisite test parameters, described below. Also shown in FIG. 11 is an additional register 1121, an upper four bits of which on link 1122 are employed as a read port, with the lower four bits on link 1123 being used as a buffer for digital signals employed for tone generation. As noted earlier, register tables in which the respective mnemonic identifiers of the register data ports are listed with their associated functionalities are shown in FIGS. 49–76.

FIG. 12A schematically illustrates components of detector unit 260 as including a variable gain (e.g. X1 or X10) amplifier stage 1201, having a controllable input resistor bank 1203, respective resistors of which are selectively switched in circuit with a set of input terminals 1205 to which various AC signals from the test pair, the monitor pair, modem or high impedance monitor are coupled. The output of amplifier stage 1201 is coupled to a detect (DET) output terminal 1207 and to a DTMF receiver 1211, output ports 1213 of which are coupled to the system bus for application to the KIO CTC 801 of FIG. 8A, referenced above. DTMF receiver 1211 is driven by a 3.58 MHz oscillator crystal 1215, which also provides the clock 3 MCK for the system analog-to-digital converter (ADC), shown in FIG. 17, to be described.

FIG. 12B shows a threshold detector circuit 1221, the input of which, via link 1223, is coupled to detect the open or closed condition of contact 1225 of an alarm relay K7.

FIG. 12C schematically illustrates an off-hook detection comparator 1231, which is coupled to an off-hook detect (OHD) input terminal 1233, to which a line under test and a rotary dial pulse input may be applied. Comparator 1231 is operative to compare the monitored current with a threshold to determine whether the subscriber equipment under test is off-hook. The logic level of off-hook port 1232 is monitored through CTC 801 to determine whether the line is off-hook. FIG. 12D depicts a bank 1241 of light emitting diodes (LEDs), which may be panel or board mounted, and serve to provide visual status information to service and maintenance personnel. The LEDs of the bank 1241 are selectively energized by processor-sourced drive inputs to an LED drive register 1243, which is coupled to the system bus, as shown.

FIG. 13A schematically illustrates components of measurement unit 270, which performs extremely precise AC and DC voltage and current measurements. Shown at 1300 is a phase detector unit which is operative to measure the phase difference between two sine waves or tone signals, such as a reference audio tone and a line response tone associated with the measurement of the capacitance of the telephone line, as described in co-pending application Ser.

No. 08/193,817, now U.S. Pat. No. 5,440,251, issued Aug. 18, 1995, filed coincident herewith, by Alex Knight et al, entitled: "Phase Differential Measurement Circuit," assigned to the assignee of the present application and the disclosure of which is herein incorporated.

As described in that application, the phase differential measurement circuit 1300 converts capacitance measurement sine wave signals into digital format and preprocesses the digitally formatted signals into digital code values that may be readily analyzed by the system microprocessor. As schematically illustrated in FIG. 13A, the phase differential measurement unit includes first and second input terminals 1301 and 1302, to which are respectively applied a reference tone signal (e.g., a 30 Hz tone) (STRT), and a line response tone signal (STOP) measured across the tip and ring portions of a telephone line.

The reference tone STRT and the line response signal STOP are respectively coupled to first and second conditioning circuits, comprised of cascaded high gain amplifier stages 1303 and 1304 and comparator circuits 1305 and 1306, respectively, which format the reference tone sine wave signal STRT and the line response signal STOP into first and second square wave signals. These first and second square wave signals are applied to a first exclusive-OR circuit 1310 and to first and second divide-by-two flip-flop circuits 1311 and 1312, respectively. The divide-by-two flip-flop circuits 1311 and 1312 produce third and fourth square wave signals, respectively, having a frequency which is half the frequency of the first and second square wave signals The output of the first exclusive-OR circuit 1310 comprises a pulse train the duration of each pulse being representative of a respective half-cycle phase difference between the two sine waves. This half-cycle phase differential signal, although having greater susceptibility to noise (e.g., 60 Hz hum) than a full-wave signal, has the advantage of providing twice the number of phase differential pulses in a given period of time of what a full-cycle signal can provide.

The square wave signal outputs of flip-flops 1311 and 1312 are applied to a second exclusive-OR circuit 1320, the output of which comprises a series of pulses, with each pulse being representative of a respective full-cycle difference between the reference and line sine waves. The full-cycle phase differential signal, although providing a coarser measurement of phase differential than a half-wave signal, has the advantage of being more stable and less sensitive to DC offset than are half-cycle measurements.

The output of each of exclusive-OR circuits 1310 and 1320 is coupled to first and second inputs 1321, 1322 of a multiplexer 1325, the output of which is coupled to a delay stage 1327. Multiplexer 1325 is controlled by the control processor via control input links 1326, to select which of exclusive-OR circuits 1310 and 1320 will have its output coupled to the output of multiplexer 1325. The output of comparator 1305 is clocked into a lead/lag flip-flop 1331 under the control of the Q1 output of delay stage 1327. The Q output of lead/lag flip-flop 1331 provides a logical level output signal (−LAG) representative of whether the phase of the first square wave signal STRT leads or lags the phase of the second square wave signal STOP.

The PCNT output of stage 1327 on line 1337 is coupled via the system data bus to the timing/counter chip 801 of FIG. 8A, which counts the number of pulses on line 1337. Over a prescribed count average interval, which serves to average the phase interval counts to provide consistent capacitance readings, then for a given capacitance and measurement source resistance, the PCNT pulse provided an indication of capacitance value measured. For the same valued source resistance and larger valued capacitance, the PCNT pulse width will increase.

FIG. 13B shows a tone generator circuit 1350, which is operative to produce an output voltage having a frequency that is defined by prescribed combination of a plurality of clock inputs and an amplitude that is digitally selectable by processor 501 applied to DAC 1720 in FIG. 17. The configuration and operation of such a tone generator circuit as may be employed for tone generator 1350 are described in detail in co-pending application Ser. No. 08/193,812, now U.S. Pat. No. 5,521,959, issued May 28, 1996, filed coincident herewith, by Richard Walsworth et al, entitled: "Programmable Source for Supplying Controllably Variable AC/DC Voltage Output for Telephone Line Measurement Apparatus," assigned to the assignee of the present application and the disclosure of which is herein incorporated.

As explained in that application, the output DOUT of the DAC is a processor adjustable DC voltage. In the circuit architecture shown schematically in FIG. 13, this DC voltage is applied to respective switches of a switch bank 1351, which controllably interrupt the output voltage provided by the DAC to the DOUT input port of a set of input links 1353. The switches of switch bank 1351 are opened and closed in accordance with a programmed selection of one or more of signal waveform inputs FRQ1–FRQ3 associated with respective square waves provided by timer/counter chips of FIG. 9, described above, and supplied to switch drivers of bank 1351 via input links 1353.

The outputs of switch bank 1351 are coupled to respective input resistors 1355 of a unity gain inverting summing amplifier 1357, the output of which is a multi-frequency signal composite AC signal waveform MRFQ derived at output node 1359. This composite AC waveform is coupled to a switched capacitor filter shown in FIG. 19, to be described. The cutoff points of the switched capacitor filter are programmable, so that odd harmonics may be excised from the fundamental frequency of the composite AC waveform. The output of the switched capacitor filter is then applied to an adjustable smoothing filter stage, which removes 'stairstep' transitions in the waveform associated with the operation of the switched capacitor filter and takes out the DC component. As with the DAC and signal waveform generators, operational parameters of each of the switched capacitor filter and adjustable smoothing filter are digitally programmable. The output of the smoothing filter is coupled via an inverting amplifier stage through a coupling resistor and microcontroller-driven switch to a (multi-frequency) tone drive output port.

As will be described, the tone drive output port provides an AC tone signal that can be selectively applied single-sided or differentially to the tip/ring portions of the telephone line of interest. The AC tone signal may also be applied to a high performance output amplifier stage employed for capacitance and resistance measurements.

FIG. 14A schematically illustrates testing and conditioning function relays of input/output (I/O) unit 230 that are operated under processor control to interconnect circuit components of the system in a prescribed connectivity path for a given system functionality. In particular, respective tip and ring input ports TTIN, TRIN of a test pair are coupled through an input relay K2 to an protection circuit 1401 that contains respective fuses 1403, 1404, resistors 1405, 1406, and varistors 1407, 1408, coupled in circuit with the line, as shown. A relay K3 (associated with metallic access functionality) is coupled across resistors 1405, 1406, so that these resistors may be controllably shorted.

A relay K4 is coupled in circuit with the tip and ring lines 1411 and 1412, respectively, so that, when operated, relay K4 causes the tip and ring connections to be reversed, so as to allow either line to be measured. Relay K5 is coupled to lines 1413 and 1414, which are coupled through relay K4 to the tip and ring paths. When operated, relay K5 shorts tip and ring together (used for both measurement and conditioning functions). Relay K6 is coupled to tip and ring paths 1411 and 1412 and to a set of precision (stable over time and temperature) diagnostic capacitors 1421, 1422 and 1423, as shown. Operation of relay K6 terminates tip and ring with a prescribed diagnostic capacitance, so that whether or not the capacitance measurement circuitry is operating correctly may be determined.

Also shown in FIG. 14A is a relay K8, which controllably places a thermistor 1425 in circuit with the tip and ring lines 1411, 1412 for temperature measurements. Relay K9 is coupled to controllably bridge the tip and ring paths 1411 and 1412 with a snubber circuit comprised of resistor 1427 and capacitor 1428, so as to effectively remove transients that may be introduced when a field battery is applied to a line. Relay K10 is coupled to controllably short tip or ring to ground, as shown. Relays K12, K13, K14 are coupled in circuit with respective resistors of a resistor network 1431, and are operative to controllably coupled a selected measurement source resistance in circuit with line DSRC and line 1414. Relay K15 is controllably operative to allow the test pair to be connected to external tip and ring lines 1432 and 1433, via an internal tip/ring test bus pair 1441 and 1442. FIG. 14B shows a relay K11 that is coupled in circuit with relays K21 and K22 of FIG. 15, described below, to provide an auxiliary low impedance monitor connection between a test pair line and a monitor line.

Figure 15:
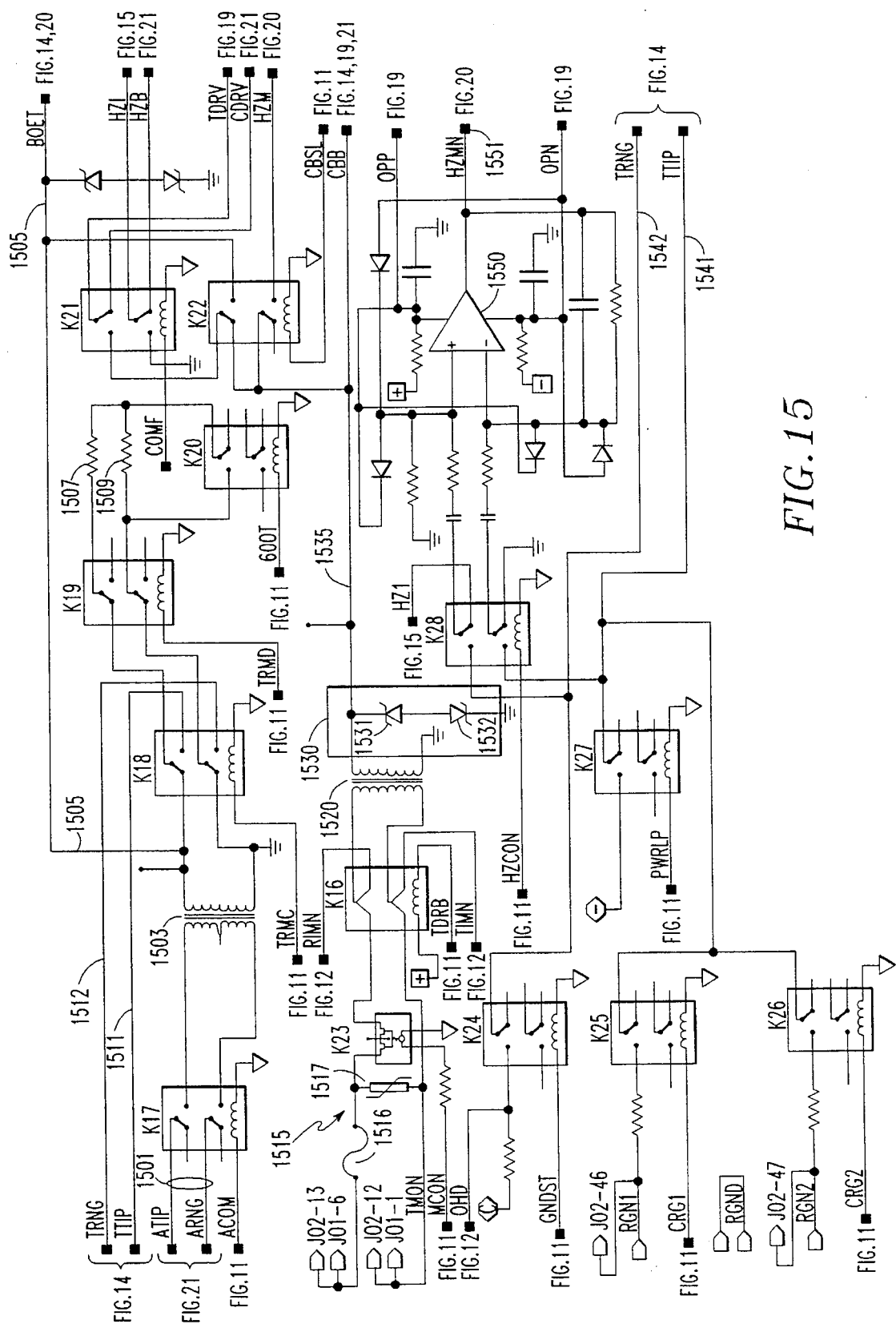

FIG. 15 schematically illustrates additional controllable connection circuitry, including a relay K17, which is operative to couple test pair signals applied to a tip and ring test pair 1501 of a line under test to a test pair isolation transformer 1503, the secondary of which is coupled to output line 1505. A relay K18 is operative to couple a termination resistance, the value of which is defined by the controlled energization of relays K19 and K20, coupled in circuit with termination resistors 1507 and 1509, in circuit with either the secondary of transformer 1503 or directly across the test pair tip and ring lines 1511 and 1512. Relays K21 and K22 are coupled in circuit with relay K11 of FIG. 14B referenced above, and are operative to provide multifunction test signal routing capability to or from the test and monitor tip and ring pairs, as will be described.

Respective tip and ring input ports of a monitor pair TMON, RMON are coupled through a monitor line protection circuit 1515 that contains respective a fuse 1516 and a varistor 1517, coupled in circuit with a monitor pair solid state relay K23 and a relay K16, which is coupled to a monitor pair isolation transformer 1520. Also, an overvoltage circuit 1530, comprised of Zener diodes 1531, 1532 is coupled between secondary line 1535 of transformer 1520 and ground. Secondary line 1535 is coupled to relay K22, referenced above.

Relays K24 and K27 are operative to couple CO battery voltage to the test pair TTIP and TRNG, on lines 1541 and 1542, respectively. Relays K25 and K26 are controllably operative to couple respectively different (externally applied) ringing signals RGN1 and RGN2 to test tip line 1541, as shown. Relay K28 couples the test tip and ring pair to the input of a high impedance monitor circuit 1550, the output of which is coupled to output port 1551 and is employed to measure AC signals from either the test pair or the monitor pair without introducing noise onto the line under test.

Figure 16:
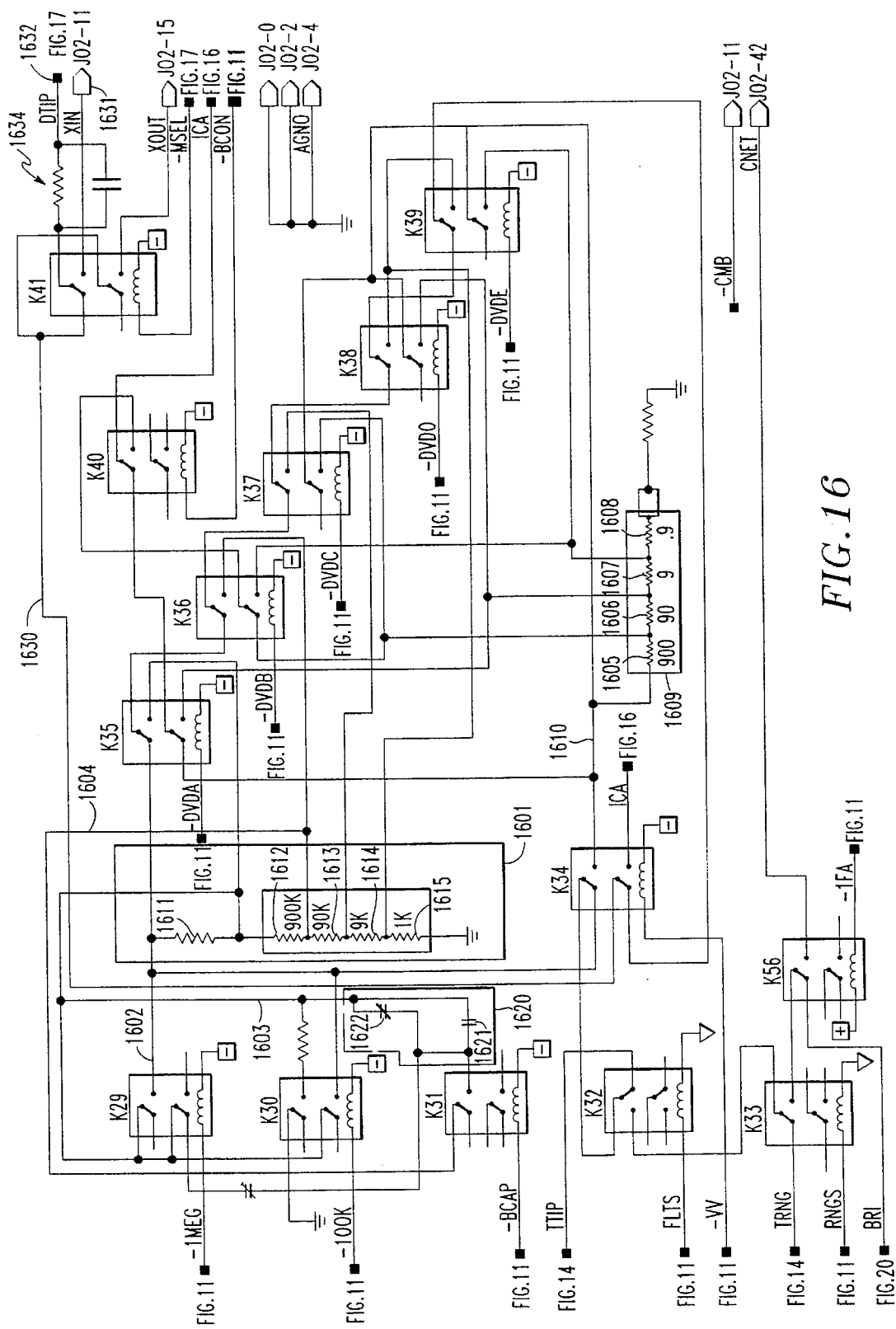

FIG. 16 shows voltage and current measurement circuitry employed for remote measurement AC/DC voltage and current measurements. For voltage measurements, a 10 megohm resistor divider network 1601, comprised of a 9M ohm resistor 1611 and a set of decade-divided resistors 1612, 1613, 1614 and 1615, is coupled between line 1602 and ground. For current measurements, a 1K ohm resistor divider network 1609, comprised of a set of decade-divided resistors 1605, 1606, 1607, and 1608, is coupled between line 1610 and ground. The values of these resistor divider networks are chosen so as to provide a range of input voltage values that conforms with the input range of an attendant analog-to-digital converter from which digital values are output for analysis by the control processor.

Relay K34 is operative to controllably select, via a control signal on input port (–I/V), whether a voltage (V) measurement or a current (I) measurement is to be made. Where a current measurement is to be made the test tip input (TTIP) is coupled to current shunt resistor network 1609. Where a voltage measurement is to be made the test tip input (TTIP) is coupled to voltage divider resistor network 1601.

For voltage measurements, a relay K29 is coupled in circuit with lines 1602 and 1603, so as to controllably short the 9M ohm resistor and thereby select the 1M ohm voltage divider configuration, while relay K30 is coupled in circuit with lines 1603 and 1604, so as to controllably bypass the 9M ohm resistor and short the 900 ohm resistor, thus selecting the 100 K ohm voltage divider configuration. Relay K31 is controllably operative to place a prescribed compensation capacitance 1620, formed of capacitors 1621 and 1622, across the 900 K ohm voltage divider, for the purpose of canceling out loss due to parasitic capacitance, and is also used in a divide-by-ten range of AC voltage measurements.

Relays K32, K33 and K56 are circuit path directing relays which are connected to provide various circuit paths from line inputs TTIP, TRNG or BRI) to the voltage divider network 1601 or current shunt resistor network 1609. Relays K35–K40 are coupled in circuit with the respective decade-divided resistor sections of resistor networks 1601 and 1609, and are operative to controllably select different voltage or current measurement ranges. Relay K41 is operative to controllably connect the signal that has been routed through the voltage divider or current shunt resistor networks to an outputs on line 1630, or an external input port 1631 to output port 1662 for application to the measurement circuitry shown in FIG. 17, to be described. A resistor-capacitor network 1634 provides a prescribed amount of isolation (absent attenuation) to protect downstream measurement circuitry (FIG. 17). Also shown in FIG. 16 are test conditioning relays which are operative to select measurement ranges, switch input signals and provide various measurement functions to be described.

FIGS. 17A schematically illustrates the circuit configuration of that portion of the measurement unit 270 which contains a precision AC-DC RMS converter and an analog-to-digital converter (ADC) for making DC measurements; FIG. 17B shows digital-to-analog converter circuitry; FIG. 17C shows a high-speed comparator for performing quick voltage checks on the line; and FIG. 17D shows a tone generator amplifier.

More particularly, FIG. 17A shows an AC-DC RMS converter, which provides a DC output voltage matching the AC RMS input and comprises a DC—DC converter chip 1701 having an input terminal 1703 selectively coupled through relays K42 and K43 to input terminal 1705, to which output terminal 1632 of FIG. 16 is coupled. Relays K42 and K43 provide paths for switching AC, DC or filtered signals into an ADC 1710. The voltage reference for DC—DC converter 1701 is derived from a potentiometer-controlled voltage reference circuit 1705, for adjusting the accuracy of the RMS-DC conversion performed. A DC voltage on a line under test is coupled via input port 1709 (DTIP) to ADC 1710, which is operative to measure DC input voltages, while filtering out 60 Hz hum.

FIG. 17B shows a digital-to-analog converter chip (DAC) 1720 having its voltage reference derived from a potentiometer-controlled voltage reference circuit 1707, for adjusting the accuracy of the converter. The output of DAC 1720 is coupled through a current-to-voltage translating buffer stage 1733 to a unity gain, inverting buffer stage 1733 and to a relay K44. The polarity of the output voltage produced by DAC 1720 is determined by the circuit path through relay K44—either from the output of buffer stage 1733 or through cascaded unity gain inverting buffer stage 1735.

FIG. 17C shows a high speed comparator circuit 1731, which allows the voltage on the line, relative to a programmable threshold, to be read rapidly, and may be employed for dial tone detection. The operation of such a high speed comparator circuit is described in detail in the above-referenced co-pending Walsworth et al application.

As described in that application, when testing or monitoring the line, the analog values of monitored parameters of the telephone line are digitized by the analog-to-digital converter, so that they may be read by the control processor. In order to enable the sensitivity range of the ADC 1710 to be quickly established, the output (DOUT) of the DAC 1720, shown in FIG. 17B, is coupled to a first input DOUT of comparator 1731. A second input CMPI is coupled (via a unity gain buffer amplifier 2001 and path through relay K52, shown in FIG. 20) to the ADIN portion of input port 1709 of ADC 1710. Comparator 1731 is operative to provide an output signal DTD on output terminal 1738 indicative of whether the input of the ADC 1710 exceeds the output of the DAC 1720. If so, the processor responds by immediately changing the sensitivity range of ADC 1710. As shown in FIG. 17B, the threshold voltage level DOUT for high speed comparator circuit 1731 is coupled through relay K44 from the output of DAC 1720. Thus, the polarity of the comparator's reference voltage is determined by the circuit path through relay K44—either from the output of buffer stage 1733 or through the additional inverting buffer stage 1735.

FIG. 17D shows a tone generation driver amplifier circuit 1751, coupled to receive a tone signal TONE on input terminal 1753, from a switched capacitor filter in FIG. 19 to be described, and provides an amplified tone output at TDRI port 1755.

Figure 18:
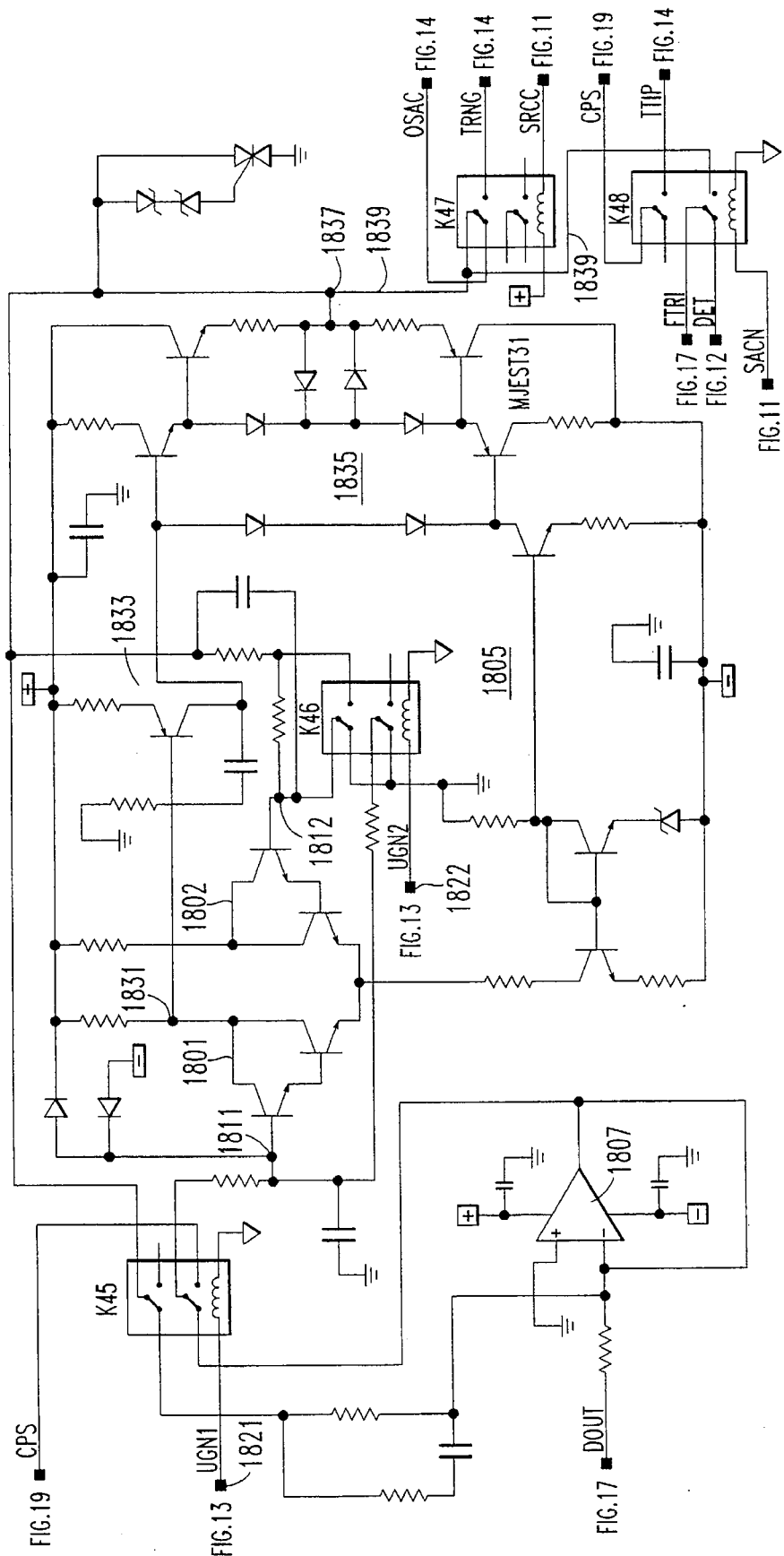

FIG. 18 schematically shows the circuit configuration of a discrete output power amplifier circuit, which is operative to provide AC voltages employed in capacitance measurements and DC voltages used in resistance measurements. The use of the output power amplifier circuit for sourcing AC voltages (for capacitance measurements) is described in detail in the above-referenced co-pending Walsworth et al application.

As shown in FIG. 18, the output power amplifier is comprised of differentially connected, Darlington-configured transistor pairs 1801 and 1802, the common emitter connections of which are connected to a bias current source 1805. Darlington pair 1801 has its base input 1811 coupled to relay K45, while Darlington pair 1802 has its base input 1812 coupled to relay K46. For AC voltage generation, respective unity gain control inputs UGN1 and UGN2 are applied to relay control terminals, so that the amplifier is operated as a unity gain amplifier. For DC voltage generation, the relays K45 and K46 remain unenergized in the connection path configurations shown, so that the output of DAC 1720 (FIG. 17B) is applied through a unity gain buffer amplifier 1807 base node 1811 of the amplifier circuit. In its illustrated configuration, the operational amplifier provides an inverting (X10) gain function.

The collector node 1831 of Darlington pair 1801 is coupled to a transconductance amplifier 1833, the output of which is coupled to a push-pull Class B output amplifier stage 1835. The output of push-pull amplifier stage 1835 is derived from output terminal 1837, which is coupled over line 1839 to relays K47 and K48, which provide AC/DC voltages to the respective ring TRNG and tip TTIP portions of the test pair and to source resistance and capacitance output ports in accordance with the mode of operation of the system, as will be described.

Figure 19A:
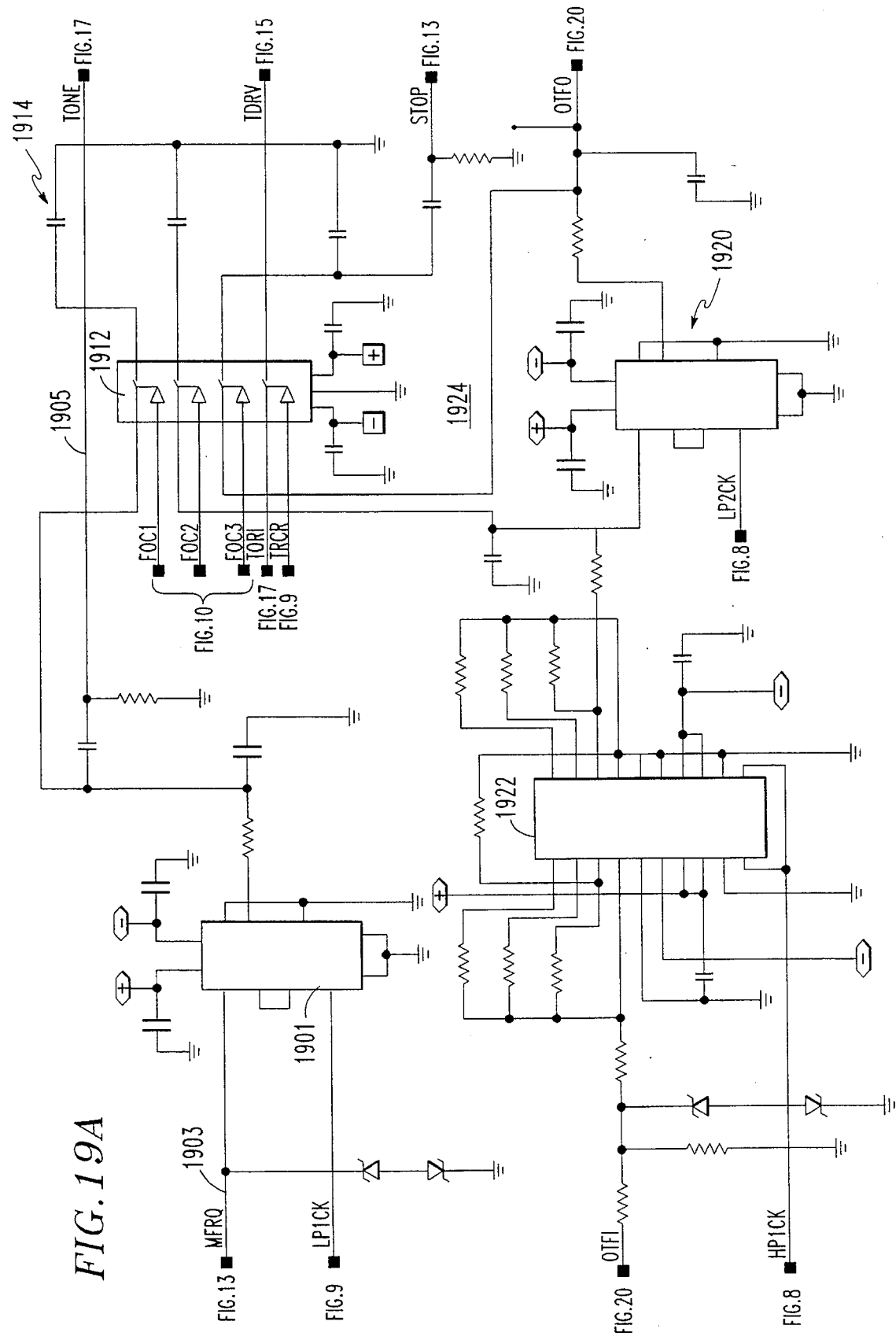
FIG. 19A shows filtering circuitry for the various tone signals including a first lowpass filter and a bandpass switched capacitor filter.

Referring to FIG. 19A, filtering circuitry for the various tone signals is shown as including a first lowpass (tone) filter 1901 is shown coupled to a multi-frequency tone generation input line 1903. Filter 1901 may comprise an eighth order Bessel lowpass filter chip, which is operative to convert square wave inputs on line 1903 to sine waves by removal of odd harmonics. The output of the filter is coupled to a TONE output line 1905, and to a switched capacitor stage 1910, comprised of a switch bank 1912 and an associated multi-capacitor stage 1914, which supplies additional capacitor filtering to a bandpass switched capacitor filter stage 1920.

Also shown in FIG. 19A is a bandpass switched capacitor filter stage 1920 is comprised of a fourth order universal filter, such as a Chebychev highpass filter, stage 1922 coupled in cascade with an eighth order Bessel filter 1924. Each switched capacitor filter stage has a prescribed clock frequency-to-filter cutoff frequency (e.g. on the order of 100:1). These filters are employed to ensure that line measurements are precisely conducted (e.g. removal of noise, reading dial tone).

FIG. 19B shows a selectable resistor network 1950, employed for source resistors for capacitor measurements, comprised of respective different values resistors 1951–1954, which are coupled in circuit with relays K49 and K50. Relays K49 and K50 are controllably operated to place a prescribed resistance in circuit with ports 1961 and 1962 for capacitance measurements. Also coupled in circuit with port 1961 and a reference port STRT, is signal conditioning circuit 1966 employed for capacitance measurements. (The STRT port corresponds to the reference tone STRT described above with reference to the capacitance measurement phase differential measurement unit illustrated in FIG. 13A.)

FIG. 19C shows a buffer amplifier 1970 having a potentiometer feedback resistor 1971 which is coupled in circuit with the output of and is operative to compensate for the loss through monitor pair transformer 1520 (FIG. 15).

Figure 20:
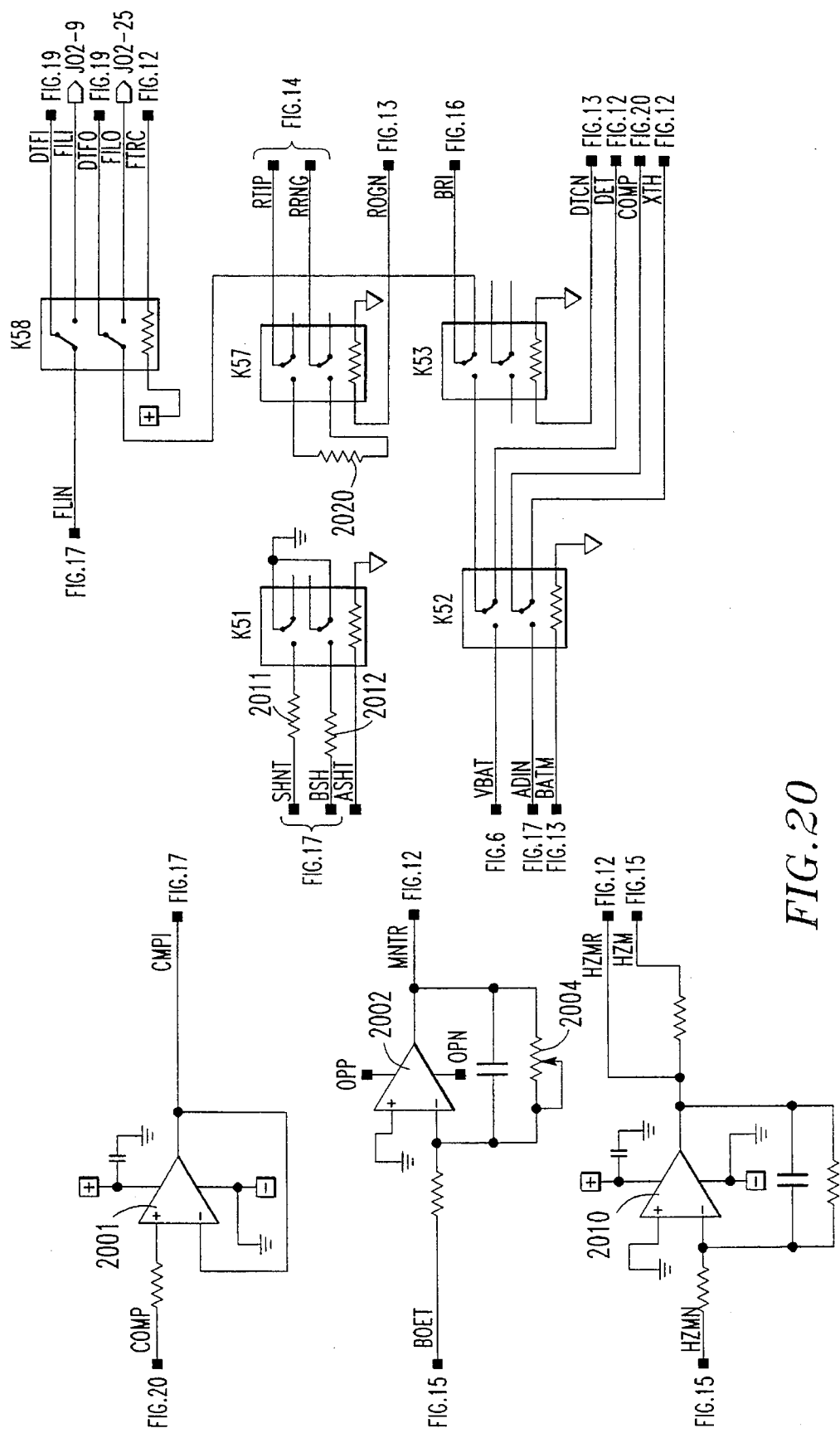

FIG. 20 schematically illustrates a set of buffer amplifiers employed in various circuit paths of FIGS. 15 and 17C. In particular, an operational amplifier 2001 is coupled as a high impedance input buffer for the high speed comparator 1731

(described above with reference to FIG. 17C). A buffer amplifier 2002 has a potentiometer feedback path 2004, which is coupled in circuit with the output of and is operative to compensate for the loss through test pair transformer 1503 (FIG. 15). Buffer amplifier 2010 is coupled in circuit with the high impedance monitor stage 1550 (FIG. 15) to provide an overall gain of unity.

Relay K51 is coupled in circuit with a pair of (100 ohm) resistors 2011 and 2012, and is controllably operative to place these resistors in circuit with the RMS-DC converter 1701 of FIG. 17. Relays K52 and K53 are coupled to route various signals to the voltage divider and current shunt networks 1601 and 1609, respectively, in FIG. 16. Relay K57 is controllably operative to place a resistor 2020 across the input of the test pair TTIP and TRNG of FIG. 14A.

Figure 21:
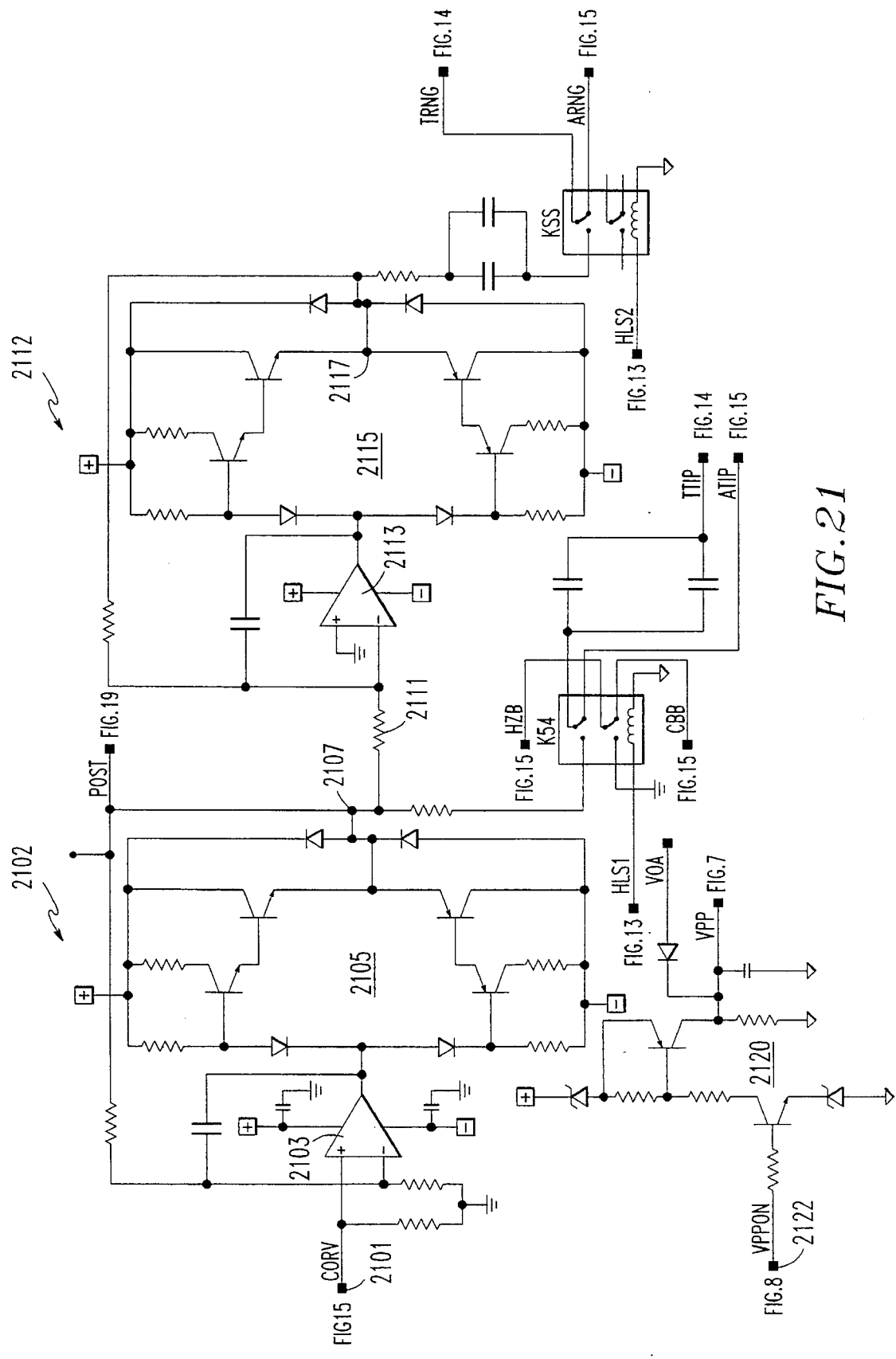

FIG. 21 schematically illustrates the configuration of an AC source amplifier (power boost circuit) employed for metallic access conditioning applications. In particular, single sided AC signals to be applied to the test pair are coupled from an input terminal 2101 to a first amplifier stage 2102 having an input buffer amplifier 2103, the output of which is coupled through a push-pull stage 2105 to an output terminal 2107. Output terminal 2107 is coupled to the input terminal 2111 of a second amplifier stage 2112, and to relay K54 which is operative to controllably couple the AC signal output of the first stage 2102 to the tip portion of the test bus.

Similarly, output signals from the first amplifier stage 2102 are coupled to an identical second amplifier stage 2112, having a buffer amplifier 2113, the output of which is coupled through a push-pull stage 2115 to an output terminal 2117. Output terminal 2117 is coupled to relay K55, which is operative to controllably couple the AC signal output of the second stage 2112 (which is the same amplitude output by the first amplifier stage 2102, but shifted in phase by 180 degrees) to ring portion of the test bus. Thus, when used together, the two amplifier stages 2102 and 2112 are operative to provide a large amplitude, differential tone across tip and ring.

Also shown in FIG. 21 is an amplifier circuit 2120, which is operative, in response to a control signal at input terminal 2122 from timer/counter chip (CTC) 801 of FIG. 8A, to generate a 12 VDC programming voltage for the flash memory devices of FIG. 7, described above.

As pointed out above, the integrated line test and conditioning architecture of the present invention schematically shown in detail in FIGS. 3–21 is capable of performing both remote measurement unit (RMU) and metallic access unit (MAU) functionality, each of which may be individually accessed and controlled. The RMU performs mechanized loop testing (MLT) tasks, while the MAU imparts prescribed electrical conditions to a specified line circuit. The operating system software through which each set of system functionality may be controllably executed by control processor 501 (FIG. 5) is stored in the quasi redundant flash memory systems 701 and 702 of FIG. 7. In the description to follow, various RMU test and MAU conditioning routines, and the manner in which the above described circuit architecture is controlled in accordance with the operating system software stored in the currently active flash memory system to execute such routines, will be explained in detail.

RMU OPERATING SYSTEM

When controllably accessed to operate as an RMU, the system responds to instructions from a command site (loop maintenance operations system) and performs single-line demand tests on a line provided by a pair gain system. A non-limiting example of a pair gain system that may be employed for this purpose is described in the Canadian patent to A. Chan et al, entitled "Pair Gain Applique," No. 1,295,758. Access to the system may be effected by a modem link with the central office, employing a modem interface communication protocol used mechanized loop testing system to drive the system as an RMU.

As pointed out briefly above, the RMU functionality embedded in the circuit architecture and software that controls the operation of such circuitry includes the ability to measure AC and DC voltage and current, and three way resistance and capacitance (between tip and ground, ring and ground, and tip and ring). The RMU is also able to analyze rotary dial pulses, dial tone, and dual tone multi-frequency (DTMF) tones. It can also measure signal transmission levels, generate test tones, and allow test personnel to establish callback and alternatively monitor, apply ringing, talk and perform tests on a separate telephone line. Each of these test capabilities will be described individually below.

In order to facilitate the description, rather than detail circuit flow paths through the detailed circuit schematics of FIGS. 3–21 for each function, a separate one of a set of block diagrams of FIGS. 22–38, which show the principal circuit components of the system architecture described above for the operation of interest, will be referenced. Details as to the actual participation of individual components of the circuit architecture schematically shown in FIGS. 3–21 for a respective RMU function are readily ascertainable from the schematic Figure numbers given in the respective RMU test/measurement operation block diagrams of FIGS. 22–38.

Figure 22:
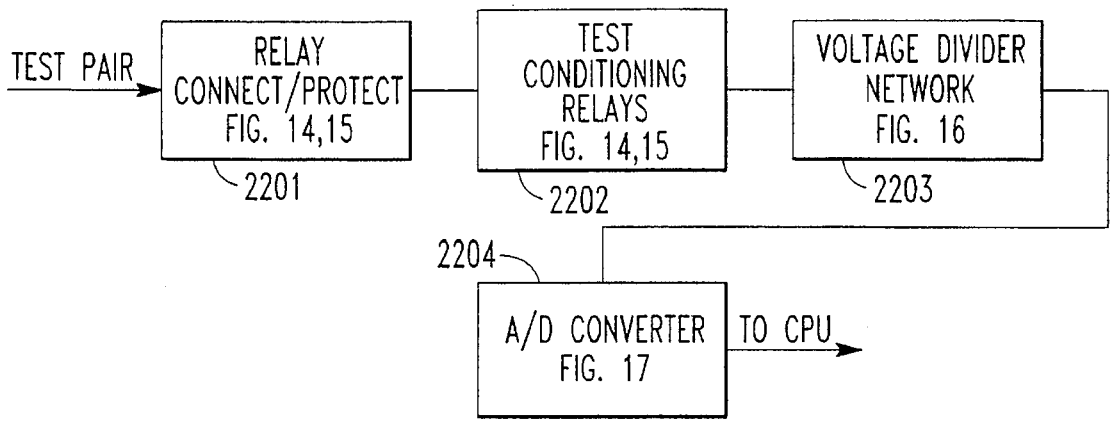

1. DC Voltage Measurement (FIG. 22)

A DC voltage measurement measures DC voltage conditions presented on the test bus. The conditions can be internally generated or they may be presented externally from the outside line under test via relay. For this purpose, a shown in FIG. 22, at 2201, DC test pair voltages (e.g. tip-ground or ring-ground) are brought in through the input connect/protect relay circuitry (FIGS. 14–15). Via a path 2202 through the test conditioning relays (FIGS. 14–15), the test pair analog voltages are steered to the 1/1, 1/10, 1/100, or 1/1000 segment of voltage divider network 2203 (shown at 1609 in FIG. 16). At 2204, the divided analog DC voltages are read by the AD converter (1710, FIG. 17A) which, in turn, sends digital data representative of the measured analog DC voltage to the CPU (501, FIG. 5).

Figure 23:
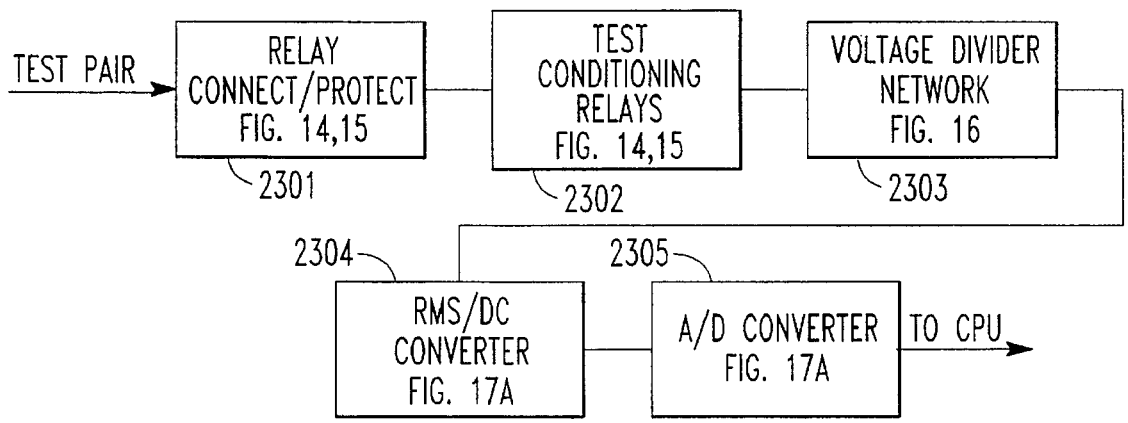

2. AC Voltage Measurement (FIG. 23)

An AC voltage measurement is similar to a DC voltage measurement in that it measures AC voltage conditions presented on the test bus, and requires that the signal be routed the AC/DCRMS converter prior to being coupled to the AD converter, where the voltage is read and digitized. Namely, with reference to FIG. 23, as in the case of the DC test pair voltages described above, at 2301, analog AC test pair voltages (e.g. tip-ground or ring-ground) are brought in at 2301 through the input relay connect/protect circuitry (FIGS. 14–15). Via a conditioning relay circuit path 2302 (FIGS. 14–15), they are then steered to the 1/1, 1/10, 1/100 or 1/1000 voltage divider network 2303 (1601, FIG. 16). The divided analog AC voltages are then coupled at 2304 to the RMS/DC converter (1701 in FIG. 17A), which translates the RMS voltage to an analog DC voltage. This analog DC voltage is then read at 2305 by the AD converter (1710, FIG. 17A), which in turn sends digital AC voltage measurement data to the CPU (501, FIG. 5).

Figure 24:
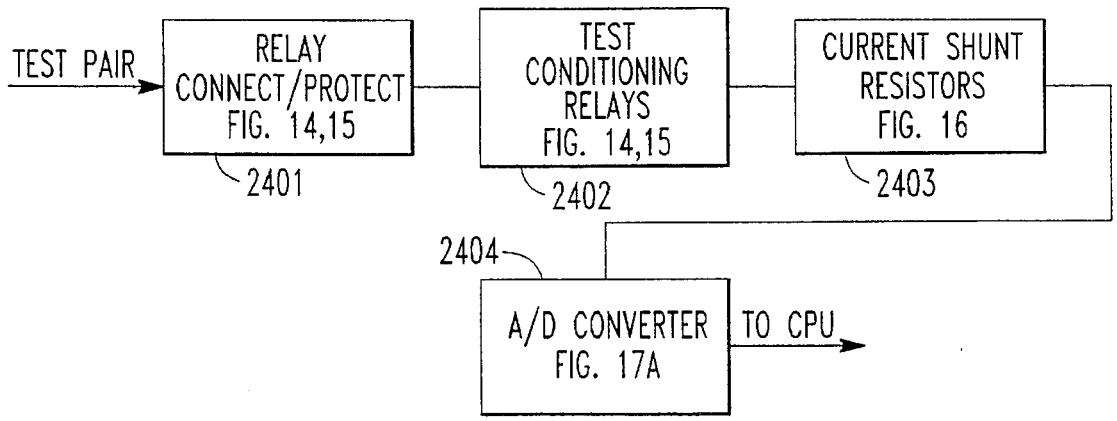

3. DC Current Measurement (FIG. 24)

Both DC and AC current measurements are similar to voltage measurements, except that the previously described current resistor network is employed in lieu of the voltage divider resistor network. More specifically, for DC current measurements, DC test pair currents (tip-ground or ring-ground) are brought in at 2401 through the input relay connect/protect circuitry (FIGS. 14–15), and steered at 2402 via the test conditioning relays (FIGS. 14–15), to the 1K, 100, 10 or 1 ohm current shunt resistors 2403 (of current shunt network 1609, FIG. 16). The resulting analog DC voltage, which is used to calculate current, is read at 2404, by the AD converter (1710, FIG. 17A). The digital DC current measurement-representative data output by the AD converter is then sent to the CPU (501, FIG. 5).

Figure 25:
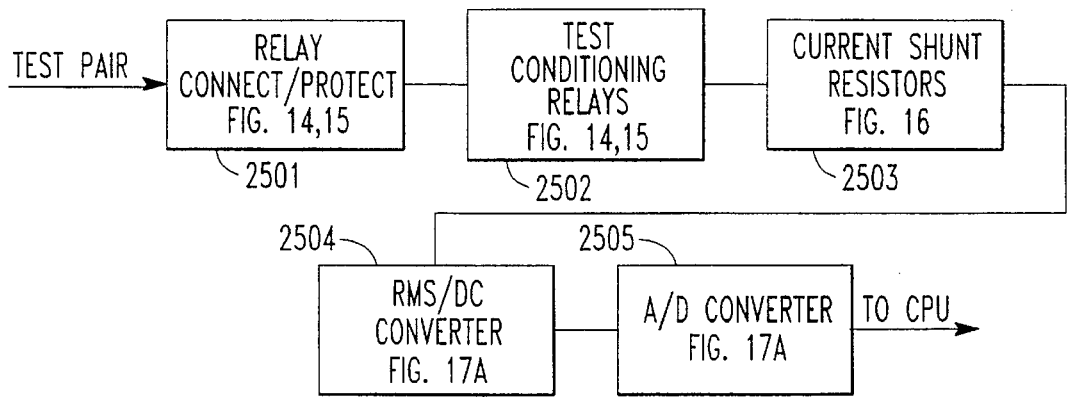

4. AC Current Measurement (FIG. 25)

For AC current measurements, test pair currents (tip-ground or ring-ground) are brought in, at 2501, through the input relay connect/protect circuitry 2501 (FIGS. 14–15), and steered at 2502, via test conditioning relays (FIGS. 14–15) to the 1K, 100, 10, or 1 ohm current shunt resistors 2503 (of shunt network 1609, FIG. 16). At 2504, the resulting AC voltage, which is used to calculate AC current, is sent to the RMS/DC converter (1701, FIG. 17A). The RMS/DC converter translates the RMS analog voltage to a DC voltage that is read at 2505 by the AD converter (1710, FIG. 17). In turn, the AD converter outputs digital AC current measurement-representative data to the CPU (501, FIG. 5).

Figure 26:
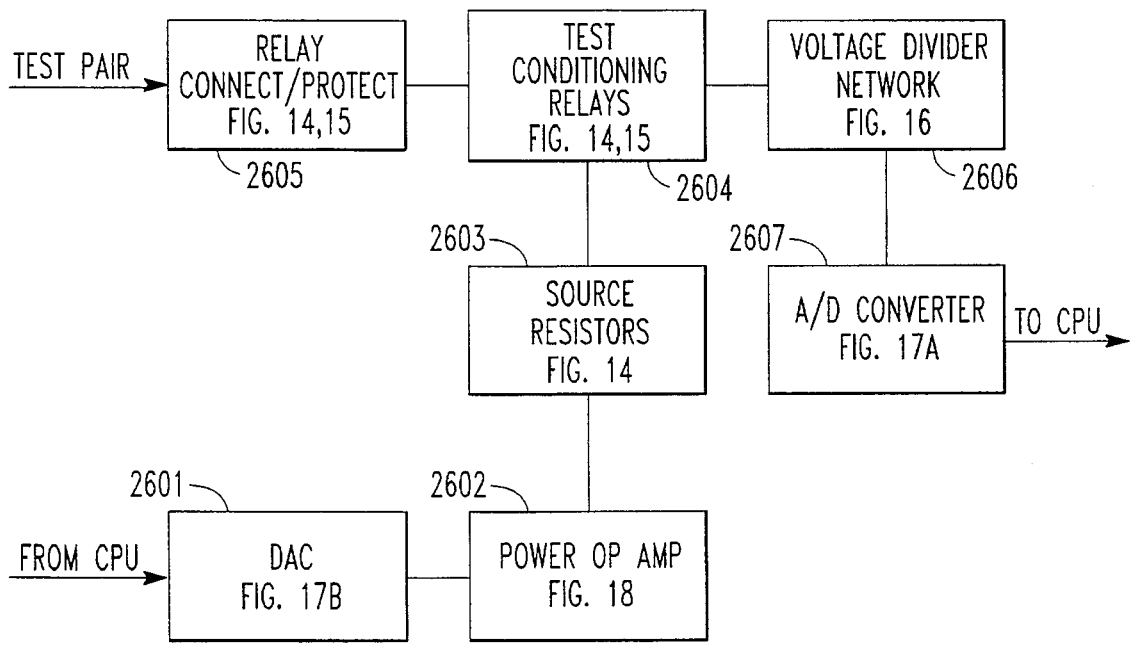

5. DC Resistance Measurement (FIG. 26)

There are three respective DC resistance measurements that may be conducted, respectively associated with differential resistances across tip-ring, ring-ground, and tip-ground. For each resistance measurement to be performed, a respectively different resistance measurement condition is asserted by the processor. Specifically, in response to a prescribed digital resistance measurement input code from the processor, at 2601 the digital-to-analog converter (DAC 1720, FIG. 17B) generates an associated analog DC voltage. This voltage is coupled to power operational amplifier 2602 (FIG. 18), where it is amplified and then fed at 2603 through 1K, 10K, 100K, or 1M ohms of the source resistance (1431, FIG. 14A) and applied at 2604 to one side of the test pair through the test conditioning relays (FIGS. 14–15) and at 2605 to the input relay connect/protect circuitry (FIGS. 14–15). During DC resistance measurements, depending on MLT command parameters, that side of the test pair not being sourced with the DC measurement voltage is either open, shorted to ground or shorted to the other side of the test pair, via the test conditioning relays (2604), while, at 2606, tip-ground or ring-ground voltages are divided down by the voltage divider network (1601, FIG. 16) and read, at 2607, by the AD converter (1710, FIG. 17A) which in turn sends the data to the CPU (501, FIG. 5). The processor then extrapolates the differential or 'delta' resistances on the test pair from this measurements data, taking into account the source voltage and source resistance used.

Figure 27:
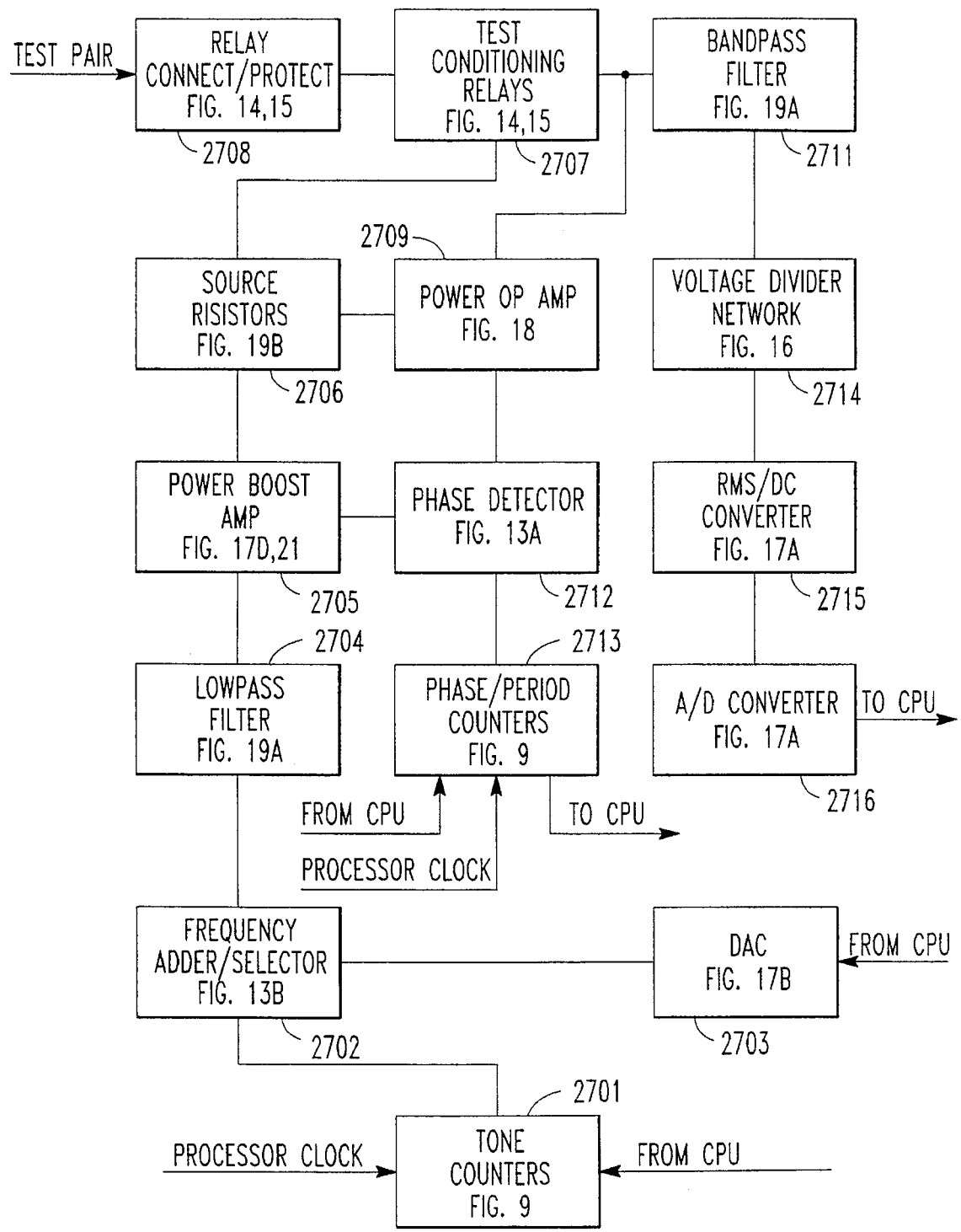

6. Capacitance/AC Resistance Measurement (FIG. 27)

Capacitance measurements are conducted by applying a prescribed test tone (e.g. 30 Hz) to the line and measuring phase delay between the source and the effect of the line on the tone transmission. The tone signal is applied for three respectively different conditions of the test pair (corresponding to those described above for resistance measurements) and line voltage attenuation and phase shift are measured for each test line configuration. The resulting measurements are then processed to derive a differential capacitance.

For this purpose, at 2701, a 30 Hz signal is generated by dividing down the processor clock through the timing/counter chips (CTCs) tone counters (shown at 901–904 in FIG. 9). At 2702, a respective tone is selected by the tone generator (1350, FIG. 13B) and the amplitude is determined at 2703 by setting the output of the DAC (1720, FIG. 17B) to the DC level which becomes the peak-to-peak level desired. This digital signal is converted to a (30 Hz) sine wave by the lowpass filter circuitry (1901, FIG. 19A), and is amplified by the tone amplifier circuitry (including tone amplifier 1751, FIG. 17D and power boost amplifier 2102/2112 of FIG. 21).

At 2706, the amplified tone signal is selectively coupled from the power boost amplifier circuitry through the capacitance source resistors (1951–1954 of the capacitance source resistance network 1950, FIG. 19B). At 2707–2708, the capacitance reference signal is applied to one side of the test pair, via test conditioning relays (FIGS. 14–15) and the relay connection/protection circuitry (FIGS. 14–15). At 2709, (except when the other side of the test pair is shorted to ground) the signal is also applied to the power operational amplifier circuitry (2112/2102 of FIG. 21). At 2708–2709, a duplicate of the capacitance reference tone signal is applied to the other side of the test pair, via test conditioning relays (FIGS. 14–15) and the relay connection/protection circuitry (FIGS. 14–15).

At 2711, the (delayed signal) output of the power boost amplifier circuitry is frequency band-limited (to eliminate noise) by the bandpass filter (1922, FIG. 19A). At 2712 it is then compared in the zero-crossing (lead/lag) phase detector circuit (1300, FIG. 13A) with the power boost amplifier reference signal (supplied by the power boost amplifier at 2705). At 2713, the time interval of the digital signal output by the phase detector, which represents the phase difference between the reference (STRT) and delayed signals (STOP) is measured over a prescribed number signal periods (e.g. ten) for ten periods by phase/period counters of the timing/counter chips (CTCs) 901–904 of FIG. 9, which then forwards this phase information to the CPU.

Via a separate, parallel path at 2714, the band-limited delayed signal output from the bandpass filter circuitry is divided down by the voltage divider (1601, FIG. 16), and translated at 2715 to a DC voltage by the RMS/DC converter (1701, FIG. 17A). The resulting DC analog voltage is then read at 2716 by the AD converter (1710, FIG. 17AB), which sends this amplitude data to the CPU. The differential capacitance or AC resistance of the test pair is derived in the processor from the phase and amplitude measurements, which are based on the RC time constant of the line capacitance and source resistors used.

Figure 28:
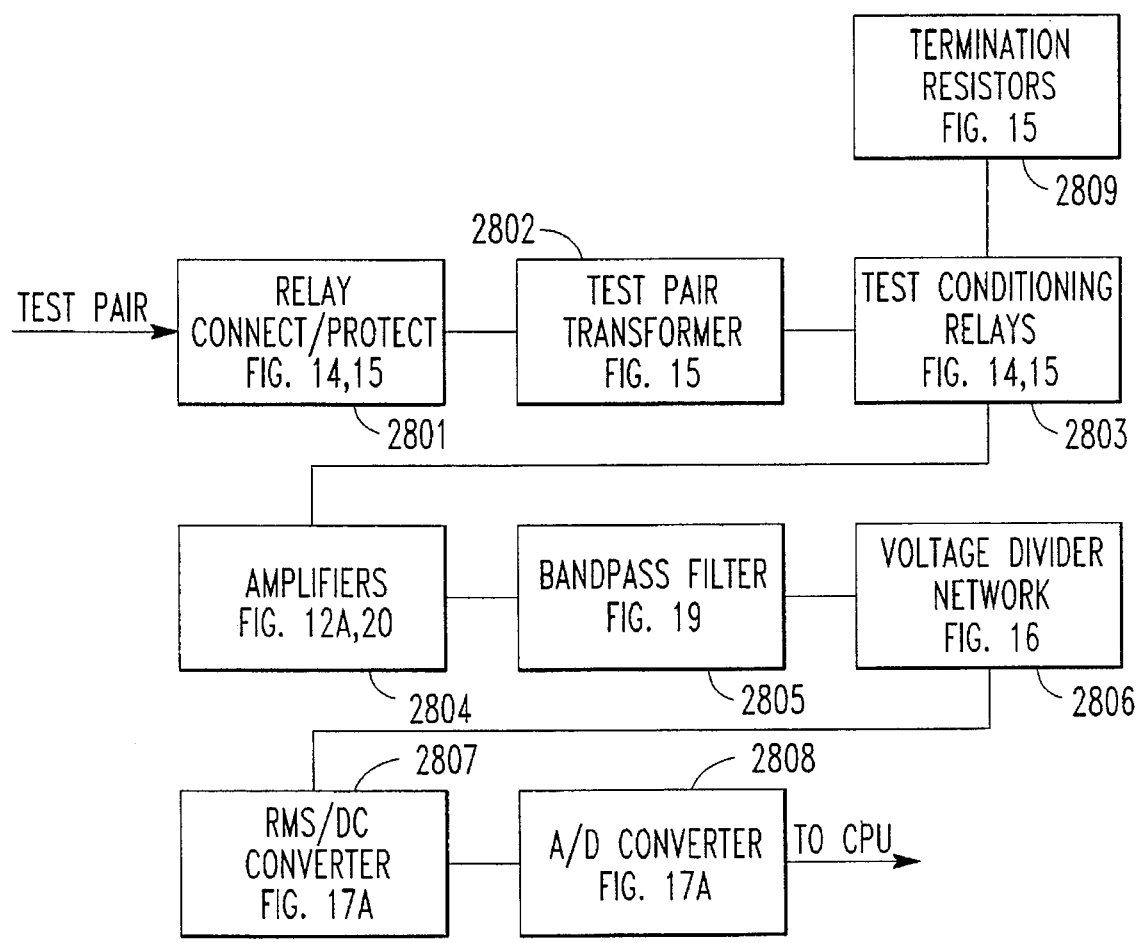

7. Transmission Level Measurement (FIG. 28)

The transmission level measurement performs a measurement of a signal applied to the test pair and calculates the dBm value of the signal. The signal is band-limited through a programmable filter (e.g. between 300 and 3000 Hz). The system bridges onto the test pair, reads the AC voltage on the test pair and reports the converted dBm value. If the initial voltage reading is less than a prescribed value (e.g. 150 mV), the X10 amplifier circuitry, described above, may be employed to provide improved granularity from which a second measurement and associated calculation may be performed. This second dBm value is then reported as the measurement value of the line transmission level.

More particularly, AC signals from the test pair are fed at 2801–2803, through the circuitry of FIGS. 14–15, including relay input connect/protect circuitry, test pair transformer (1503, FIG. 15), and test conditioning relays (K18, K19 and K20, which connect the required termination resistance, 600 or 900 ohms, via resistors 1507, 1509, as shown in FIG. 15) to amplifiers (FIG. 20) at 2804, which correct for transformer loss and provide x1 or x10 gain. The amplified signals are then band-limited at 2805 by the bandpass filter (1920, FIG. 19), and divided down at 2806 by the voltage divider network (1601, FIG. 16). The divided analog AC voltage is then converted at 2807 to a DC voltage by the RMS/DC converter (1701, FIG. 17), and read by the AD converter (1710, FIG. 17), at 2808. The digitized output of the AD converter is placed on the bus and read by the CPU (501, FIG. 5), where the decibel (dB) level is calculated.

Figure 29:
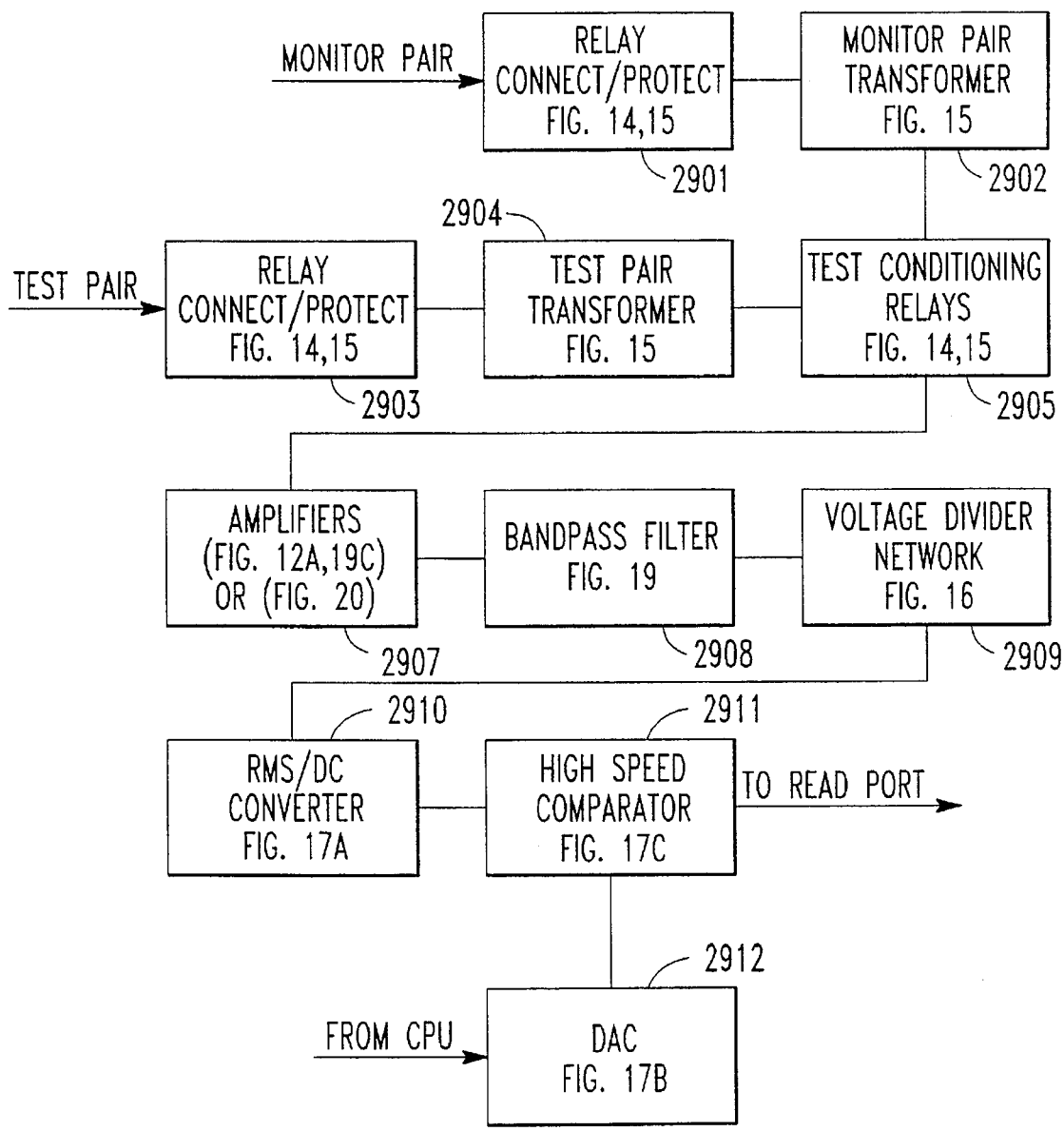
Figure 30:
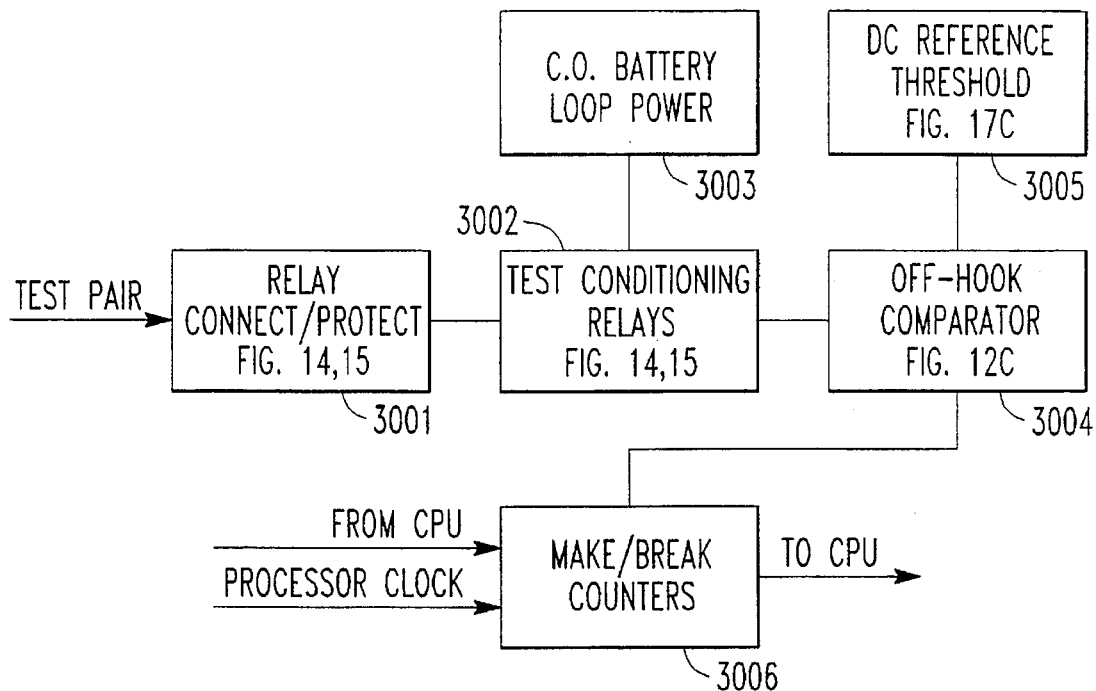

8. Dial Tone Detection (FIG. 29)

The purpose of dial tone detection is to evaluate the dial tone on the line which is connected to the test pair. Dial tone testing includes monitoring for, may include and attempting to break, dial tone for prescribed periods of time.

In order to detect dial tone, either the test pair relay (K17, FIG. 15) or the monitor pair relays (K23, K16, FIG. 15) are coupled through relay connection/protection paths 2901, 2903 to respective isolation transformers (1503, 1520, respectively, shown in FIG. 15), depending on the test requirement. Via test conditioning relays (FIGS. 14, 15), the dial tone signal is coupled at 2905 to the amplifier circuitry of FIG. 20. At 2907 the dial tone signal is amplified (transformer losses are corrected and x1 or x10 gain is selected), and the amplified signal is then band-limited at 2908 (by bandpass filter 1920, FIG. 19). The bandpass-filtered signal is applied at 2909 to the voltage divider network (1601, FIG. 16). The resultant divided signal is then converted into a DC voltage at 2910 by the RMS/DC converter (1701, FIG. 17A and sensed, at 2911 by the high-speed comparator circuitry (1731, FIG. 17C, 2001, FIG. 20). As described previously, the high speed comparator is operative to provide a high digital logic level to a parallel port read by the CPU, if the dial tone signal exceeds a reference voltage supplied at 2912, by the DAC (1720, FIG. 17B), which is set at a threshold value representative of a converted −30 dB signal level. On the other hand, a low logic level from the high-speed comparator indicates the absence of dial tone.

9. Rotary Dial Analysis FIG. 30)

Rotary dial analysis monitors the make and break times of the pulses being examined on the test pair. For rotary dial signal analysis, the (rotary dial) signal is coupled at 3001–3002 through the relay connect/protect circuitry and test conditioning relays (FIG. 14, 15), which provide C.O. battery loop power at 3003, to an off-hook detection comparator (1231, FIG. 12C), at 3004. The off-hook comparator is operative to output a digital low logic level during the "make" part of the cycle, when the rotary signal is more negative than a prescribed (−1.8 VDC) threshold, supplied at 3005. ("Breaks" are indicated by a high logic level). The time intervals of the make and breaks pulses are measured at 3006 by counter/timer chip (CTC) (801, FIG. 8), which couples the information to the CPU.

Figure 31:
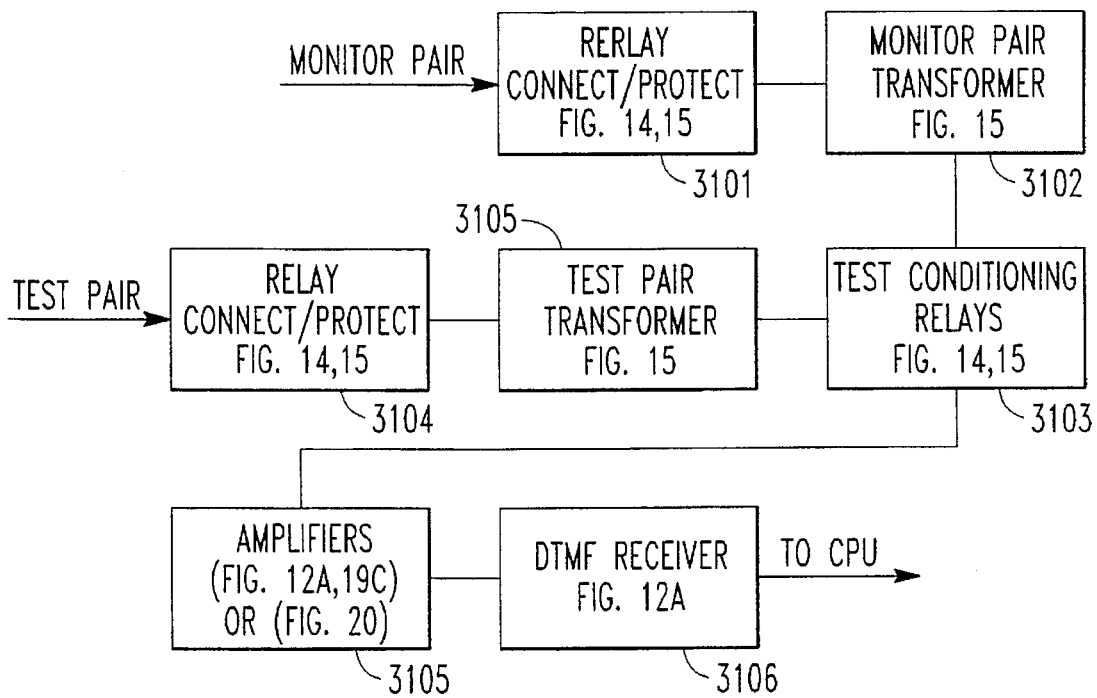

10. DTMF (Touch Tone) Detection (FIG. 31)

Touch tone or DTMF signal analysis performs a test of the DTMF digits received on the test pair during the test period. A prescribed number of digits and a given wait time are employed. In order to detect DTMF signals, either the test pair relay (K17, FIG. 15) or the monitor pair relays (K23, K16, FIG. 15) are coupled through relay connection/protection paths 3101–3102, 3104–3105 to respective isolation transformers (1503, 1520, respectively, shown in FIG. 15), depending on the DTMF path of interest. Via test conditioning relays (FIGS. 14, 15), the signal is coupled at 3103 to the amplifier circuitry of FIG. 20, which compensates at 3105 for transformer loss and provide x1 or x10 gain). The loss-compensated (amplified) signal is then coupled at 3106 to a DTMF receiver (1211, FIG. 12A), which reports data of DTMF signals received via port 1213 (FIG. 12A) to the CPU.

Figure 32:
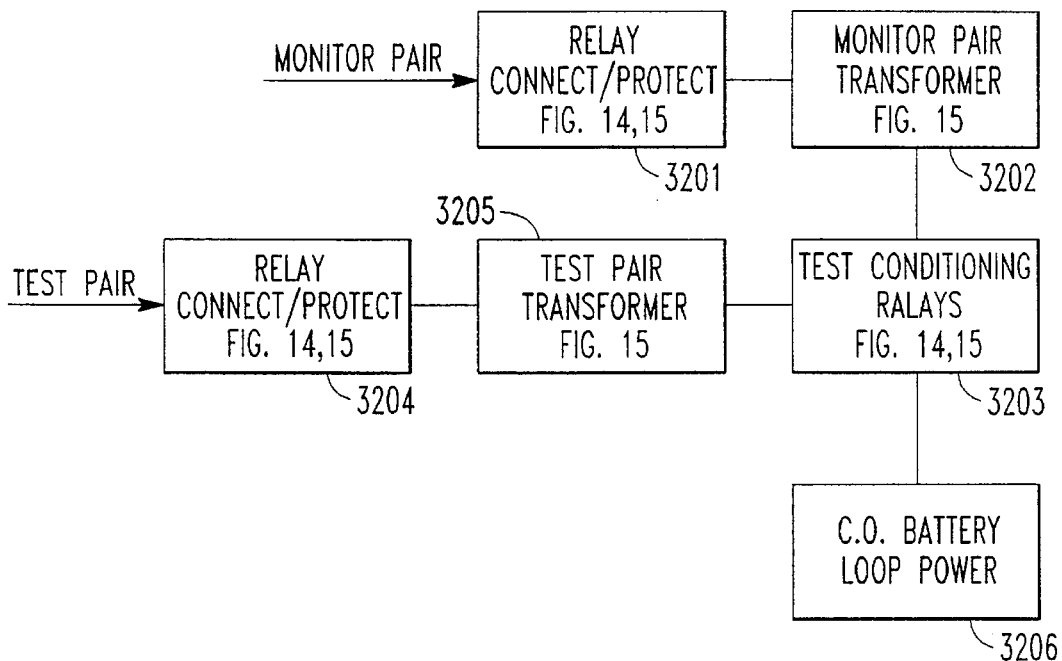
Figure 33:
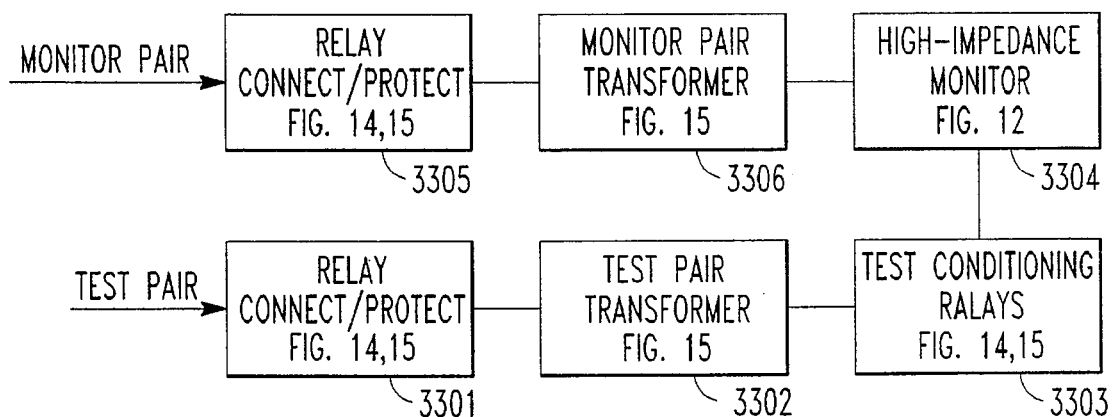
Figure 34:
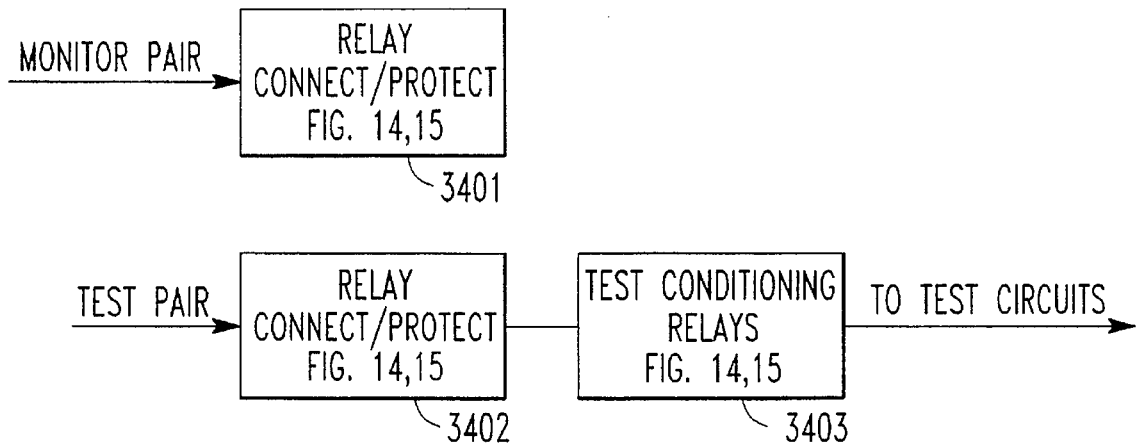

11. Callback Functions: Talk, Monitor, Hold (FIGS. 32–34)

A callback may be established on the talk pair telephone line connected to the RMU. This functionality allows the party to whom the callback is placed to have access to the line under test for the purpose of talking (Talk), monitoring (Monitor) and ringing (hold). Before any of these functions can be provided, a callback condition must be established. In order to establish a callback condition, it is necessary to have the RMU dial a predefined telephone number via the monitor pair. Then, when a connection is made with the monitor pair, a callback condition has been established.

TALK (FIG. 32)

The Talk function involves maintaining a low-impedance connection between the test and monitor pairs (by interconnecting the test pair and monitor pair transformer secondaries, so that an AC-coupled speech communication between the test and monitor pairs is possible). In addition, the test pair is powered with C.O. battery loop power. (Battery may be applied to the loop in either forward or reverse polarity.)

For this purpose, either the test pair relay (K17, FIG. 15) or the monitor pair relays (K23, K16, FIG. 15) are coupled through relay connection/protection paths 3201–3202, 3204–3205 to respective isolation transformers (1503, 1520, respectively, shown in FIG. 15), depending on the talk path of interest. Via test conditioning relays (FIGS. 14, 15), C.O. battery loop power is provided at 3206.

MONITOR (FIG. 33)

The Monitor function involves maintaining a one-way, high-impedance connection from the test pair to the monitor pair (using the high-impedance amplifier circuit, which will not make noise when connected to a busy subscriber line), without applying C.O. battery power to the test pair. This allows the party on the talk pair to monitor the activity on the test pair, but not the reverse.

For callback monitor mode, at 3301, the test pair relay (K17, FIG. 15) is coupled through a relay connection/protection path to an isolation transformer (1503, FIG. 15) at 3302. Via test conditioning relays (FIGS. 14, 15), at 3303, a path is provided at 3304 to high impedance monitor buffer amplifier circuit 1550 (FIG. 15). At 3306, the cascaded monitor pair relay path (K23, K16, FIG. 15) is coupled via isolation transformer (1520, FIG. 15) at 3306, to high impedance monitor amplifier 1550.

HOLD (FIG. 34)

The Hold function involves remaining off-hook on the monitor pair without a test pair-to-monitor pair connection or battery loop power being applied, as shown at relay connection 3401 for the monitor pair, per se, and the relay connection to test conditioning relays for the test pair, at 3402 and 3403, separate from a connection to the monitor pair.

Figure 35:
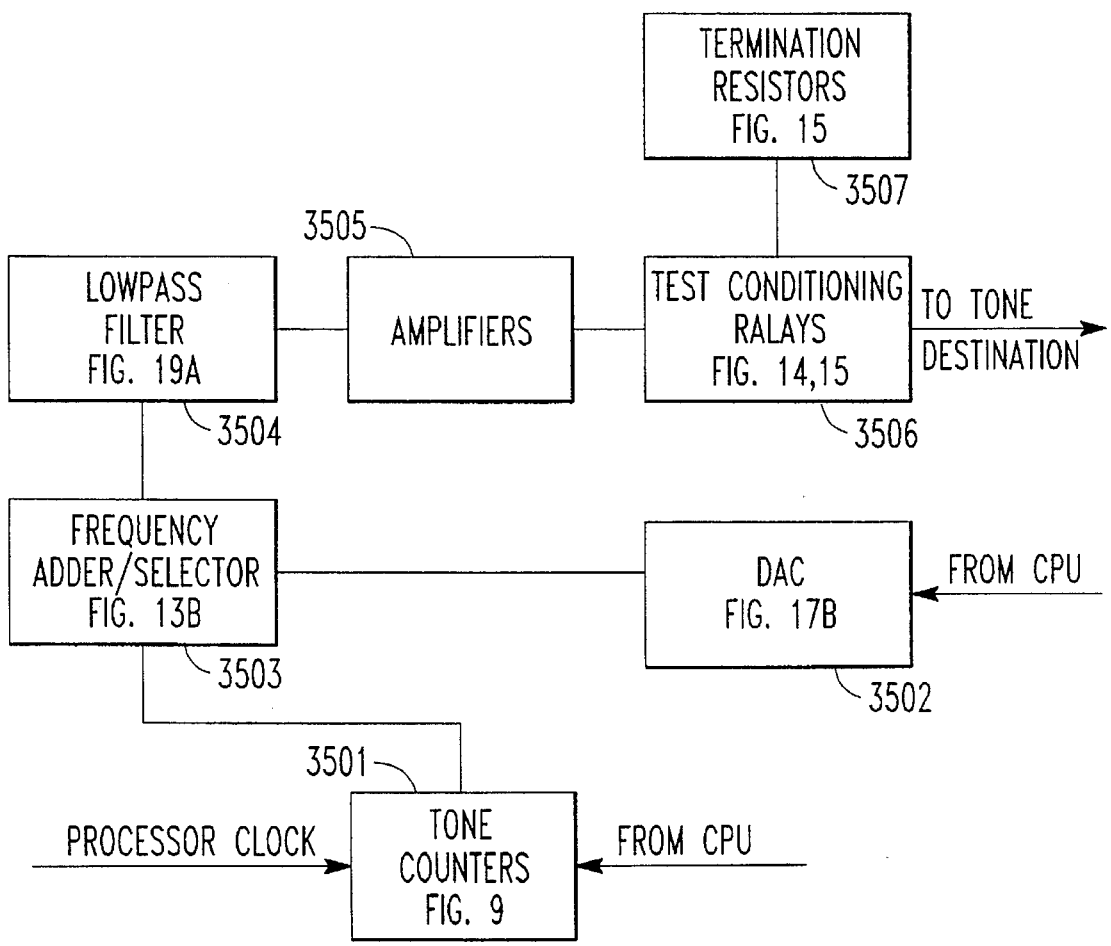

12. Tone Generation (FIG. 35)

As described previously, all tone signals are based upon digitally generated clock signals that are controllably combined, filtered and amplified to produce the desired tone signal. Tone generation may involve the provision of a prescribed tracer tone (e.g. 577.5 Hz at 10.6 dBm) to the test pair and interrupting the tone at a defined rate.

For tone generation, as shown at 3501, processor clock signals are applied to the timing/counter chips (901–904, FIG. 9) and selectively divided down to produce the digital clock components of which the tone signal is comprised. The peak-to-peak amplitude of these signals is set by the DC level output by DAC, at 3502, and the signals are selectively summed at 3503, as necessary by the frequency adder/selector circuitry (FIG. 13B). The resulting sine waves are coupled at 3504, to the lowpass filter circuitry (FIG. 19a), and the filtered tones are then amplified through the tone amplifier stage (1751, FIG. 17D) at 3505 and coupled to their destination through the test conditioning relays (FIGS. 14, 15), at 3506, which provide connections with the required termination resistors (as shown in FIG. 15), at 3507.

13. Ring (Subscriber) Test (FIG. 36)

The ring subscriber function applied a selected one of a plurality of available types of ringing signals to the test pair. Such ringing signals include: R NEG corresponding to a negative superimposed ring signal applied to the ring side of the line, R POS corresponding to a positive superimposed ring signal applied to the ring side of the line, T NEG corresponding to a negative superimposed ring signal applied to the tip side of the line, and T POS corresponding to a positive superimposed ring signal applied to the tip side of the line.

When performing a ringing test, the RMU applies the ringing signal to the test pair and monitors the line for a subsequent ring trip. Once the test pair goes off-hook, the RMU removes the ringing signal from the test pair and places the callback in talk mode, with battery lop power applied in the forward polarity state.

Figure 36:
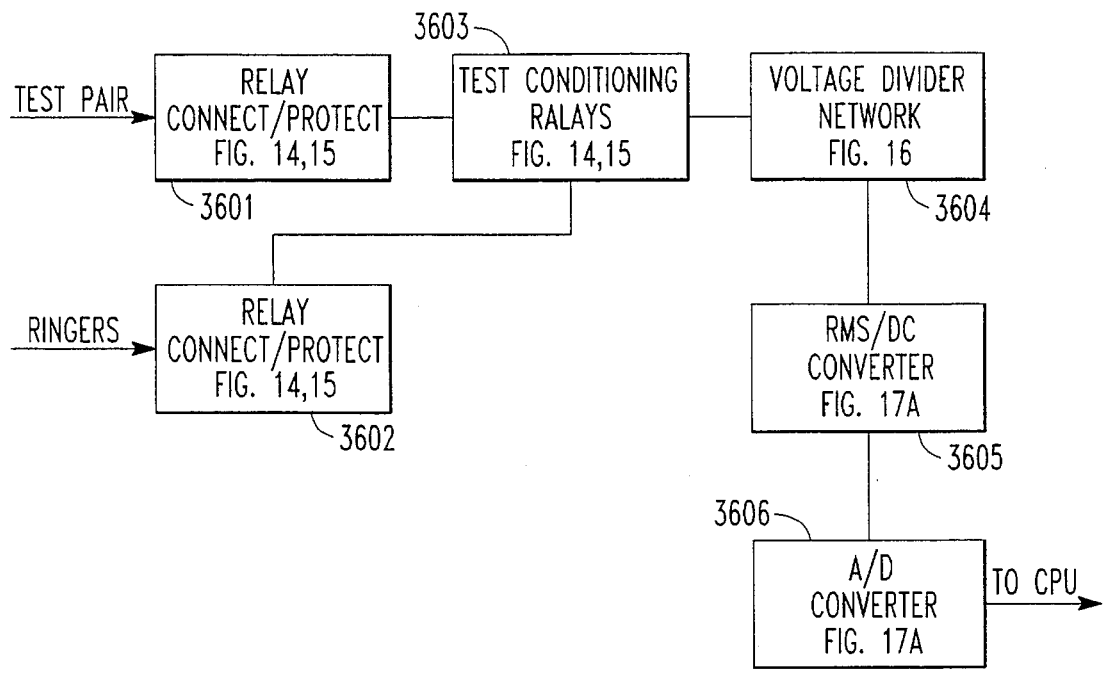

As shown in the signal flow path connection diagram of FIG. 36, to conduct a ringing signal test, a signal is connected from a ringer (or also applied to the test pair) with the proper ring cadence through the relay connect/protect circuitry 3601, 3602 to respective test conditioning relays (FIGS. 14, 15), at 3603. Via the conditioning relay circuit path (FIGS. 14–15), the signals are then steered to the 1/1, 1/10, 1/100 or 1/1000 voltage divider network 3604 (1601, FIG. 16). The divided analog AC voltages are then coupled at 3605 to the RMS/DC converter (1701 in FIG. 17A), which translates the RMS voltage to an analog DC voltage. This analog DC voltage is then read at 3606 by the AD converter (1710, FIG. 17A), which in turn sends digital AC voltage measurement data to the CPU (501, FIG. 5).

Figure 37:
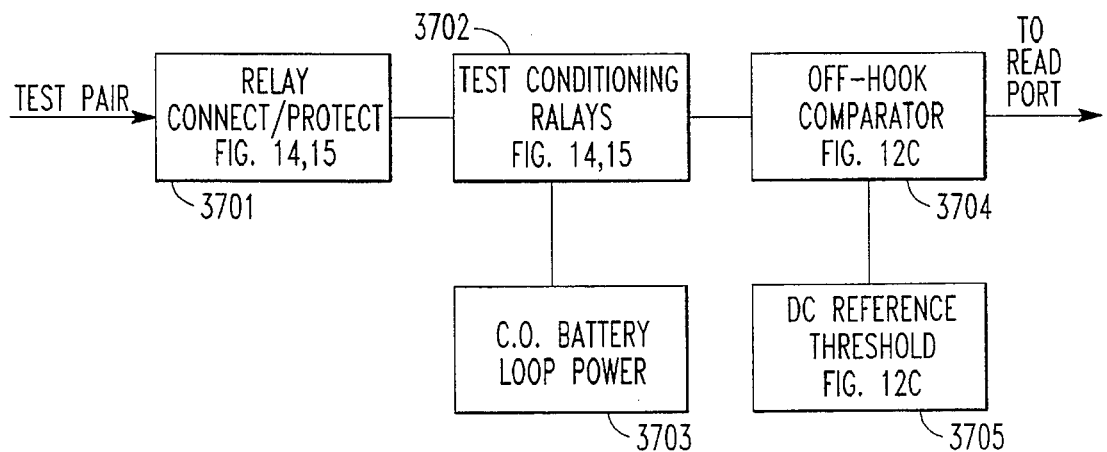

14. Off-hook Detection (FIG. 37)

Off-hook detection monitors the line under test to determine whether line voltage indicates that the subscriber termination device is off-hook. For off-hook detection, the subscriber line is coupled at 3701–3702 through the relay connect/protect circuitry and test conditioning relays (FIG. 14, 15), which provide C.O. battery loop power at 3703, to an off-hook detection comparator (1231, FIG. 12C), at 3704. The off-hook comparator is operative to output a digital low logic level to a parallel port read by the CPU when the subscriber is off-hook. As described previously, an 'off-hook' condition is declared when the signal level is more negative than the −1.8 DC threshold provided at 3705.

15. Alarm Contact Closure Detection (FIG. 38)

To detect an alarm contact closure, the alarm input is coupled at 3801 through relay connect/protect circuitry (FIGS. 14, 15) and applied, at 3802, to an alarm threshold detector circuit (1221, FIG. 12B), the input of which is coupled to detect the open or closed condition of contact of an alarm relay (K7, FIG. 12B). As explained previously, the alarm input level is compared in the threshold circuit with a prescribed DC reference voltage (e.g. 0.96 VDC), shown at 3803, to indicate whether an external alarm contact closure condition has occurred. The alarm comparator output is low when an alarm contact closure condition has been asserted.

MAU OPERATING SYSTEM

As explained previously, when the integrated RMU/MAU system of the present invention is remotely commanded to operate as a metallic access unit, the system receives commands from a direct access test unit (DATU) and performs line conditioning functions on the test line provided by the pair gain system. A non-limiting example of a direct access test unit that may be employed for this purpose is described in the U.S. patent to Chan et al, entitled "Direct Access Test Unit for Central Office," U.S. Pat. No. 4,841,560, issued Jun. 30, 1989.

When operating in the MAU mode, diagrammatically illustrated in the block diagram of FIG. 39, the system is capable of conditioning a line in accordance with selectively invoked MAU functionality, using the relay connect/protect circuitry and test conditioning relays, at 3901–3902, as described above in connection with the description of the RMU operating system. In the MAU mode the following (verifiable on demand) conditioning functions may be invoked, using the relays shown in FIGS. 14 and 15, described above:

Open Line—in which the line under test is disconnected;

Short Line—for the test pair, Tip and Ring are shorted together;

Short To Ground—for the test pair, Tip, Ring, and Ground are all shorted together;

Tip Ground—for the test pair, Tip is shorted to Ground, with Ring open; and

Ring Ground—for the test pair Ring is shorted to Ground, with Tip open.

To verify any of the above conditions (with the exception of open line), an internal resistance measurement is conducted, prior to providing a connection to the external line.

AC LINE CONDITIONING

For AC line conditioning, a high level (tracer) metallic tone (e.g. a 577.5 Hz tone at a level of 25 dBm) is coupled to the line as a tip and ring tone, using the tone generation circuitry and path connections described above, except that prescribed parameters of MAU tone signals are different from RMU tones. For tip tone and ring tone conditioning, the tone (e.g. a 577.5 Hz tone at a level of 19 dBm) is coupled to the line single sided (tip-ground or ring-ground). The interruption rate for an MAU tone may be on the order of 6.7 interruptions per second (as opposed to an interruption rate of five interruptions per second for an RMU tone). To verify placement of a tracer tone on the line, an internal transmission level measurement is conducted prior to connection to the line.

HOLD TEST

For a hold test the system maintains the line conditioning currently invoked for a prescribed period of time (e.g. 1–99 minutes), which begins when the system goes back on-hook. Functions which may be held are open line, shorted line, short-to-ground, tip-to-ground, ring-to-ground, tip tone, ring tone, and tip and ring tone, referenced above.

As will be appreciated from the foregoing description, the substantial cost associated with the installation and servicing of separately dedicated telephone line testing and conditioning systems, and the limited capabilities of such units are effectively obviated in accordance with the processor-controlled integrated telephone line measurement and conditioning system of the present invention, which provides a multiplicity of measurement and conditioning functions that are selectively executable in response to commands issued from a remote command site. As described above, the dual measurement and conditioning capabilities of the architecture of the present invention impart both remote measurement unit (RMU) functionality and metallic access unit (MAU) functionality that may be individually accessed and controlled. The RMU operates primarily as a test head that performs mechanized loop testing (MLT) tasks, while the MAU is operative to impart prescribed electrical conditions to a specified line circuit. When controllably accessed to operate as an RMU, the present invention responds to instructions from a command site (loop maintenance operations system) and performs single-line demand tests on a line provided by a pair gain system. To operate as an MAU, the system receives commands from a direct access test unit (DATU) and performs line conditioning functions on the test line provided by the pair gain system.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a communication system having a supervisory facility, and one or more remote sites from which network lines and subscriber termination equipment coupled thereto may be tested and conditioned, a test apparatus which is installable at a respective one of said plurality of remote sites and is operative under commands sourced from said supervisory facility for monitoring and testing said network lines and subscriber termination equipment coupled thereto, said apparatus having integrated in a shared circuit architecture remote measurement circuitry, which is operative to perform mechanized loop testing of a specified line circuit, and metallic access circuitry, which is operative to impart prescribed electrical conditions to a specified line circuit, said remote measurement circuitry and said metallic access circuitry being individually accessible and controllable by way of command messages coupled thereto by way of said supervisory facility.

2. An apparatus according to claim 1, wherein said remote measurement circuitry is operative, in response to instructions from a loop maintenance operations system, to perform single-line demand tests on a test line circuit designated by a pair gain system.

3. An apparatus according to claim 1, wherein said metallic access circuitry is operative, in response to instructions from a direct access test unit, to perform line conditioning functions on a line circuit designated by a pair gain system.

4. An apparatus according to claim 1, wherein said remote measurement circuitry of said shared circuit architecture includes remote measurement circuitry, which is controllably operative to perform a plurality of measurements on a test line circuit, said plurality of measurements including AC and DC voltage and current measurement, resistance and capacitance measurements, analysis of rotary dial pulses, dial tone, and dual tone multi-frequency tones, and the measurement of signal transmission levels on said test line circuit.

5. An apparatus according to claim 4, wherein said resistance and capacitance measurements include measurements between tip and ground, ring and ground, and tip and ring portions of said test line circuit.

6. An apparatus according to claim 4, wherein said remote measurement circuitry of said shared circuit architecture is controllably operative to generate test tones, and to allow test personnel to establish callback and alternatively monitor, apply ringing, talk and perform tests on a separate telephone line.

7. An apparatus according to claim 1, wherein said metallic access circuitry of said shared circuit architecture includes metallic access circuitry which is controllably operative to place a test line in a selected one of a plurality of conditions including opening the line, shunting tip to ring, or shunting either or both of tip and ring to ground.

8. An apparatus according to claim 1, wherein said metallic access circuitry of said shared circuit architecture includes metallic access circuitry which is controllably operative to apply high-level metallic tones to tip and ring, or single-sided tones individually to the tip or ring side of a test line.

9. An apparatus according to claim 1, wherein said metallic access circuitry of said shared circuit architecture includes metallic access circuitry which is controllably operative to cause a line condition to be maintained on the line for a prescribed period of time following disconnect.

10. An apparatus according to claim 1, wherein said integrated circuit architecture includes a central processing unit, which is operative to execute respective instructions of operating system firmware that is stored in a memory unit including a remotely reprogrammable memory system, through the execution of which said central processing unit controls remote measurement or metallic access functionality and operation in accordance with commands communicated to said apparatus from said supervisory site.

11. An apparatus according to claim 10, wherein said remotely reprogrammable memory system comprises dual electronically reprogrammable flash memory systems, one of which flash memory systems is on-line, and the other of which is off-line as a quasi-redundant memory system.

12. An apparatus according to claim 10, wherein said remotely reprogrammable memory system comprises dual electronically reprogrammable flash memory systems, which contain respective first and second versions of said operating system firmware.

13. An apparatus according to claim 11, wherein said integrated circuit architecture includes a boot-up control circuit which is operative to cause said central processing unit to boot up in a prescribed given one of said dual flash memory systems.

14. An apparatus according to claim 13, wherein said boot-up control circuit includes a reset control circuit which is operative, in response to a modification of operating system firmware, to cause said central processing unit to execute the operating system firmware in that one of said dual flash memory system where the modification of operating system firmware has occurred.

15. An apparatus according to claim 10, wherein said memory unit includes auxiliary random access memory and a memory access controller which is operative to prevent corruption of the contents of said random access memory in the event of a power outages.

16. An apparatus according to claim 15, wherein said memory access controller is operative to couple a prescribed auxiliary power supply to said memory unit to preserve contents thereof during a power outage.

17. An apparatus according to claim 10, wherein said integrated circuit architecture includes a plurality of test and conditioning relays that are operated under control of said central processing unit so as to interconnect selected circuit components of said integrated circuit architecture in a prescribed functional connectivity path to a test line circuit for a given remote measurement operation or a given metallic access operation.

18. An apparatus according to claim 10, wherein said apparatus further includes a communication unit coupled to said central processing unit and an external communication link to which said supervisory site is coupled, and being operative to interface command and response messages between said central processing unit and said supervisory site.

19. An apparatus according to claim 18, wherein said communication unit includes a modem unit which is operative to carry out digital data communications between said supervisory site and said central processing unit at a selected one of a plurality of baud rates by initially its baud rate to default baud rate corresponding to the highest baud rate at which said modem is operative to communicate with said supervisory site, and then iteratively changing its baud rate, as necessary, based upon an examination of prescribed contents of a message from said supervisory site, until the baud rate of said modem matches that of said supervisory site.

20. An apparatus according to claim 18, wherein said communication unit further includes a data access arrangement for a telephone line interface, and additional telephone line signalling circuitry which is controllably operative to present an off-hook condition, generate dual tone multi-frequency or rotary dial signals, detect ringing signals, carrier, call-progress and answer-tone signals.

21. An apparatus according to claim 10, wherein said shared circuit architecture includes timer/counter circuitry which is operative under control of said central processing unit to generate a plurality of digitally sourced clock signals, and an AC signal source unit containing analog filter, amplifier and signal conditioning circuitry, which is operative generate analog tones having prescribed electrical characteristics in accordance with selected ones of said digitally sourced clock signals and thereby generate variable amplitude audio band tones, including dual tone multi-frequency tones, test tones, ring-back tones, and a reference tone for line capacitance measurements.

22. An apparatus according to claim 10, wherein said shared circuit architecture includes a DC source unit containing intercoupled voltage reference, digital-to-analog converter circuitry, and a selectable source resistor stage for generating a prescribed DC stimulus to be applied to a test line.

23. An apparatus according to claim 10, wherein said shared circuit architecture includes detector circuitry which is operative under control of said central processing units to selectively detect dual tone multi-frequency signalling, external closed-contact alarms, and an off-hook condition of a test line circuit, and selectively perform high impedance and low impedance monitoring of test line conditions over the monitor line, detect single frequency pulses employed for rotary dial analysis, or detect phase difference intervals between a reference and a delayed signal for capacitance measurements of said line circuit.

24. An apparatus according to claim 10, wherein said shared circuit architecture includes a termination resistor network, voltage divider and current shunt resistor networks, an AC-RMS DC converter, and an analog-to-digital converter, selectively intercoupled under control of said central processing unit for performing DC measurements of a test line circuit.

25. An apparatus according to claim 17, wherein said shared circuit architecture includes a voltage divider network and an analog-to digital converter, and wherein said remote measurement circuitry is controllably operative to measure DC voltage conditions of said test line circuit through said test and conditioning relays, through which test line analog voltages are steered to said voltage divider network, with a divided analog DC voltage produced thereby being applied to said analog-to-digital converter, the output of which is coupled in the form of digital data representative of the measured analog DC voltage to said central processing unit.

26. An apparatus according to claim 17, wherein said shared circuit architecture includes a voltage divider network, an AC/DC RMS converter and an analog-to-digital converter, and wherein said remote measurement circuitry is controllably operative to measure AC voltage conditions of said test line circuit through said test and conditioning relays, through which test line analog voltages are steered to said voltage divider network, with a divided analog AC voltage produced thereby being applied through said AC/DC RMS converter to said analog-to-digital converter, the output of which is coupled in the form of digital data representative of the measured analog voltage to said central processing unit.

27. An apparatus according to claim 17, wherein said shared circuit architecture includes a shunt resistor network and an analog-to-digital converter, and wherein said remote measurement circuitry is controllably operative to measure DC current conditions of said test line circuit through said test and conditioning relays, through which test line analog currents are steered to said resistor network, with an analog DC voltage produced thereby being applied to said analog-to-digital converter, the output of which is coupled in the form of digital data representative of the measured analog DC voltage to said central processing unit.

28. An apparatus according to claim 17, wherein said shared circuit architecture includes a shunt resistor network, an AC/DC RMS converter and an analog-to-digital converter, and wherein said remote measurement circuitry is controllably operative to measure AC current conditions of said test line circuit through said test and conditioning relays, through which test line analog currents are steered to said shunt resistor network, with an analog AC voltage produced thereby being applied through said AC/DC RMS converter to said analog-to-digital converter, the output of which is coupled in the form of digital data representative of the measured analog voltage to said central processing unit.

29. An apparatus according to claim 17, wherein said shared circuit architecture includes a digital-to-analog converter, amplifier circuitry and a source resistor network, and wherein said remote measurement circuitry is controllably operative to perform a line resistance measurement by causing said digital-to-analog converter to generate an analog voltage in accordance with a digital code value sourced from said central processing unit, the output of said digital-to-analog converter being coupled to amplifier circuitry, and supplied therefrom through prescribed resistance components of a source resistance network, and applied to one side of a test line circuit through said test and conditioning relays.

30. An apparatus according to claim 10, wherein said shared circuit architecture includes tone generator and phase measurement circuitry, and wherein said remote measurement circuitry is controllably operative to perform a line resistance measurement by causing said tone generator to apply a prescribed test tone signal to said test line, said phase measurement circuitry being operative to measure phase delay between the generated source tone signal and a tone signal associated with the effect of said test line.

31. An apparatus according to claim 10, wherein said shared circuit architecture includes transmission level measurement circuitry which is operative to perform a measurement of a signal applied to said test line and calculates the value of the measured signal.

32. An apparatus according to claim 17, wherein said shared circuit architecture includes a voltage divider network, an AC/DC RMS converter and a comparator, and wherein said shared circuit architecture is operative to detect dial tone via said test and conditioning relays, from which a dial tone signal is coupled through amplifier circuitry and band-limited by a bandpass filter for application to said voltage divider network, the output of which is converted into a DC voltage by said RMS/DC converter and sensed by said comparator, which provides a digital logic level representative of whether or not dial tone is present on said line.

33. An apparatus according to claim 17, wherein said shared circuit architecture includes an off-hook comparator, and wherein said shared circuit architecture is operative to detect rotary dial signals by monitoring the make and break times of the pulses being examined on said test line, by coupling a rotary dial signal through said test and conditioning relays to said off-hook detection comparator, said off-hook comparator providing a first digital logic level during a make part of a dial pulse cycle and a second digital logic level during a break part of said dial pulse cycle.

34. An apparatus according to claim 17, wherein said metallic access circuitry is operative, in response to instructions from said supervisory site, to perform line conditioning functions on a test line circuit through a circuit path including said test and conditioning relays.

35. An apparatus according to claim 34, wherein said test and conditioning relays include respective relay circuits which are selectively operative to effectively disconnect the test line, to short tip and ring together, to short tip, ring, and ground together, to short tip to ground, with ring open, and to short ring to ground, with tip open.

36. An apparatus according to claim 10, wherein said shared circuit architecture includes timer/counter circuitry which is operative under control of said central processing unit to generate a plurality of digitally sourced clock signals, and an AC signal source unit containing analog filter, amplifier and signal conditioning circuitry, which is operative generate analog tones having prescribed electrical characteristics in accordance with selected ones of said digitally sourced clock signals and thereby generate variable amplitude audio band tones, and wherein said metallic access circuitry is operative to perform AC line conditioning by placing a metallic tone on the test line as a tip and ring tone, derived from said AC signal source.

37. A telephone line testing and conditioning apparatus, which is installable at a respective one of a plurality of remote sites, from which network telephone line circuits and subscriber termination equipment coupled thereto may be tested and conditioned from a supervisory facility, said telephone line testing and conditioning apparatus being operative under commands sourced from said supervisory facility to execute one of remote measurement functionality, through which mechanized loop testing of a specified line circuit is performed, and metallic access functionality, through which prescribed electrical conditions are imparted to a specified line circuit.

38. An apparatus according to claim 37, wherein said remote measurement circuitry is operative, in response to instructions from said supervisory site, to perform single-line demand tests on a test line circuit.

39. An apparatus according to claim 38, wherein said metallic access circuitry is operative, in response to instructions from said supervisory site, to perform line conditioning functions on a test line circuit.

40. An apparatus according to claim 37, wherein said telephone line testing and conditioning apparatus comprises shared circuit architecture having remote measurement circuitry, which is controllably operative to perform a plurality of measurements on a test line circuit, said plurality of measurements including AC and DC voltage and current measurements, resistance and capacitance measurements, analysis of rotary dial pulses, dial tone, and dual tone multi-frequency tones, and the measurement of signal transmission levels on said test line circuit.

41. An apparatus according to claim 40, wherein said remote measurement circuitry is further controllably operative to generate test tones, and to allow test personnel to establish callback and alternatively monitor, apply ringing, talk and perform tests on a separate telephone line.

42. An apparatus according to claim 37, wherein said telephone line testing and conditioning apparatus comprises shared circuit architecture having metallic access conditioning circuitry, which is controllably operative to place a test line in a selected one of a plurality of conditions including opening the line, shunting tip to ring, or shunting either or both of tip and ring to ground.

43. An apparatus according to claim 42, wherein said metallic access circuitry of said shared circuit architecture includes metallic access circuitry which is controllably operative to apply high-level metallic tones to tip and ring, or single-sided tones individually to the tip or ring side of a test line.

44. An apparatus according to claim 42, wherein said metallic access circuitry of said shared circuit architecture includes metallic access circuitry which is controllably operative to cause a line condition to be maintained on the line for a prescribed period of time following disconnect.

45. An apparatus according to claim 37, wherein said telephone line testing and conditioning apparatus comprises shared circuit architecture having remote measurement circuitry and metallic access conditioning circuitry, said integrated circuit architecture including a central processing unit, which is operative to execute respective instructions of operating system firmware that is stored in a memory unit including a remotely reprogrammable memory system, through the execution of which said central processing unit controls remote measurement or metallic access functionality and operation in accordance with commands communicated to said apparatus from said supervisory site.

46. An apparatus according to claim 45, wherein said remotely reprogrammable memory system comprises dual electronically reprogrammable flash memory systems, which contain respective first and second versions of said operating system firmware, one of which flash memory systems is on-line, and the other of which is off-line as a quasi-redundant memory system.

47. An apparatus according to claim 45, wherein said integrated circuit architecture includes a plurality of test and conditioning relays that are operated under control of said central processing unit so as to interconnect selected circuit components of said integrated circuit architecture in a prescribed functional connectivity path to a test line circuit for a given remote measurement functionality or a given metallic access functionality.

48. An apparatus according to claim 45, wherein said apparatus includes a communication unit which is operative to carry out digital data communications between said supervisory site and said central processing unit at a selected one of a plurality of baud rates by initially its baud rate to default baud rate corresponding to the highest baud rate at which said modem is operative to communicate with said supervisory site, and then iteratively changing its baud rate, as necessary, based upon an examination of prescribed contents of a message from said supervisory site, until the baud rate of said modem matches that of said supervisory site.

49. An apparatus according to claim 48, wherein said communication unit further includes a data access arrangement for a telephone line interface, and additional telephone line signalling circuitry which is controllably operative to present an off-hook condition, generate dual tone multi-frequency or rotary dial signals, detect ringing signals, carrier, call-progress and answer-tone signals.

50. An apparatus according to claim 45, wherein said shared circuit architecture includes timer/counter circuitry which is operative under control of said central processing unit to generate a plurality of digitally sourced clock signals, and an AC signal source unit containing analog filter, amplifier and signal conditioning circuitry, which is operative generate analog tones having prescribed electrical characteristics in accordance with selected ones of said digitally sourced clock signals and thereby generate variable amplitude audio band tones.

51. An apparatus according to claim 45, wherein said shared circuit architecture includes a DC source unit containing intercoupled voltage reference, digital-to-analog converter circuitry, and a selectable source resistor stage for generating a prescribed DC stimulus to be applied to a test line.

52. An apparatus according to claim 45, wherein said shared circuit architecture includes detector circuitry which is operative under control of said central processing units to selectively detect dual tone multi-frequency signalling, external closed-contact alarms, and an off-hook condition of a test line circuit, and selectively perform high impedance and low impedance monitoring of test line conditions over the monitor line, detect single frequency pulses employed for rotary dial analysis, or detect phase difference intervals between a reference and a delayed signal for capacitance measurements of said line circuit.

53. An apparatus according to claim 45, wherein said shared circuit architecture includes a termination resistor network, voltage divider and current shunt resistor networks, an AC-RMS DC converter, and an analog-to-digital converter, selectively intercoupled under control of said central processing unit for performing DC measurements of a test line circuit.

54. An apparatus according to claim 47, wherein said shared circuit architecture includes a digital-to-analog converter, amplifier circuitry and a source resistor network, and wherein said remote measurement circuitry is controllably operative to perform a line resistance measurement by causing said digital-to-analog converter to generate an analog voltage in accordance with a digital code value sourced from said central processing unit, the output of said digital-to-analog converter being coupled to amplifier circuitry, and supplied therefrom through prescribed resistance components of a source resistance network, and applied to one side of a test line circuit through said test and conditioning relays.

55. An apparatus according to claim 47, wherein said shared circuit architecture includes tone generator and phase measurement circuitry, and wherein said remote measurement circuitry is controllably operative to perform a line resistance measurement by causing said tone generator to apply a prescribed test tone signal to said test line, said phase measurement circuitry being operative to measure phase delay between the generated source tone signal and a tone signal associated with the effect of said test line.

56. An apparatus according to claim 47, wherein said shared circuit architecture includes transmission level measurement circuitry which is operative to perform a measurement of a signal applied to said test line and calculates the value of the measured signal.

57. An apparatus according to claim 47, wherein said shared circuit architecture includes a voltage divider network, an AC/DC RMS converter and a comparator, and wherein said shared circuit architecture is operative to detect dial tone via said test and conditioning relays, from which a dial tone signal is coupled through amplifier circuitry and band-limited by a bandpass filter for application to said voltage divider network, the output of which is converted into a DC voltage by said RMS/DC converter and sensed by said comparator, which provides a digital logic level representative of whether or not dial tone is present on said line.

58. An apparatus according to claim 47, wherein said shared circuit architecture includes an off-hook comparator, and wherein said shared circuit architecture is operative to detect rotary dial signals by monitoring the make and break times of the pulses being examined on said test line, by coupling a rotary dial signal through said test and conditioning relays to said off-hook detection comparator, said off-hook comparator providing a first digital logic level during a make part of a dial pulse cycle and a second digital logic level during a break part of said dial pulse cycle.

59. An apparatus according to claim 47, wherein said metallic access circuitry is operative, in response to instructions from said supervisory site, to perform line conditioning functions on a test line circuit through a circuit path including said test and conditioning relays.

60. An apparatus according to claim 59, wherein said test and conditioning relays include respective relay circuits which are selectively operative to effectively disconnect the test line, to short tip and ring together, to short tip, ring, and ground together, to short tip to ground, with ring open, and to short ring to ground, with tip open.

61. An apparatus according to claim 45, wherein said shared circuit architecture includes timer/counter circuitry which is operative under control of said central processing unit to generate a plurality of digitally sourced clock signals, and an AC signal source unit containing analog filter, amplifier and signal conditioning circuitry, which is operative generate analog tones having prescribed electrical characteristics in accordance with selected ones of said digitally sourced clock signals and thereby generate variable amplitude audio band tones, and wherein said metallic access circuitry is operative to perform AC line conditioning by placing a metallic tone on the test line as a tip and ring tone, derived from said AC signal source.

* * * * *